(12) United States Patent
Kim

(10) Patent No.: US 10,383,075 B2
(45) Date of Patent: Aug. 13, 2019

(54) METHOD AND APPARATUS FOR PROVIDING CONNECTION WITH RADIO ACCESS NETWORK THROUGH WIRELESS BACKHAUL

(71) Applicant: Samsung Electronics Co., Ltd, Gyeonggi-do (KR)

(72) Inventor: Yung-Soo Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 113 days.

(21) Appl. No.: 15/237,611

(22) Filed: Aug. 15, 2016

(65) Prior Publication Data

US 2017/0048775 A1   Feb. 16, 2017

(30) Foreign Application Priority Data

Aug. 13, 2015   (KR) .......................... 10-2015-0114605

(51) Int. Cl.
| | | |
|---|---|---|
| *H04W 56/00* | (2009.01) | |
| *H04W 76/18* | (2018.01) | |
| *H04W 40/22* | (2009.01) | |
| H04W 84/04 | (2009.01) | |
| H04W 16/32 | (2009.01) | |
| H04W 16/28 | (2009.01) | |
| H04W 76/30 | (2018.01) | |
| H04W 76/15 | (2018.01) | |
| H04B 7/06 | (2006.01) | |

(52) U.S. Cl.
CPC ....... *H04W 56/0015* (2013.01); *H04W 40/22* (2013.01); *H04W 76/18* (2018.02); H04B 7/0617 (2013.01); H04W 16/28 (2013.01); H04W 16/32 (2013.01); H04W 76/15 (2018.02); H04W 76/30 (2018.02); H04W 84/042 (2013.01)

(58) Field of Classification Search
CPC ........ H04B 7/06; H04W 16/28; H04W 16/32; H04W 40/34; H04W 56/0015; H04W 76/025; H04W 76/027; H04W 76/06; H04W 84/042
See application file for complete search history.

(56) References Cited

U.S. PATENT DOCUMENTS 7,466,985 B1 * 12/2008 Handforth ............. H04W 72/08
                                                       455/454
2007/0066300 A1 * 3/2007 Nishimura ............. G08C 17/02
                                                       455/426.1

(Continued)

*Primary Examiner* — Benjamin H Elliott, IV

(57) ABSTRACT

The present disclosure relates to a pre-$5^{th}$-Generation (5G) or 5G communication system to be provided for supporting higher data rates Beyond $4^{th}$-Generation (4G) communication system such as long term evolution (LTE). According to the present disclosure, a method for providing a connection with a radio access network via a wireless backhaul comprises determining one of a first state in which a first node connected with the radio access network is operated using all of beams and a second state in which the first node is operated using an beam of the first node determined in the first state as an operation mode of the first node and providing, by the first node, the connection with the radio access network to a radio access node in the determined operation mode.

16 Claims, 34 Drawing Sheets

(56) References Cited

U.S. PATENT DOCUMENTS

| | | | |
|---|---|---|---|
| 2008/0049672 A1* | 2/2008 | Barak | H04L 5/0023 |
| | | | 370/330 |
| 2012/0194650 A1* | 8/2012 | Izadi | H04N 5/332 |
| | | | 348/47 |
| 2012/0236731 A1* | 9/2012 | Beaudin | H04W 72/082 |
| | | | 370/248 |
| 2013/0142136 A1 | 6/2013 | Pi et al. | |
| 2013/0252650 A1* | 9/2013 | Halbauer | H04W 74/00 |
| | | | 455/501 |
| 2014/0185497 A1* | 7/2014 | Wolf | H04W 28/26 |
| | | | 370/294 |
| 2015/0305025 A1* | 10/2015 | Moraru | H04L 27/2602 |
| | | | 370/294 |
| 2015/0382214 A1* | 12/2015 | Cheng | H04W 24/08 |
| | | | 370/252 |
| 2016/0135191 A1* | 5/2016 | Negus | H04B 7/0486 |
| | | | 370/329 |
| 2016/0269911 A1* | 9/2016 | Cheng | H04W 16/18 |
| 2016/0270013 A1* | 9/2016 | Soriaga | H04W 56/0015 |
| 2016/0344519 A1* | 11/2016 | Lin | H04L 5/005 |
| 2017/0006637 A1* | 1/2017 | Sahlin | H04W 74/004 |
| 2017/0048775 A1* | 2/2017 | Kim | H04W 76/027 |
| 2017/0318491 A1* | 11/2017 | Chen | H04L 1/0026 |

* cited by examiner

METHOD AND APPARATUS FOR PROVIDING CONNECTION WITH RADIO ACCESS NETWORK THROUGH WIRELESS BACKHAUL

CROSS-REFERENCE TO RELATED APPLICATION(S) AND CLAIM OF PRIORITY

The present application is related to and claims the benefit under 35 U.S.C. § 119(a) of a Korean patent application filed in the Korean Intellectual Property Office on Aug. 13, 2015 and assigned Serial No. 10-2015-0114605, the entire disclosure of which is incorporated herein by reference.

TECHNICAL FIELD

The present disclosure concerns technology for providing a connection with a radio access network through a backhaul network, and more specifically, to methods and apparatuses for wireless backhaul communication by backhaul nodes providing network connection to radio access nodes based on beamforming.

BACKGROUND

To meet the demand for wireless data traffic having increased since deployment of 4G (4th-Generation) communication systems, efforts have been made to develop an improved 5G (5th-Generation) or pre-5G communication system. Therefore, the 5G or pre-5G communication system is also called a 'beyond 4G network' or a 'post LTE system'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Meanwhile, wireless backhaul schemes may break down into point-to-point (PTP) wireless backhaul and point-to-multipoint (PMP) wireless backhaul. PTP wireless backhaul offers one-to-one communication between one transmitter and one receiver. In PTP wireless backhaul, accordingly, the respective antennas of the transmitter and the receiver are commonly installed in fixed directions that give the optimal performance with respect to each other while generating very narrow beams. Here, use of the higher frequency may further narrow beams generated by antennas with the same size while increasing antenna gain. Therefore, PTP wireless backhaul is more advantageous for high frequency and benefits in light of less interference and excellent communication performance through an increased antenna gain.

However, the need of being installed with beam oriented accurately at the position where line-of-sight (LOS) is attained results in wireless backhaul being primarily intended for broad service coverage macro base stations, but not adequate for base stations with relatively smaller coverage (referred to, hereinafter, as small cell base stations).

In PMP wireless backhaul, meanwhile, one hub node (HN) connected with a wired backhaul offers a network connection by wirelessly communicating with multiple remote backhaul nodes (RBN). Conventionally, PMP backhaul adopts antennas with a large beam width of about 60 degrees to about 90 degrees at 6 GHz or less. For the reasons, PMP backhaul, despite being capable of communication even under a non-line-of-sight (NLOS) environment, is vulnerable to interference and exhibits poor communication performance due to the backhaul's decreased antenna gain. Thus, PMP wireless backhaul gives more advantages to small cell base stations that have reduced communication capacity but require easy installation of multiple RBNs regardless of position.

Recently, vigorous research and 3GPP long term evolution (LTE) standardization are underway for heterogeneous cell technology for adding small cells in macro cell service coverage for maximized service areal capacity. As a result, future mobile communication systems are expected to present significantly increased small cell capacity due to coexistence of a number of small cells in macro cells. However, conventional PMP wireless backhaul cannot afford to meet capacity requirements for future small cells due to tiny communication capacity. Conventional PTP wireless backhaul costs a lot for installation and operation, albeit with more communication capacity than that of PMP backhaul. Therefore, a need exists for schemes for increasing small cell backhaul capacity in future mobile communication systems.

The above information is presented as background information only to assist with an understanding of the present disclosure. No determination has been made, and no assertion is made, as to whether any of the above might be applicable as prior art with regard to the present disclosure.

SUMMARY

The present disclosure discloses a scheme for operating a PMP wireless backhaul that is easy to install and operate and has a large communication capacity in hierarchical cell mobile communication system.

The present disclosure may lead to minimized interference and maximized communication efficiency by generating transmission/reception beams with a very high antenna gain at a high frequency and communicating signals.

To address the above-discussed deficiencies, it is a primary object to provide, a method for providing a connection with a radio access network via a wireless backhaul comprises determining one of a first state in which a first node connected with the radio access network is operated using all of beams and a second state in which the first node is operated using an beam of the first node determined in the first state as an operation mode of the first node and providing, by the first node, the connection with the radio access network to a radio access node in the determined operation mode.

According to an embodiment of the present disclosure, a method for providing a connection with a radio access network via a wireless backhaul comprises when a second node connected with the radio access network meets a first state transition condition, operating in a first state where all of beams are used to determine an first node connected with the radio access network and an beam based on a signal received through all of the beams and accessing the first node to communicate with the first node.

According to an embodiment of the present disclosure, an apparatus for providing a connection with a radio access network via a wireless backhaul comprises a transceiver communicating with a first node connected with the radio access network and a controller determining one of a first state in which the first node is operated using all of beams and a second state in which the first node is operated using an beam of the first node determined in the first state as an operation mode of the first node and controlling the transceiver so that the first node provides the connection with the radio access network to a radio access node in the determined operation mode.

According to an embodiment of the present disclosure, 32. A second node for providing a connection with a radio access network via a wireless backhaul comprises when the second node connected with the radio access network meets a first state transition condition, a controller operates in a first state where all of beams are used to determine an first node connected with the radio access network and an beam based on a signal received through all of the beams and a transceiver accessing the first node to communicate with the first node.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components, and structures.

DETAILED DESCRIPTION

Figure 1:
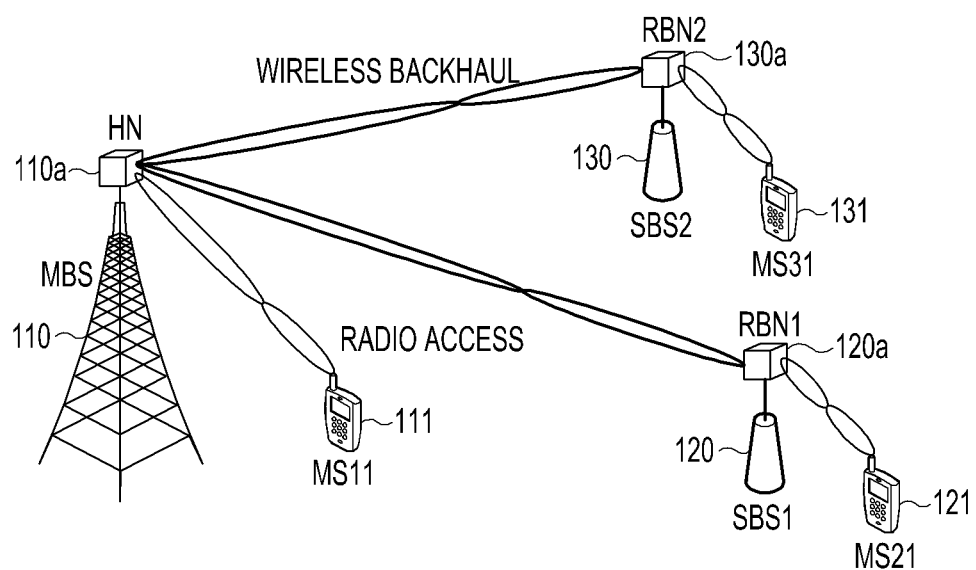
FIG. 1 illustrates an example of a wireless backhaul configuration providing a network connection to a small cell base station (SBS) in a mobile communication system according to an embodiment of the present disclosure.

FIGS. 1 through 34, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

Hereinafter, embodiments of the present disclosure are described in detail with reference to the accompanying drawings. The same reference numerals are used to refer to same elements throughout the drawings. When determined to make the subject matter of the present disclosure unclear, the detailed of the known functions or configurations may be skipped. The terms as used herein are defined considering the functions in the present disclosure and may be replaced with other terms according to the intention or practice of the user or operator. Therefore, the terms should be defined based on the overall disclosure.

According to an embodiment of the present disclosure, a wireless backhaul includes at least one hub node (HN) and at least one remote backhaul node (RBN). Each HN is connected to a network through a wired backhaul or another wireless backhaul and performs wireless backhaul communication with one or more RBNs. According to an embodiment of the present disclosure, the HN uses a point-to-multipoint (PMP) wireless backhaul technology for providing a network connection to a radio access node (RAN) connected with at least one RBN through wireless backhaul communication. Here, the RAN corresponds to a base station (BS) in a mobile communication system and provides a network connection to a mobile station (MS) through mobile communication. According to an embodiment of the present disclosure, such an example is assumed and described that signal communication is conducted using a beamforming antenna generating very narrow beams at a high frequency, e.g., 6 GHz or more.

FIG. 1 illustrates an example of a wireless backhaul configuration providing a network connection to a small cell base station (SBS) in a mobile communication system according to an embodiment of the present disclosure.

Referring to FIG. 1, as an example, an HN 110a is installed together with a macro cell BS (MBS) 110, a RBN1 120a is installed along with a small cell base station 1 (SBS1) 120, and a RBN2 130a is installed along with an SBS2 130. The HN 110a may afford a network connection to the SBS1 120 and SBS2 130 by simultaneously providing wireless backhaul communication to the RBN1 120a and RBN2 130a.

The MBS 110 provides radio access for mobile communication to a MS11 111, and the SBS1 120 and SBS2 130, respectively, provide radio access for mobile communication to terminals, MS21 121 and MS31 131, located in their own service coverage. In FIG. 1, wireless backhaul communication between the HN 110a and the RBNs, i.e., the RBN1 120a and RBN2 130a, may use the same or different frequency than that used for radio access communication between the MBS 110 and MS11 111 or SBS1 120 and SBS2 130 and MS21 121 and MS31 131. When the same frequency is in use, an antenna for wireless backhaul communication and an antenna for radio access communication are rendered to use beams differently oriented, thereby minimizing interference. Further, according to the present disclosure, the wireless backhaul may be implemented based on mobile communication radio access technology using beamforming antennas or based on wireless LAN technology using beamforming antennas. According to an embodiment of the present disclosure, described is an example in which BS installed in HN is a MBS, and base station installed in RBN is an SBS, but the present disclosure may also apply to scenarios in which HN and RBN both are installed in MBS or SBS. Further, the present disclosure may also be applicable likewise where HN is connected to the network via a wired backhaul, as well as were HN is connected to the network by way of another wireless backhaul means.

According to an embodiment of the present disclosure, the wireless backhaul is operated to run in one of two operation states in order to maximize wireless backhaul communication capacity and efficiency while enabling RBN automated installation and operation. According to an embodiment of the present disclosure, the two operation states include a backhaul update state (BUS) and a backhaul optimum communication state (BOCS). The BUS and BOCS both support data communication of the wireless backhaul, but the BOCS offers a much higher communication efficiency. According to an embodiment of the present disclosure, an HN and RBNs configuring the wireless backhaul are operated in the same operation state. In other words, when the HN is operated in the BUS, all of the RBNs connected to the HN to communicate are also operated in the BUS, whereas when the HN is operated in the BOCS, all the RBNs are operated in the BOCS as well.

Figure 2:
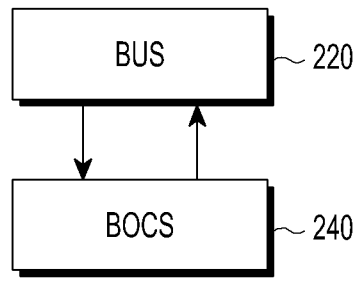
FIG. 2 illustrates an operation state transition of an HN according to an embodiment of the present disclosure.

FIG. 2 illustrates an operation state transition of an HN according to an embodiment of the present disclosure.

Referring to FIG. 2, according to an embodiment of the present disclosure, an HN is operated in one of a BUS 220 and BOCS 240 according to predetermined operation transition conditions.

According to an embodiment of the present disclosure, a first condition (hereinafter, referred to as a BUS transition condition) for the wireless backhaul to transit from BOCS to BUS includes when the network instructs the HN to transit to the BUS to install a new RBN in the wireless backhaul or when the communication environment of the wireless backhaul already installed is varied to result in a decrease in performance. The decrease in performance may include when the HN determines to transit to the BUS upon recognizing that a sharp performance drop or link failure between the HN and RBN occurs, when receiving a request from an adjacent HN due to a deterioration of performance of the RBN connected with the adjacent HN, or when receiving an instruction for transition to BUS from the network. Additionally, the performance decrease may also include when the network instructs a transition to BUS periodically or by the operator's instruction for a performance enhancement in the wireless backhaul. In the case of RBN, there are included the situations where power is on, the link to RBN fails, or the serving HN connected with the RBN makes a state change into BUS. The above-enumerated BUS state transition conditions are described below in further detail.

The wireless backhaul meeting such BUS transition conditions transit into BUS and operate.

A first assumption is made, among others, to the scenario where a new RBN is installed in the wireless backhaul. According to an embodiment of the present disclosure, the wireless backhaul discovers an HN offering the optimal network connection to the new RBN and connects them together.

A next assumption comes into such a scenario that the communication environment of the wireless backhaul already installed varies and reveals a performance down among the BUS transition conditions. Here, when the communication environment of the already installed wireless backhaul undergoes a variation and the wireless backhaul's resultant performance drop encompasses scenarios in which backhaul communication environments of pre-installed RBNs are subjected to a change resulting in a link failure with the serving HN used to be in linkage or a quality deterioration of existing link with the serving HN. According to an embodiment of the present disclosure, the wireless backhaul may discover another HN giving better communication than the HN presently linked with the RBN does and alter serving HNs for the RBN. Or, the wireless backhaul may identify a communication path providing a better communication performance for the same serving HN and change into the identified communication path. In order to vary serving HNs or beams in serving HN, the HN repeatedly transmits a sync signal, common control information and system information twice or more in directions or to locations corresponding to all of the beams the HN provides. The HN finds an optimal beam by conducting beam measurement and training on all of the HN's beams on downlink (DL) and uplink (UL). The HN receives random access preamble or association request signal transmitted from the RBN through all the beams and supports a function of enabling a new RBN or RBN already in connection with other HN to link with the optimal HN. Further, the RBN conducts searching and scanning on all of the HN's beams while in BUS to detect signals transmitted from the HNs and does beam measurement and training on the HNs detected by all of the HNs' own beams on UL and DL to discover the optimal HN and the optimal beam with the optimal HN. It sends a random access preamble or association request signal to the optimal HN and connects to the optimal HN.

According to an embodiment of the present disclosure, a BOCS transition condition of wireless backhaul includes when a new RBN is complete to install or a link-failed RBN successfully links to the network within a predetermined time. The condition also includes when the link-failed RBN fails to link with the network within the predetermined time or when a RBN subjected to a drastic link performance down makes link performance better by varying beams or serving HNs within a predetermined time. Also included is the scenario that the RBN drastically deteriorated in link performance fails to enhance link performance within the predetermined time, and a transition is made as per an instruction from the network. For RBN, such context is also included that the linked serving HN transitions to BOCS.

The wireless backhaul, which meets the BOCS transition condition and thus operates in the BOCS, communicates using the optimal transmission/reception beam and runs to maximize the efficiency and performance of radio resources. For that purpose, according to an embodiment of the present disclosure, the HN operating in the BOCS sends sync signals to the HN's connected RBNs using partially limited beams among all of the HNs' own beams and communicates control information. According to an embodiment of the present disclosure, no operation is supported for the HN to discover the optimal beam while in the BOCS, and if necessary, beam measurement and training are restrictively carried out on only some beams positioned adjacent to the optimal beam discovered in the BUS, thereby updating and tracking the optimal beam. The HN does not allow random access for access to a new RBN or communication of association request signals while in BOCS and does not back up access to the HN of the new RBN or RBN connecting with an adjacent HN.

According to an embodiment of the present disclosure, the RBN does not conduct search or scan for discovering a new serving HN while in the BOCS nor does the RBN performs beam measurement and training for discovering the optimal beam for all the RBN's beams. If necessary, beam measurement and training are limitedly done on some beams adjacent to the optimal beam discovered in the BUS, thereby updating and tracking beams. No procedure (i.e., random access or transmission of an association signal) for accessing the adjacent HN is performed.

Figure 3:
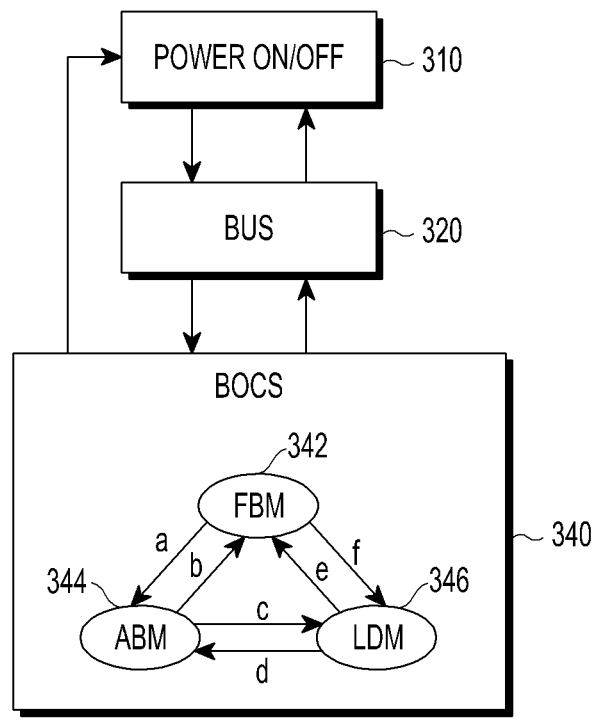
FIG. 3 illustrates a state transition of a RBN according to an embodiment of the present disclosure.

FIG. 3 illustrates a state transition of a RBN according to an embodiment of the present disclosure.

Referring to FIG. 3, according to an embodiment of the present disclosure, the RBN, when powering on in operation 310, transitions to the BUS in operation 320. When meeting the BOCS transition condition while operating in the BUS, the RBN transitions to the BOCS in operation 340. Likewise, upon identifying that the RBN operating in the BOCS meets the BUS transition condition, the RBN transitions back to the BUS.

According to an embodiment of the present disclosure, the RBN may operate in three communication modes to support the optimal communication in the BOCS. Here, the three communication modes correspond to a fixed beam mode (FBM), an adaptive beam mode (ABM), or a low duty mode (LDM). As set forth above, according to an embodiment of the present disclosure, while the HN and RBNs connected with the HN, which configure the wireless backhaul, are operated in the same manner, no separate limitation is imposed on communication mode of RBN operating in the BOCS. Accordingly, a plurality of RBNs connected with the same HN may operate in the same or different communication modes while operating in the BOCS.

According to an embodiment of the present disclosure, in the FBM, HN and RBN communicate using a fixed optimal transmission/reception beam. Thus, the FBM may reduce waste of radio resources for discovering the optimal beam, leading to a maximized use efficiency of radio resources.

When HN and RBN communicate using a fixed beam as in the FBM, the antennas of HN or RBN may be vibrated by an influence from the external environment, such as strong wind gust, while in communication, resulting in performance deterioration. According to an embodiment of the present disclosure, HN or RBN in the ABM limitedly conducts beam measurement and training although using the same frame structure as that used in the FBM. As such, beam measurement and training are limitedly performed on some beams adjacent to the fixed optimal beam, thereby enabling use of the optimal beam updated considering external environment.

However, wireless backhaul communication environments, mostly, are not affected a lot by external environment and requiring operating in the ABM is infrequent. Thus, according to an embodiment of the present disclosure, the wireless backhaul in the BOCS may have a default communication mode set to basically operate in the FBM 342 as shown in FIG. 3. Upon determining that a beam change is required due to, e.g., influence from external environment, the wireless backhaul transitions and operates in the ABM 344. When it is identified that there is no influence from external environment, the wireless backhaul transitions and operates in the FBM 342. Lastly, when there is no terminal linked to a BS installed in the RBN or an active terminal is among terminals linked to the BS, the BS may transition and operate in the LDM 346 where signal communication is minimized. In such case, the RBN may also transition to the LDM, minimizing the RBN's power consumption and interference with other wireless backhaul. When recognizing the case where normal communication needs to be performed for the BS in the LDM 346, a switch may be made into the FBM 342 or AMB 346 and wireless backhaul communication may be carried out. Here, specific conditions for switching into each communication mode are described below in detail. The RBN operating in the LDM according to the present disclosure sends backhaul alive (BA) bits or information to the RBN's serving HN at a period previously agreed to, thereby periodically reminding the serving HN that the wireless backhaul link is not disconnected but alive. Accordingly, the HN identifies the reception of BA bits or information at each period for the RBN operating in the LDM. When the result of identification reveals that no BA bit or information is received from the RBN at the period, it may be identified that a link failure occurs on the RBN, and the wireless backhaul may be swiftly restored for the disconnected link.

Figure 4:
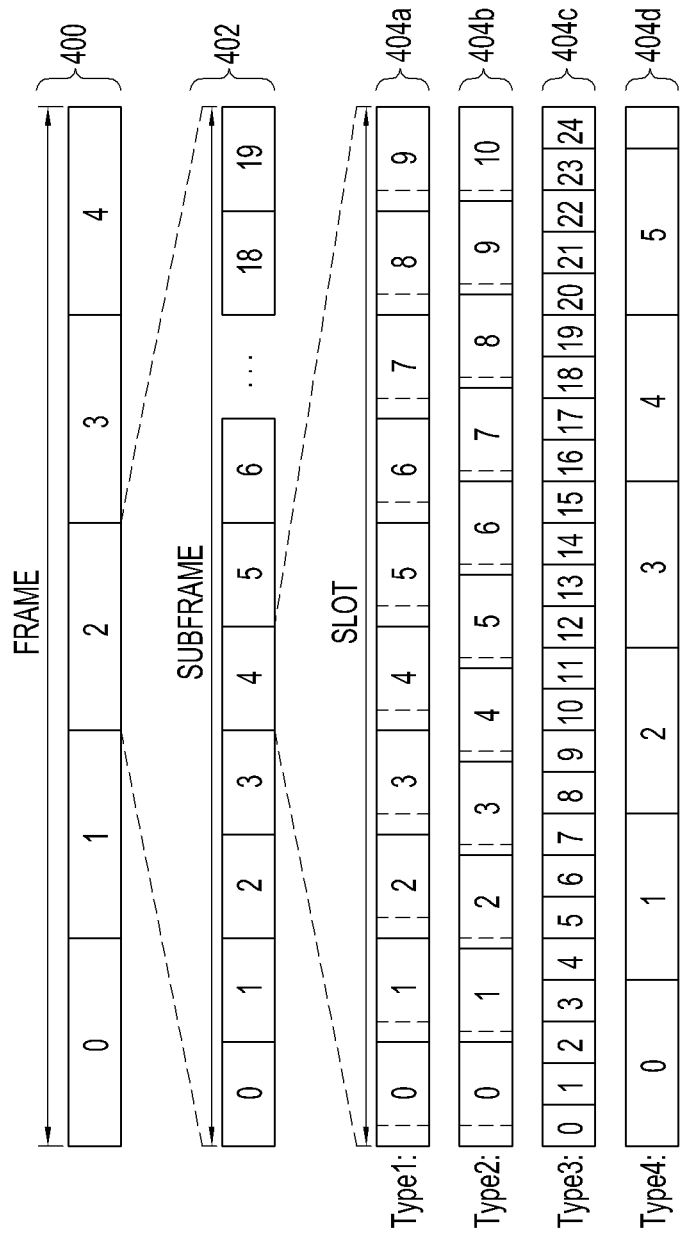
FIG. 4 illustrates an example of a frame structure according to an embodiment of the present disclosure, wherein according to an embodiment of the present disclosure, the exemplified frame structure is one used for cellular mobile communication, for ease of description.

FIG. 4 illustrates an example of a frame structure according to an embodiment of the present disclosure, wherein according to an embodiment of the present disclosure, the exemplified frame structure is one used for cellular mobile communication, for ease of description.

For example, it is assumed that according to an embodiment of the present disclosure, HN and RBN each send and receive signals through frames having a fixed size through beamforming. In such case, the frame includes multiple subframes with a fixed length. Each of the multiple subframes includes multiple slots with a fixed length, and one slot includes multiple symbols. Referring to FIG. 4, for example, the frame 400 includes five subframes, and one subframe 402 includes 20 slots. One slot may have a different number of symbols and a different structure depending on the slot's type. For example, assuming that the frame 400 is 5 ms long, one subframe 402 is 1 ms long, and one slot is 50 us long. The number and structure of symbols constituting one slot may be varied depending on the type of slot. In the embodiment shown in FIG. 4, a type 1 slot 404a includes ten 5 us-long symbols constituted of a 4 us-long information interval and a 1 us-long cyclic prefix (CP) or protection interval. A type 2 slot 404b includes eleven symbols each of which has the same length of information interval, 4 us. However, symbol 0 is 5 us long, and the symbol 0's CP is 1 us long. Symbols 1 to 10 all are 4.5 us long and their CP is 0.5 us long. A type 3 slot 404c includes 25 symbols, each being 2 us long, without a CP. A type 4 slot 404d includes 6.25 symbols, each being 8 us long, without a CP. When receiving symbols including CPs during downlink and uplink communication, HN and RBN receive only information intervals except the CPs.

According to an embodiment of the present disclosure, a frame on DL where HN sends a signal to RBN as shown in FIG. 4 may distinctively include an SS and BCH slot for transmitting a synchronization signal (SS) and shared control information (e.g., broadcast channel (BCH)), a beam measurement (BM) slot, a control slot, and a data slot. Further, the frame on UL where RBN sends a signal to HN may distinctively include a random access channel (RACH) slot, a BM slot, a control slot, and a data slot. Here, although the size of subframe and slot remains unchanged, the number and combination of slots selected to constitute one subframe may be varied by communication environments, such as the number of antennas of HN and RBN, the number of beams of the antennas, and the number of RBNs. It is now assumed that according to an embodiment of the present disclosure each frame includes at least one SS and BCH slot and at least one downlink control slot.

According to an embodiment of the present disclosure, the frame structure may support frequency division duplex (FDD) schemes in which DL and UL communication is simultaneously performed at different frequencies, respectively, as well as time division duplex (TDD) schemes in which the same frequency but different time slots are used. Although FDD schemes have the same frame structure for both DL and UL, the FDD schemes may have different selections and combinations of slots constituting the frame. For example, TDD schemes may assign some slots in each subframe in the given frame structure to DL communication and the remaining slots to UL communication and may designate one or two slots, as a protection interval, during a transmission-reception switch between DL and UL. As a specific example, slots 0 through 11 may be assigned to DL communication, and slots 13 through 19 to UL communication, and slot 12 may be set aside as a protection interval.

Figure 5:
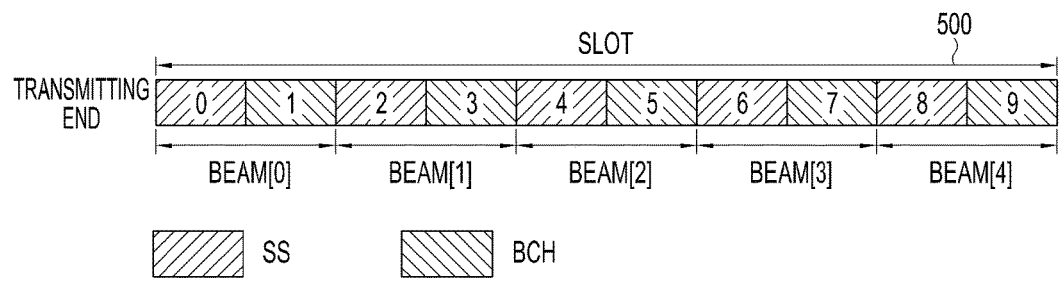
FIG. 5 illustrates an example of configuring an SS and BCH in a frame according to an embodiment of the present disclosure.

FIG. 5 illustrates an example of configuring an SS and BCH in a frame according to an embodiment of the present disclosure.

Referring to FIG. 5, according to an embodiment of the present disclosure, the SS and BCH slot are positioned in areas designated as minimum units for transmitting SS and BCH in one slot 500 having a fixed length constituting a frame. Here, in order for the transmitting end to be able to receive SS and shared control information, the SS and shared control information are repeatedly transmitted per antenna beam in the SS and BCH slot. For example, when slot 1 in subframe 0 of FIG. 4 is the SS and BCH slot, the transmitting end transmits SS and shared control information in a fixed way in slot 1 of subframe 0 included in each frame. Here, when the transmitting end comes up with a total of five beams, SS and shared control information in beam [0] using symbols 0 and 1, SS and shared control information in beam [1] using symbols 2 and 3, and SS and shared control information in beam [2] using symbols 4 and 5 are repeatedly sent. In order for the receiving end to identify what number of transmission repetition SS and shared control information is received at, information indicating the number of transmissions may be included and transmitted in either the SS or shared control information. Here, the number of SS and BCH slots may be configured to correspond with the number of transmission beams owned by the transmitting end. It is assumed that while the number of SS and BCH slots in a frame may be variably configured, the position of the first slot at which the SS starts to be sent is fixed in the frame, and the SS and BCH slots are consecutively present. For example, it is assumed that SS and shared control information are intended to be sent using ten transmission beams. In such scenario, two slots, i.e., slots 1 and 2, may be allotted as the SS and BCH slots in subframe 0. Further, when HN further narrows beam width and increases the number of beams in order to obtain a higher beam gain, the HN needs to repeatedly send SS and BCH slots corresponding to the increased number of beams. For example, when HN uses 60 transmission beams, SS and BCH slots need to be transmitted twelve times.

Figure 6A:
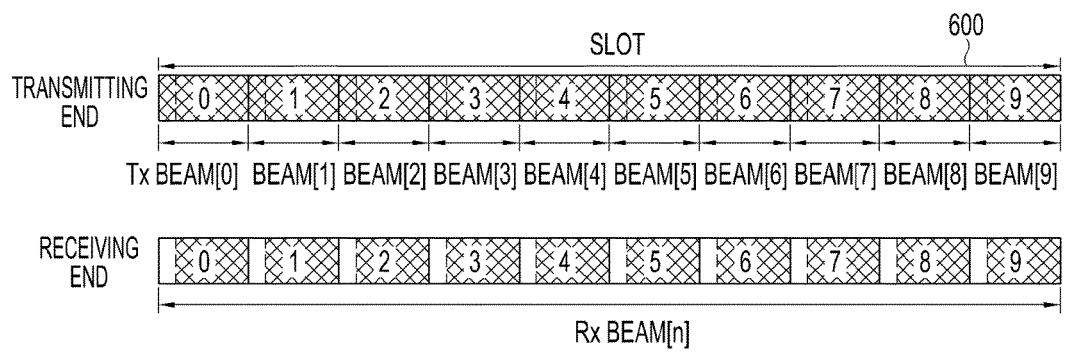
FIGS. 6a and 6b illustrate examples of configuring a DL control slot and UL control slot in a frame according to an embodiment of the present disclosure.
Figure 6B:
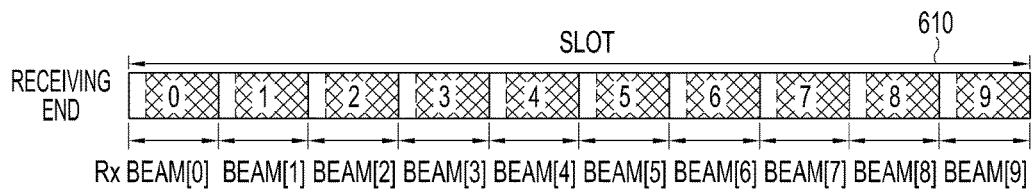

FIGS. 6a and 6b illustrate examples of configuring a DL control slot and UL control slot in a frame according to an embodiment of the present disclosure.

Referring to FIG. 6a, according to an embodiment of the present disclosure, the DL control slot and UL control slot each are positioned in an area designated as a minimum unit for transmitting DL control information in one slot having a fixed length constituting a frame. For example, the DL control slot is positioned in an area designated as a minimum unit in a slot 600, and the UL control slot is positioned in an area designated as a minimum area in a slot 610. In the FDD scheme, slot 0 in each subframe may be designated as DL control slot and UL control slot, and in the TDD scheme, slot 0 in each subframe may be designated as DL control slot, and slot 13 as UL control slot. In the above DL/UL control slots, each symbol may be allotted for a different RBN than those of the other symbols in the control slot, and HN may use a different DL transmission beam or UL reception beam at each symbol. Specifically, in the embodiment shown in FIG. 6, ten symbols may be transmitted in one control slot 600, thereby enabling transmission of control symbols with up to ten HN beams. In FIG. 6a, HN sequentially sends the ten symbols constituting the DL control slot through up to ten transmission beams. Each RBN receives all the symbols of the DL control slot through the optimal reception beam and receives control information for each RBN among all the symbols of the DL control slot. Further, in FIG. 6b, HN sequentially receives the ten symbols of the UL control slot through up to ten reception beams, and each RBN sends a UL control symbol to HN using each RBN's optimal transmission beam at a time corresponding to the symbol assigned to the RBN.

Figure 7:
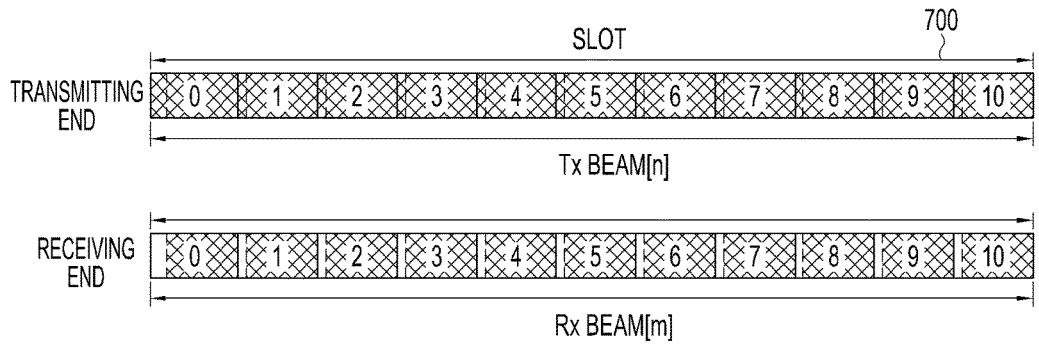
FIG. 7 illustrates an example of configuring a DL and UL data slot in a frame according to an embodiment of the present disclosure.

FIG. 7 illustrates an example of configuring a DL and UL data slot in a frame according to an embodiment of the present disclosure.

Referring to FIG. 7, according to an embodiment of the present disclosure, an example is shown in which eleven symbols are transmitted and received through one slot 700 having a fixed length constituting a frame in order to raise transmission efficiency in DL/UL data slots. According to another embodiment, ten symbols may also be used through the slot 700. According to an embodiment of the present disclosure, HN and RBN do not change beams upon transmission or reception of symbols in their respective corresponding data slots and the HN and RBN may change beams only at the moment that a slot begins. HN and RBN, upon reception of a corresponding data slot, eliminate the CP from each symbol while receiving the information interval of signal, thereby receiving data.

Figure 8:
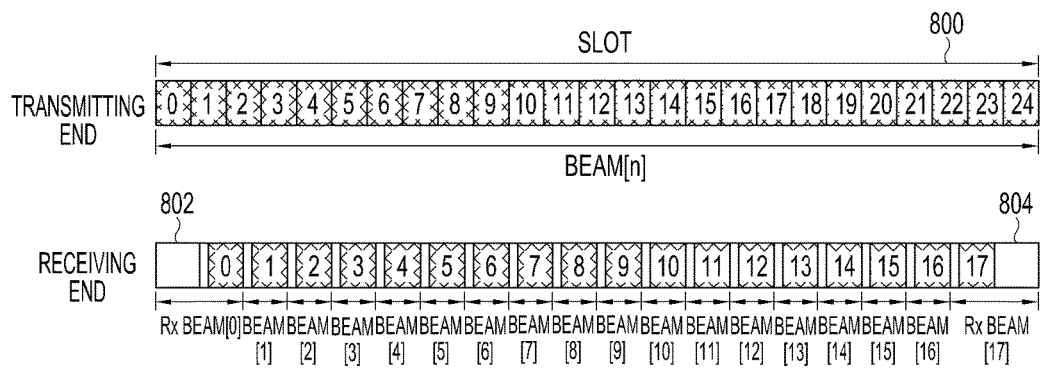
FIG. 8 illustrates an example of configuring a BM slot in a frame according to an embodiment of the present disclosure.

FIG. 8 illustrates an example of configuring a BM slot in a frame according to an embodiment of the present disclosure.

Referring to FIG. 8, an embodiment of configuring a BM slot is shown in which symbols each being 2 us long and without CP are repeatedly transmitted in one slot 800 having a fixed length and constituting each frame. On DL, HN sends the BM slot of FIG. 8 in fixed transmission beams, and RBN switches reception beams, e.g., in 2.5 us-long units. RBN assigns the foremost 0.5 us interval 802 as a protection interval for beam switching while receiving the remaining 2 us-long signal to measure the power of the transmission/reception beam combination. Further, the same HN may form a plurality of beams with a plurality of antennas to simultaneously transmit a plurality of BM signals, and the same HN's other neighbor HNs may also transmit BM slots in the BUS at the same time. In such case, RBN may be able to receive, without interference, the BM signals simultaneously transmitted from the plurality of HNs and the antennas of the HNs. In particular, when the multiple neighbor HNs are not temporally synced with each other or have different distances from RBN and resultantly different propagation times, the multiple BM slots received by RBN may fail to sync and cause interference. In order to prevent such interference, according to an embodiment of the present disclosure, RBN may exclude the head 802 and the 2.5 us end 804 of the BM slot from use in BM like in the embodiment shown in FIG. 8. As a result, in the FIG. 8 embodiment, measurement may be made on one transmission beam and 18 reception beams. On DL, HN repeatedly sends the BL slot while sequentially switching the transmission beams for all the HN's transmission beams. Thus, when on DL HN has NHN transmission beams, and RBN has NRBN reception beams, completion of one-time BM for all transmission/reception beam combinations with the BL slot shown in FIG. 8 requires NHN [NRBN/18]up BM slots. Here, [X]up denotes a minimum one among natural numbers equal or larger than X. For example, when HN and RBN each have 60 beams, transmission/reception of 60*[60/18]up=60*4=240 BM slots is required to perform one-time measurement on all transmission/reception beam combinations.

In the case of UL BM, RBN sends BL slot in fixed beams, and HN receives signals while switching reception beams as shown in FIG. 8, thereby measuring receive power on transmission/reception beam combination. In such case, HN may be able to receive, without interference, the BM signals simultaneously transmitted from the plurality of RBNs and the antennas of the RBNs. The same principle detailed above for DL BM applies to UL BM, and no further description is given. Further, it may also be possible in UL BM to measure beams by receiving BM slot in fixed beams while switching transmission beams in the slot, rather than transmitting BM slot in fixed beams and switching reception beams in the slot.

Figure 9:
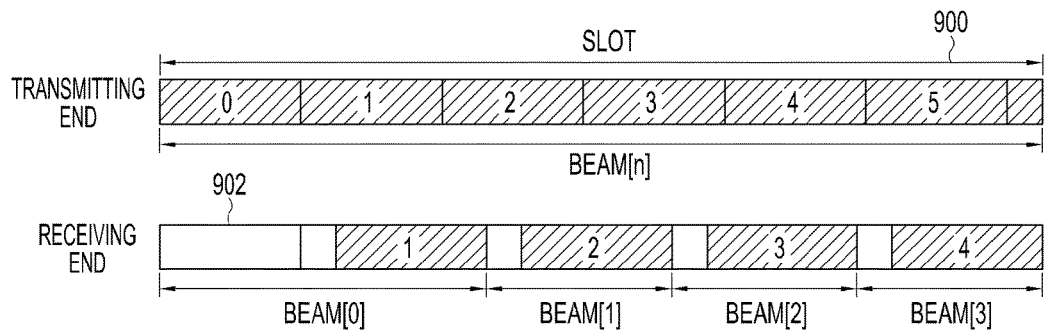
FIG. 9 illustrates an example of configuring a UL RACH slot in a frame according to an embodiment of the present disclosure.

FIG. 9 illustrates an example of configuring a UL RACH slot in a frame according to an embodiment of the present disclosure.

FIG. 9 shows an embodiment of configuring a RACH slot, in which RACH preamble symbols each being 8 us long and without CP are repeatedly transmitted 6.25 times in one slot 900 having a fixed length constituting a frame. On UL, RBN sends the RACH slot using fixed transmission beams. On UL, HN may repeatedly detect RACH frame signals while varying reception beams, e.g., four times, as shown in FIG. 9. HN receives the RACH slot in beam [0] and uses the 8 us+2.5 us=10.5 us head 902 of the RACH slot as a protection interval without detecting signal and detects the RACH preamble for the next 8 us-long signal. HN then switches the reception beam into beam [1] and receives an 8 us-long signal after the 2.5 us-long protection interval to detect the RACH preamble. Likewise, HN sequentially switches the reception beam into beam [2] and beam [3] and receives an 8 us-long signal subsequent to the 2.5 us-long protection interval in each beam to detect the RACH preamble. According to an embodiment of the present disclosure, HN may detect a round trip delay up to 8 us through the RACH slot structure and establish a UL frame sync for RBNs located within a distance up to 1.2 km. In the embodiment shown in FIG. 9, the RACH slot does not back up RACH signal detection for four HN reception beams in each slot. Thus, in order to detect a RACH signal with more reception beams, more RACH slots as much may be allocated. For example, when HN detects a RACH signal with 60 reception beams, 15 RACH slots may be allocated.

According to an embodiment of the present disclosure, HN and RBN may conduct wireless backhaul communication using slots in a frame as configured above. According to an embodiment of the present disclosure, various combinations may be possible for the above-described slots depending on antennas and beam environments used by HN and RBN, number of RBNs, radio channel state or other various communication environments, or necessary communication functionality and capability. As such, in order to select different slot combinations according to the need in frame, the frame structure sends control and system information over several distinct stages. In order to communicate with HN, RBN may first receive SS and BCH slot to establish synchronization and receive shared control information. Here, the shared control information contains shared information that needs to be known to RBN to establish frame synchronization with HN and to receive signals. For example, the shared information may include information on the position or order of shared control information symbol in frame, information on physical identifier and global identifier of HN, system frame number (SFN), information differentiating operation states (i.e., BUS or BOCS) of HN, number of SS and BCH slots per frame, number of antennas used by HN, number of beams per antenna of HN, duplex information such as TDD or FDD, or signal bandwidth information.

According to an embodiment of the present disclosure, the DL/UL control slot may contain physical layer control information and other short control information necessary for HN to conduct DL and UL wireless communication with RBN. For example, such information may include radio resource allocation-related information on data or data slots communicated between HN and each RBN, such as physical downlink control channel (PDCCH) set forth in 3GPP LTE standards, modulation and code scheme (MCS) information, information on antennas and antenna techniques used by HN, power control information, paging-related information, and RACH-related information. Further, as information corresponding to 3GPP LTE physical control format indicator channel (PCFICH), information on the number of DL/UL control slots allotted to each subframe in the frame may be included as well. Further, as UL physical control information necessary for communication between HN and RBN, such as 3GPP LTE physical uplink control channel (PUCCH), channel state information (CSI), hybrid automatic repeat request (ARQ) Ack/Nack information, and scheduling request (SR) information may also be included. Further, other additional short control information may be included, such as information on transmission/reception beam being used or which to be switched into by HN and RBN, or information (backhaul status information (BSI)) indicating the status of wireless backhaul of RBN operating in LDM of BOCS, or other short control information for HN to control wireless communication of RBN.

According to an embodiment of the present disclosure, the DL/UL data slot includes data transferred between HN and RBN through DL and UL wireless communication. In other words, all user data and control information communicated between BS installed in RBN and network through HN are transmitted and received in data slots. Various higher layer control information between HN and RBN which are necessary for wireless communication between HN and RBN may also be included. Further, the data slot may include various system information (SI) that needs to be known for RBN to access and communicate with HN. For example, included are information corresponding to various SI defined in 3GPP LTE standards, detailed information on DL and UL BM and use of beams, and other system information necessary for operating in BUS or BOCS.

The following Table 1 represents slots, signals, or information transmitted and received in the BUS and BOCS when HN and RBN constituting a wireless backhaul according to the present disclosure perform wireless backhaul communication using the frame architectures described above in connection with FIGS. 4 to 9.

Table 1 shows signals and information communicated in communication mode and operation state of wireless backhaul according to an embodiment of the present disclosure

TABLE 1

| Slot/signal/information types | Operation mode (BUS) | Operation mode (BOCS) | | |
| --- | --- | --- | --- | --- |
| | | Communication mode (FBM) | Communication mode (ABM) | Communication mode (LDM) |
| DL SS/BCH slot | full coverage | Optimal beam | Optimal beam | Optimal beam & scheduling |
| UL RACH slot | full coverage | X | X | X |

TABLE 1-continued

| | Operation | Operation mode (BOCS) | | |
|---|---|---|---|---|
| Slot/signal/information types | mode (BUS) | Communication mode (FBM) | Communication mode (ABM) | Communication mode (LDM) |
| DL/UL BM slot | Full | X | Limited | X |
| DL/UL control slot | ○ | ○ | ○ | Scheduling |
| DL/UL data slot | ○ | ○ | ○ | X |

Table 2 below represents various operations and functions supported by wireless backhaul in the BUS and BOCS according to an embodiment of the present disclosure.

TABLE 2

| | | Operation mode (BOCS) | | |
|---|---|---|---|---|
| Operations and functions | Operation mode (BUS) | Communication mode (FBM) | Communication mode (ABM) | Communication mode (LDM) |
| HN searching | ○ | X | X | X |
| Network entry/handover | ○ | X | X | X |
| Beam training | Full | X | Limited | X |
| control information | Broadcast/dedicated | Dedicated | Dedicated | Scheduling & dedicated |
| Data | ○ | ○ | ○ | ○ |

Referring to Table 1 above, according to an embodiment of the present disclosure, HN and RBN constituting a wireless backhaul, when operating in the BUS, uses all of the frame including an SS and BCH slot, UL RACH slot, DL/UL BM slot, DL/UL control slot, and data slot and supports all functions for mobile communication between a BS and MS on a mobile communication system. HN operating in the BUS sends the DL SS and BCH slot for the HN's full coverage for RBNs to sync with the HN at all positions in the HN's coverage and receives HN's shared control information and system information. Here, HN includes and transmits, in the shared control information, information indicating that the HN's operation mode is the BUS. Since HN uses a narrow beam, the HN repeatedly sends the signal while varying transmission beams in order to send the signal for the HN's full communication coverage. RBN operating in the BUS receives neighbor HNs' SS and shared control information as well as that of the RBN's serving HN and performs searching and scanning on HN to discover an HN providing the optimal communication quality.

Further, HN operating in the BUS receives the UL RACH slot assigned for all of the RBNs positioned in the HN's coverage to establish UL synchronization with the HN and perform UL communication. HN repeatedly assigns RACH slots while switching reception beams and receives signals from a corresponding RBN in order to receive RACH slot regardless of the position of RBN located in the HN's coverage. Referring to Table 2, HN receives, in the BUS, RACH signals from a RBN positioned in a neighbor HN and a new RBN as well as a RBN positioned in the HN's coverage to support UL sync, network entry (attach), and handover. RBN operating in the BUS may send a RACH signal to the serving HN to establish a UL sync and sends a RACH signal to a neighbor HN, rather than the RBN serving HN, to link or hand over to the neighbor HN.

As shown in Table 1 above, HN and RBN operating in the BUS conduct BM and training on all transmission/reception beam combinations on DL and UL to select the optimal transmission/reception beam combination on DL and UL each. Based on the BM result of selecting the optimal transmission/reception beam combination, each RBN may determine the optimal HN offering the optimal service quality to the RBN. For example, assuming that HN and RBN each uses 60 beams, one-time BM on DL and UL for all transmission/reception beam combinations requires 60*[60/18]up=60*4=240 BM slots. Here, since wireless backhaul communication is done when HN and RBN both are located stationary, the time restriction for completing BM is not that strict unlike on mobile communication. Thus, e.g., when one slot is allocated per subframe constituting a frame for BM on DL and UL, one time of BM may be done at a time of 240 subframes, i.e., 240 ms. When HN sends SS and BCH slot with 60 transmission beams, 12 DLs lots need to be assigned for SS and BCH slot per frame. From above, it can be seen that significant waste of radio resources occurs. Here, waste of radio resources may be reduced by decreasing the number of beams used for the SS and BCH slots, but RBN may fail to communicate with HN due to a sync failure. Further, reception of 60 beams for RACH slot requires 15 uplink RACH slots to be allocated.

SI of a new HN is needed for RBN operating in the BUS to access and communicate with the new HN. Such SI is transmitted through the DL/UL data slot. Accordingly, a corresponding RBN may be able to receive the SI in the full coverage regardless of the position of the RBN located in the HN coverage as the HN does on shared control information. Thus, although data is transmitted using a fixed transmission beam in the DL/UL data slot, when SI is included as shown in Table 1, transmission beams provided to be sent in the full coverage are switched and repeatedly transmitted. Likewise, since radio resource allocation information on the SI maybe transmitted in the full coverage of HN, the DL/UL control slot containing the radio resource allocation information switches and repeatedly transmits transmission beams provided to be transmitted in the full coverage.

Referring to Table 1 above, according to an embodiment of the present disclosure, when the wireless backhaul is operated in the BOCS, HN and RBN supports only some of the functions supported by the mobile communication system. Accordingly, HN and RBN operating in the BOCS each use the optimal beam for transmission/reception of UL/DL control slot and data slot. Further, upon transmission of DL SS and BCH slot, HN does not broadcast in the HN's full coverage but sends them to only RBNs currently linked thereto. As possible, the HN sends signals with a minimum number of beams. Further, HN operating in the BOCS sends the HN's SI to a corresponding RBN only once or when required. Referring to Table 2 above, RBN operating in the BOCS receives the sync signal from only serving HN but not from neighbor HN. Nor does the RBN perform searching and scanning on neighbor HN.

Referring to Table 1, according to an embodiment of the present disclosure, when the wireless backhaul operates in the BOCS, the wireless backhaul does not support UL RACH transmission/reception and thus does not assign a UL RACH slot. Referring to Table 2, HN operating in the BOCS does not support handover or access for new RBNs or RBNs belonging to a neighbor HN nor does the HN support RACH transmission/reception for RBNs linked thereto. Likewise, RBN operating in the BOCS does not send a RACH signal for updating UL sync with the serving HN and does not send RACH signals to neighbor HNs. Further, the RBN does not support DL and UL measurement and training on all of the beams of HN and RBN. Nor does the RBN support BM and training on neighbor HNs. As shown in Table 1, no BM slot is assigned to RBNs operating in the FBM and LDM of the BOCS, and BM and training are not supported. However, RBN operating in the ABM conducts limited BM and adaptation using some candidate beams adjacent to the optimal transmission/reception beam discovered in the BUS for the serving HN. HN and RBN operating in the FBM and ARM of the BOCS communicate data and control information using the optimal beam to provide wireless backhaul communication, and HN and RBN operating in the LDM communicate control information at a time previously agreed on. Further, HN sends a sync signal to RBN operating in the LDM only at times previously agreed on, and RBN operating in the LDM abstains from transmission/ reception of data slot.

Figure 10:
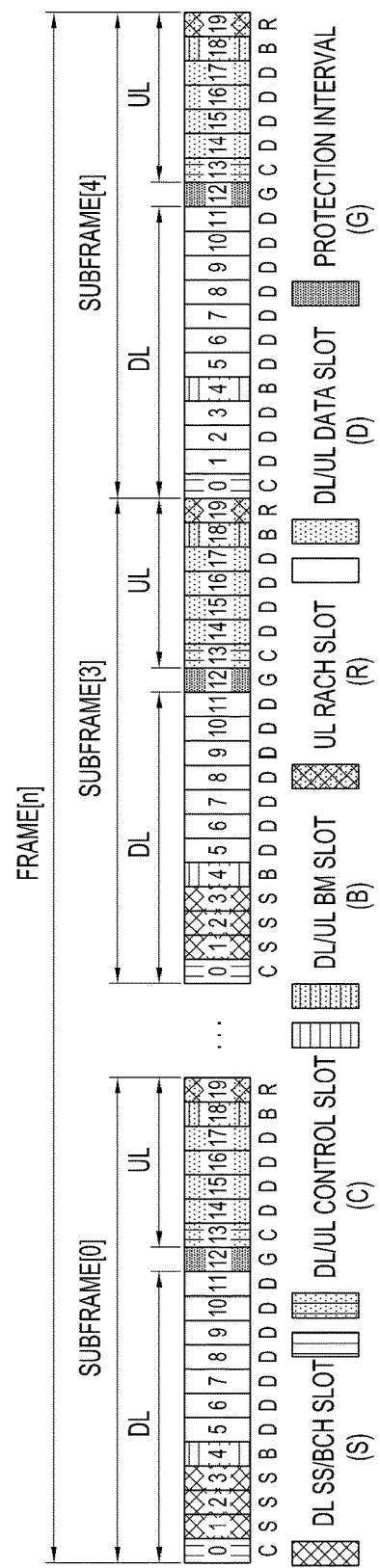
FIG. 10 illustrates a frame structure when an HN and RBN configuring a wireless backhaul are operated in a BUS according to an embodiment of the present disclosure.
Figure 11:
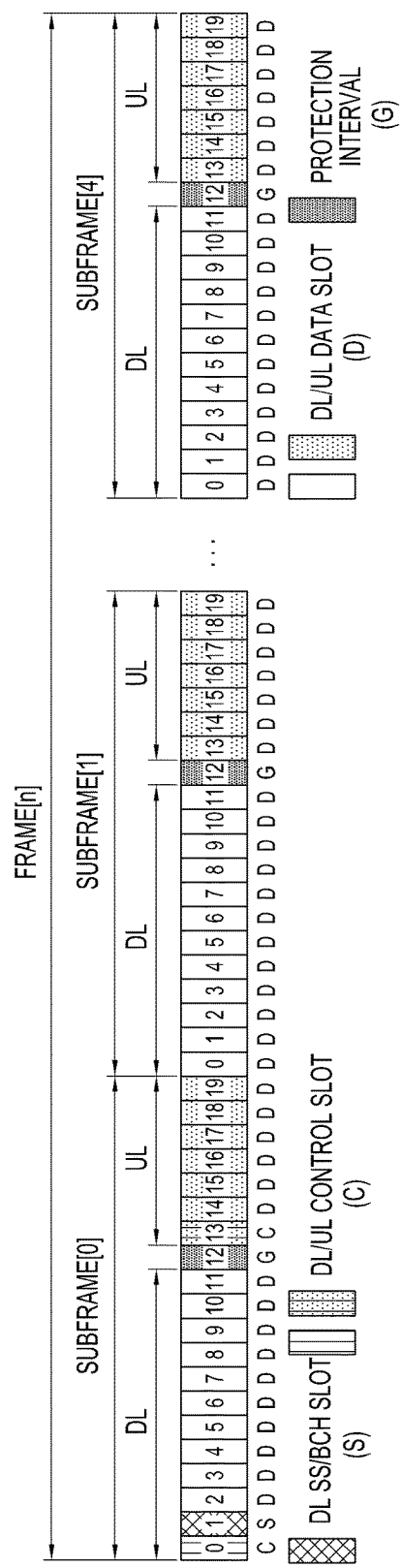
FIG. 11 illustrates a frame structure when an HN and RBN configuring a wireless backhaul are operated in a BOCS, and the communication mode is an FBM according to an embodiment of the present disclosure.
Figure 12:
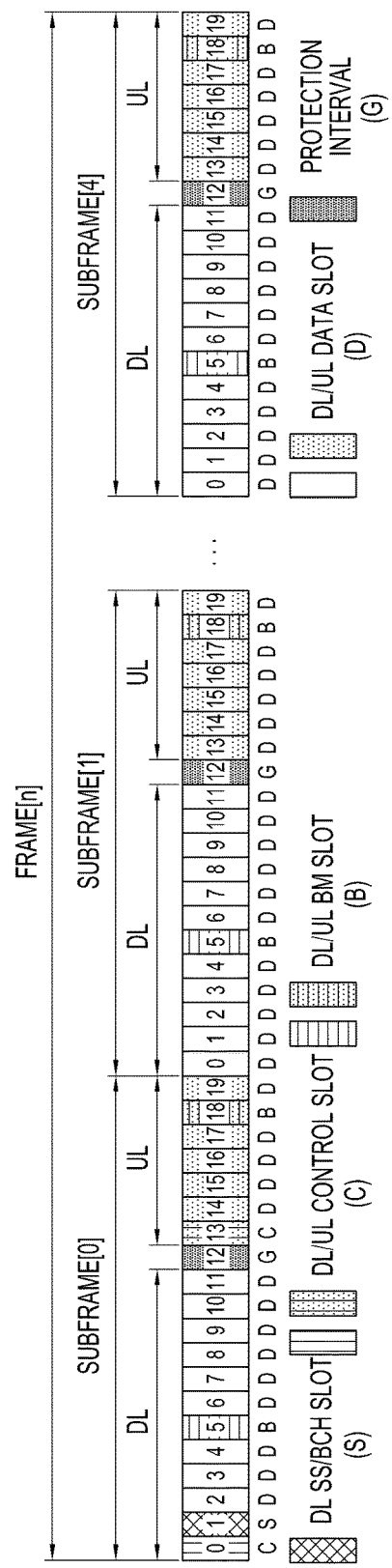
FIG. 12 illustrates a frame structure when an HN and RBN configuring a wireless backhaul are operated in a BOCS, and the communication mode is an ABM according to an embodiment of the present disclosure.

FIGS. 10 to 12 illustrate examples of frame structures according to operation modes of wireless backhaul according to embodiments of the present disclosure. For ease of description, it is assumed that, based on a TDD scheme, a total of 12 slots, i.e., slot 0 through slot 11, are allocated to DL communication in each subframe, and a total of seven slots, i.e., slot 13 through slot 19, are allocated to UL communication. Slot 12 is assigned as a protection interval. Thus, a total of 60 slots and a total of 35 slots are assigned to DL and UL, respectively, per frame through the five subframes.

FIG. 10 illustrates a frame structure when an HN and RBN configuring a wireless backhaul are operated as BUSs according to an embodiment of the present disclosure.

Referring to FIG. 10, HN operating in the BUS assigns slot 0 and slot 13 to DL and UL control slot, respectively, per subframe, as an example. For example, assuming that HN transmits SS and BCH symbols using 60 beams, a total of 12 slots are needed. To that end, in the embodiment shown in FIG. 10, a total of 12 slots are assigned as SS and BCH slots through slots 1 to 3 of each of four subframes, i.e., subframes 0 to 3. Further, slot 4 in each subframe is assigned as a BM slot. HN sends BM slots while switching the HN's beams at a period of 12 frames each constituted of five subframes or 60 subframes corresponding to the number of the HN's beams. Here, when RBN performs BM measurement using 60 reception beams, one time of BM requires 240 ms for all transmission/reception beam combinations on DL.

Meanwhile, in the embodiment shown in FIG. 10, slot 18 in each subframe is assigned as a UL BM slot. Further, slot 19 in each subframe is assigned as a UL RACH slot. Here, assuming that HN detects RACH preamble with four reception beams for one RACH slot, the HN may detect RACH preamble using 20 reception beams per frame. Thus, HN needs a total of three frames to detect RACH preamble using 60 beams. As described above in connection with Table 1, HN operating in the BUS, when sending SI through the DL data slot, repeatedly sends the DL data slot while switching the beams. Upon sending radio resource allocation information on SI through DL control slot, the HN may repeatedly send the DL control slot while switching the beams in the same way. The amount of SI to be sent by HN may vary depending on system implementations. When estimated based on the embodiment shown in FIG. 10, it may be regarded for SI of HN that data slot transmitted through slots 1 to 3 of subframe 4 are assigned for transmission of SI. Then, data slots used only for data communication in the embodiment of frame structure shown in FIG. 10 include 35 slots on downlink and 20 slots on uplink for each frame.

FIG. 11 illustrates a frame structure when an HN and RBN configuring a wireless backhaul are operated as BOCSs, and the communication mode is an FBM according to an embodiment of the present disclosure.

Referring to FIG. 11, HN and RBN operating in the FBM, both, are located at fixed positions, and communication channel remains substantially unchanged, and such environment thus requires a very small amount of control information. Accordingly, HN operating in FBM assigns, e.g., slots 0 and 13 of subframe 0, as DL and UL uplink control slots, respectively, but does not assign control slots to the other subframes in the frame.

Further, since the FBM uses only fixed optimal beam between HN and RBN upon transmission of SS and BCH symbols, the number of slots requires is also very small. Accordingly, in the embodiment shown in FIG. 11, SS and BCH slot are assigned to only slot 1 of subframe 0. Further, the FBM makes no allocation of BM slot and UL RACH. Thus, in the frame structure according to the embodiment shown in FIG. 11, as data slots used purely for data transmission, a total of 58 slots on DL and a total of 34 slots on UL may be used in each frame. As compared with the embodiment shown in FIG. 10, it can be identified that performance of data transmission is enhanced by about 65% and about 70% for DL and UL, respectively.

FIG. 12 illustrates a frame structure when an HN and RBN configuring a wireless backhaul are operated as BOCSs, and the communication mode is an ABM according to an embodiment of the present disclosure.

Referring to FIG. 12, the ABM performs DL/UL BM that is not done in the FBM. DL/UL BM performed in the AMB is limited for some adjacent beams of the optimal beam determined in the BUS, and thus, it may be conducted more rapidly as compared with the BM period of BUS. For example, it is assumed that HN operating in the ABM conducts BM on five candidate beams with the existing optimal beam selected for each of four RBNs. In such case, HN performs BM on a total of 4×5=20 candidate beams. Further, it is assumed for RBN that BM is measured on nine candidate beams with the existing optimal beam selected, for example. In such case, DL beam measurement period for HN is reduced to $20*[9/18]_{up}=20*1=20$ ms. Assuming that BM is simultaneously performed on UL for each of the four RBNs, BM period is down to $9*[20/18]_{up}=9*2=18$ ms, and when BM is sequentially measured on the four RBNs, the period is down to $4*9*[5/18]_{up}=4*9*1=36$ ms. When the BM measurement period is unnecessarily short as compared with the antenna vibration speed, resource waste may be reduced by decreasing the number of BM slots and increasing the BM period. For example, in the embodiment shown in FIG. 12, only one slot, as BM slot, is assigned per subframe. Accordingly, four more slots may be utilized as data slots per frame, leading to increased efficiency. Although BM period is increased to 100 ms, 90 ms, and 180 ms, which are five times as much as that when four slots come in use, a much shorter time may be taken as compared with the BM period in the BUS, i.e., 240 ms. According to another embodiment, when HN operating in the BOCS conducts wireless backhaul communication with multiple RBNs, and BM is required only for HN and some RBNs, HN sends or receives BM slot for the RBNs requiring BM in fixed beams, and only RBNs which are intended to do BM, do so.

According to another embodiment, when HN operating in the BOCS conducts wireless backhaul communication with multiple RBNs, and HN alone requires BM but the RBNs don't, HN sends or receives BM slot to the RBNs to perform BM, and the RBNs receive or send the BM slot in fixed beams to support HN for BM.

According to another embodiment, when HN operating in the BOCS carries out wireless backhaul communication with multiple RBNs, and at least one of the RBNs is in the LDM communication mode, HN sends SS and BCH symbol for the at least one RBN at a time previously agreed on with the at least one RBN and sends and receives DU/UL control slot symbols. HN communicates signals with RBNs, which are not in the LDM communication mode, using a frame structure as illustrated in FIG. 11 or 12, according to the communication mode of the RBNs. HN does not communicate data slot and BM slot with the at least one RBN operating in the LDM. Further, the at least one RBN operating in the LDM sends BA bit or information to the serving HN in UL control slot at a previously agreed period to periodically remind the serving HN that the wireless backhaul link is not disconnected but remains alive.

Figure 13:
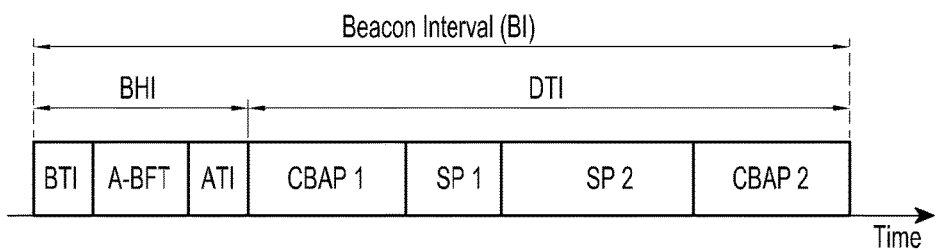
FIG. 13 illustrates an example of an applicable beacon interval (BI) structure according to an embodiment of the present disclosure.

FIG. 13 illustrates an example of an applicable beacon interval (BI) structure according to an embodiment of the present disclosure.

BI in FIG. 13 shows an example of a BI structure as used in IEEE 802.11ad. The IEEE 802.11ad standard defines wireless LAN communication between directional multi-gigabit (DMB) stations (STAs) communicating signals using beamforming antenna at a high frequency, e.g., 60 GHz, and channel access in BI units. Referring to FIG. 13, a BI includes a beacon header interval (BHI) and a data transfer interval (DTI). The BTI includes a beacon transmission interval (BTI), association beamforming training (A-BFT) interval, and announcement transmission interval (ATI). The DTI includes one or more contention-based access periods (CBAPs) and scheduled service period (SP). Personal basic service set control point (PCP)/access point (AP) STA assigns a BI and provides BI allocation information to non-PCP/non-AP STA. BTI is an access interval during which PCP/AP STA sends at least one DMG beacon frame to non-PCP/non-AP STA. Here, beacon frames not only provide a network sync to STA but also transfers BI allocation information, DMG capability information, and information corresponding to the shared control information and SI of mobile communication. A-BFT is an interval during which STAs select the optimal beam by performing beamforming training. ATI exchanges a request frame and response frame for access management on a one-to-one basis with PCP/AP STA or non-PCP/non-AP STA to offer association and disassociation of STA, send a request for service period, or transfer scheduling information. In CBAP of DTI, all STAs have a chance of random data transmission in a carrier sense multiple access with collision avoidance (CSMA/CA) scheme, and in SP, STAs transmits data in a time division multiple access (TDMA) scheme according to PCP or AP's scheduling.

The above-described IEEE 802.11ad standard may be used to implement a wireless backhaul according to an embodiment of the present disclosure. In this case, the following Table 3 represents access intervals supported in the BUS and BOCS when HN and RBN constituting a wireless backhaul according to the present disclosure conduct wireless backhaul communication based on the IEEE 802.11ad standard, and Table 4 represents operations and functions supported by the wireless backhaul according to the present disclosure.

TABLE 3

| | | Operation mode (BOCS) | | |
|---|---|---|---|---|
| BI | Operation mode (BUS) | Communication mode (FBM) | Communication mode (ABM) | Communication mode (LBM) |
| BTI | full coverage | Optimal beam | Optimal beam | Optimal beam |
| A-BFT | ○ | X | X | X |
| ATI | ○ | Optimal beam | Optimal beam | Scheduling |
| DTI CSAB | ○ | X | X | X |
| DTI SP | ○ | ○ | ○ | X |

TABLE 4

| | | Operation mode (BOCS) | | |
|---|---|---|---|---|
| Operations and functions | Operation mode (BUS) | Communication mode (FBM) | Communication mode (ABM) | Communication mode (LBM) |
| Scan | ○ | X | X | X |
| Association/change HN | ○ | X | X | X |

TABLE 4-continued

| Operations and functions | Operation mode (BUS) | Operation mode (BOCS) | | |
|---|---|---|---|---|
| | | Communication mode (FBM) | Communication mode (ABM) | Communication mode (LBM) |
| Beam training Control | Full Broadcast/dedicated | X Dedicated | Limited Dedicated | X Scheduling & dedicated |
| Data | CSMA/TDMA | TDMA | TDMA | X |

Referring to Table 3 above, according to an embodiment of the present disclosure, when wireless backhaul operates in the BUS, the wireless backhaul may support all access intervals as per the IEEE 802.11ad standard and all wireless LAN functionality as per the IEEE 802.11ad standard. According to an embodiment of the present disclosure, wireless backhaul may additionally provide operation mode indication information indicating that the operation mode of wireless backhaul is the BUS in the DMB beacon frame. HN operating in the BUS sends DMG beacon frame using the beams of all the HN's antennas during BTI and provides synchronization to RBNs intended to access the HN. Further, RBN operating in the BUS receives DMB beacon frame and performs HN scanning based on the DMB beacon frame. Further, the RBN may support sector level sweep (SLS) beam training between HN and RBN using BTI and A-BFT intervals to select the optimal sector beam. Additionally, the RBN may perform beam refinement protocol (BRP) to select the optimal reception sector beam or may select a more accurate optimal transmission/reception beam through more precise beam training. BRP setup for performing BRP may be done during ATI or DTI, and BRP beam training may be done during DTI. During ATI, HN and RBN exchange a request frame and response frame for access management on a one-to-one basis to offer association and disassociation of STA, send a request for service period, or transfer scheduling information. During CBAP of DTI, all the RBNs have a change of data transmission in a CSMA/CA scheme. Further, during SP of DTI, HN sends data to RBN in a TDMA scheme or each RBN sends data to HN during a designated SP interval in a TDMA scheme in response to HN's instruction. DTI scheduling information is transmitted from HN to RBNs in the announce frame of ATI or DMG beacon frame of BTI. As a result, in the wireless backhaul according to an embodiment of the present disclosure, RBN operating in the BUS may scan HNs, search for a new HN offering the optimal service quality to the RBN, connect with the searched new HN or change the serving HN into the new HN. All the beams may be used to support beam training to discover and select the optimal transmission/reception sector beam and detailed beam for wireless backhaul communication between HN and RBN, and control information and data of HN and RBN may be communicated in the CSMA/CA scheme and TDMA scheme.

Referring to Table 3 above, when the wireless backhaul according to an embodiment of the present disclosure operates in the BOCS, only some of the functions provided in the IEEE 802.11ad wireless LAN standard are supported. Also in such case, HN may additionally send operation mode indication information indicating that the HN's operation mode is the BOCS through DMB beacon frame. According to an embodiment of the present disclosure, HN sends DMG beacon frame of BTI to only RBNs already connected in the BOCS, and in this case, limits the number of times of transmission to the minimum using the optimal transmission beam determined in the BUS. Referring to Table 3 above, according to an embodiment of the present disclosure, when the wireless backhaul operates in the BOCS, no A-BFT interval is allocated, and ATI interval is limited to the minimum. Further, in the BOCS, no DTI CBAP is assigned while only SP is assigned. Referring to Table 4 above, the BOCS does neither support SLS beam training nor BRP beam training. However, upon operating in the ABM of BOCS, beam tracking is supported of conducting beam training on some candidate beams adjacent to the optimal beam already selected during the DTI interval. Further, according to an embodiment of the present disclosure, such a LDM is supported where a power save mode is operated in which RBN operating in the BOCS wakes up at a pre-agreed time and does not communicate signals at other times. As set forth above in Table 2, RBN operating in the BOCS does not scan HN and does not support connection to a new HN or change of serving HN. Further, the ABM provides limited beam training support and thus supports beam tracking, a type of beam training for varying or re-discovering the sector beams of HN and RBN and detailed beam of the sector beam. Also in use of the IEEE 802.11ad standard, according to an embodiment of the present disclosure, the wireless backhaul operating in the BOCS uses the optimal HN and optimal beam discovered in the BUS to communicate control information and data to minimize waste of access interval. Here, rather than the control information being broadcast in all the beams, information necessary for each RBN is communicated in the optimal beam, and the data is communicated in a TDMA scheme by scheduling without support of CSMA/CA.

FIGS. 14 to 17 illustrate examples of beams used for communication of slots, symbols, signals, or information according to the operation mode and communication mode which HN and RBN constituting a wireless backhaul according to the present disclosure have currently switched into.

Figure 14:
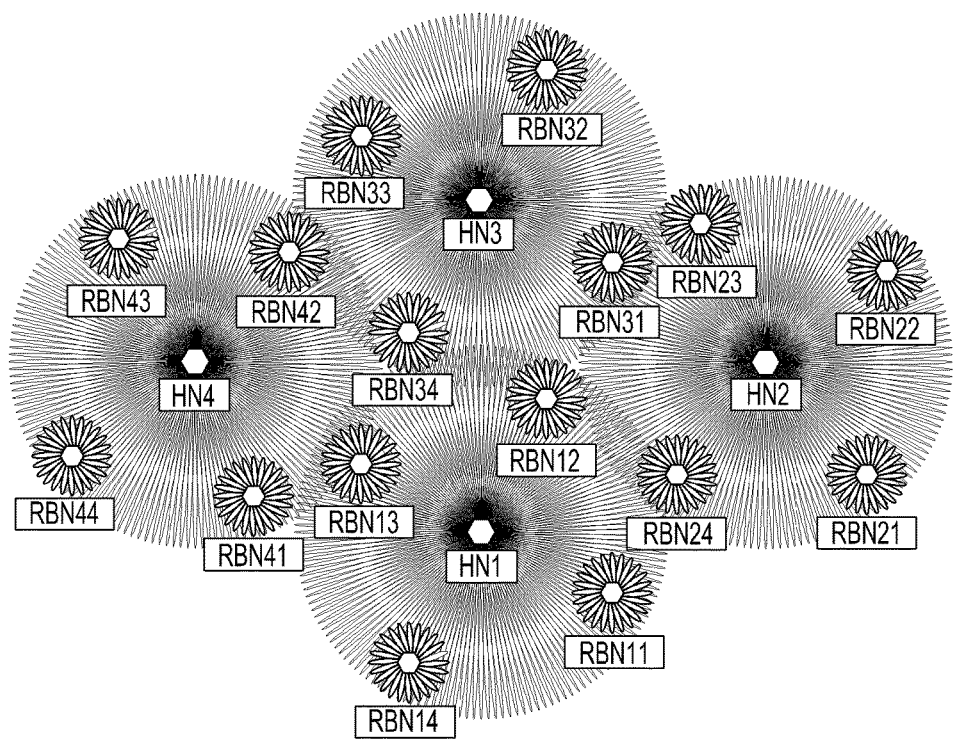
FIG. 14 illustrates beams used for transmission and reception of information and slots when HNs and RBNs configuring a wireless backhaul are operated in a BUS according to an embodiment of the present disclosure.

FIG. 14 illustrates beams used for transmission and reception of information and slots when HNs and RBNs configuring a wireless backhaul are operated as BUSs according to an embodiment of the present disclosure. Here, HN and RBN operating in the BUS use their own respective transmission/reception beams.

FIG. 14 illustrates an example in which HN3 uses all the beams upon communication with each of RBN 31 to RBN 34 located in the HN3's coverage, and RBN 31 to RBN 34 also use all their beams for communication with HN3. Likewise, the remaining HNs and RBNs also use all their transmission beams to perform communication in the instant embodiment.

Figure 15:
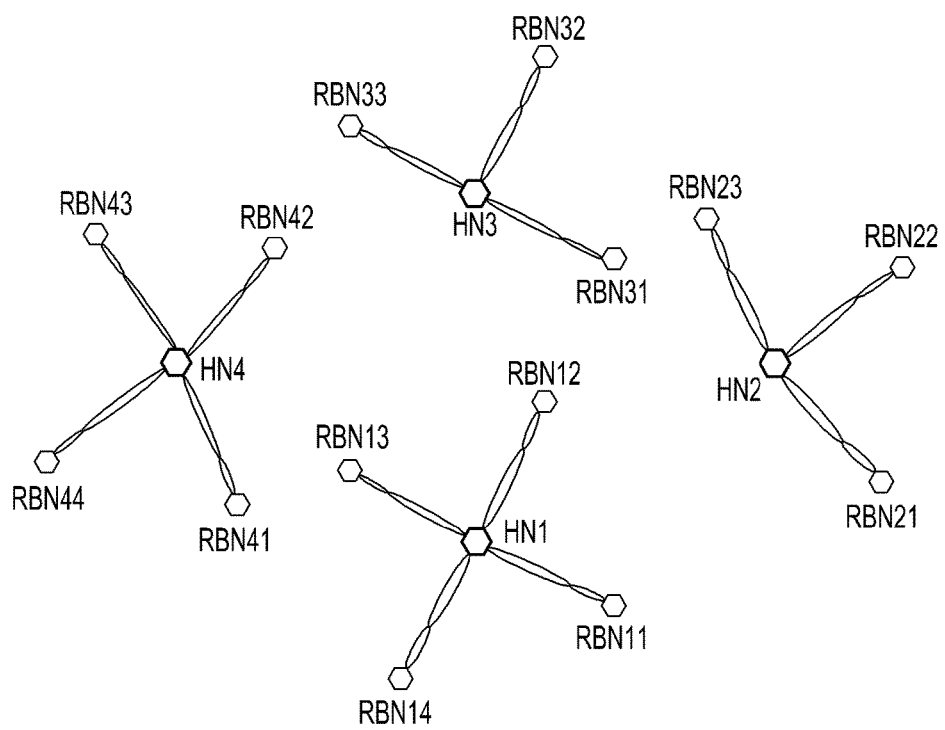
FIG. 15 illustrates beams used when HNs and RBNs configuring a wireless backhaul are operated in an FBM of a BOCS according to an embodiment of the present disclosure.

FIG. 15 illustrates beams used when HNs and RBNs configuring a wireless backhaul are operated in an FBM of a BOCS according to an embodiment of the present disclosure.

Referring to FIG. 15, RBN communicates with the RBN's optimal HN using a fixed optimal beam. For example, RBN 44 communicates with the optimal HN, HN 4, using a fixed optimal transmission/reception beam. HN 4 operating in the FBM of BOCS communicates with each of RBN 41 to RBN 43 permitted to access HN 4 using the optimal transmission/reception beam. Likewise, the remaining HNs, i.e., HN 1 to HN 3, operating in the FBM of BOCS also communicate with the RBNs permitted to access them using the optimal transmission/reception beam. Accordingly, the backhaul operating in the FBM of BOCS may increase communication capability by minimizing interference and waste of radio resources.

Figure 16:
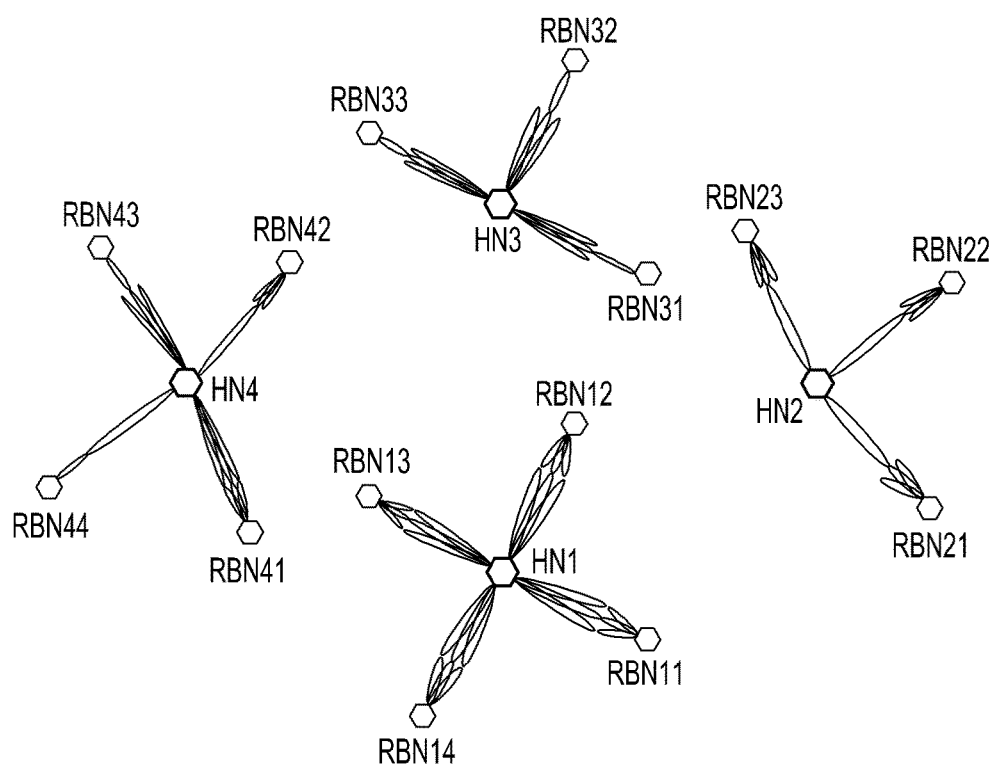
FIG. 16 illustrates a beam used when HNs and RBNs configuring a wireless backhaul are operated in an ABM of a BOCS according to an embodiment of the present disclosure.

FIG. 16 illustrates beams used when HNs and RBNs configuring a wireless backhaul are operated in an ABM of a BOCS according to an embodiment of the present disclosure.

According to an embodiment of the present disclosure, HN and RBN operating in the ABM of BOCS, upon recognizing that beam training is required, sends or receives additional BM slot to discover the optimal transmission or reception beam. Referring to FIG. 16, HN1 and RBN11 to RBN14 all perform beam training to discover the optimal beam. On the contrary, while RBN21 to RBN23 conduct beam training, their serving HN, HN2, remains in the state of having beam fixed. In contrast, HN3 discovers the optimal beam by performing beam training on each of RBN31 to RBN33 currently connected while RBN31 to RBN33 remain with their beams fixed. While HN4 discovers the optimal beam by performing beam training on RBN41 and RBN43 among RBNs connected to HN4, RBN42 and RBN44 are in the state of their beams being fixed. RBN41 and RBN42 discover the optimal beam by performing beam training whereas RBN43 and RBN44 are in the state where beams remain fixed.

Figure 17:
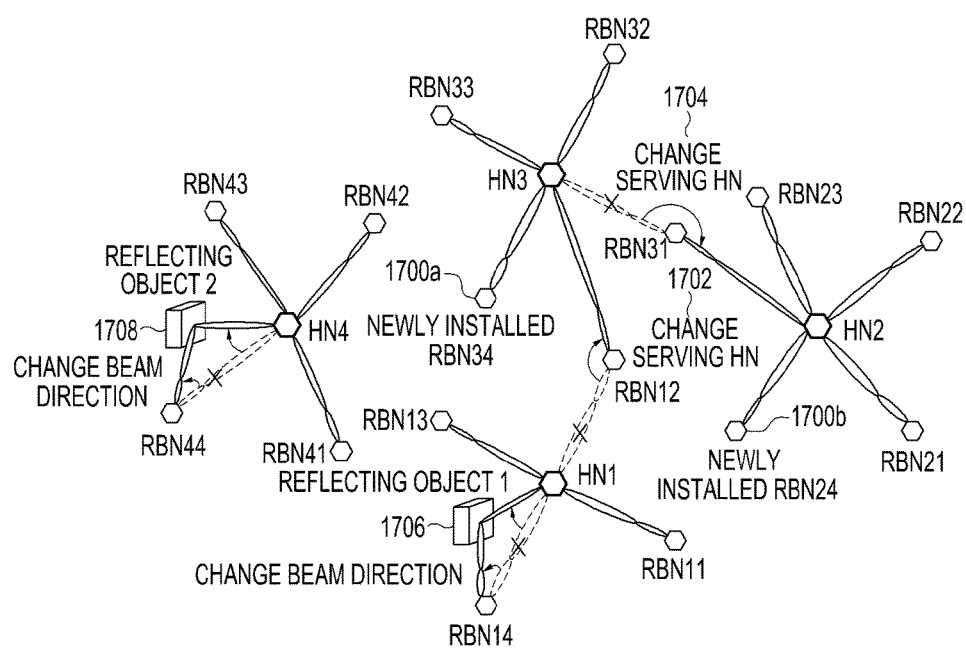
FIG. 17 illustrates a result obtained through a wireless backhaul operated in a BUS according to an embodiment of the present disclosure.

FIG. 17 illustrates a result obtained through a wireless backhaul operated as a BUS according to an embodiment of the present disclosure.

Referring to FIG. 17, there is shown a state in which new RBNs, RBN24 and RBN34, are installed in the existing wireless backhaul, as denoted in reference number 1700, and RBN 24 and RBN34 are connected with HN2 and HN3, respectively. Reference number 1702 denotes an example in which RBN12 recognizes that HN3 offers a higher communication quality than serving HN1 linked and communicating with RBN12, disconnects communication with HN1, and changes serving HNs connecting to HN3. Likewise, reference number 1704 denotes an example in which RBN31 recognizes that HN2 provides a higher communication quality than serving HN3 used to connect and communicated with RBN31 does, disconnects communication with HN3, and changes serving HNs connected with HN2. Regarding reference number 1706, it is assumed that there is a reflecting object 1, e.g., a building or object, which present those larger than the LOS communication path and beam used by HN1 and RBN14 upon communication. In such case, such a circumstance is shown where HN1 and RBN14 each change the optimal beam into a beam corresponding to the direction of reflecting object 1 by recognizing that the communication quality of NLOS path where radio waves are reflected and received by reflecting object 1 is higher. Regarding reference number 1708, it is likewise assumed that there is another reflecting object 2, e.g., a building or object presenting those larger than the LOS communication path and beam used by HN4 and RBN44 upon communication. In such case, such a circumstance is shown where HN4 and RBN44 each change the optimal beam into a beam corresponding to the direction of reflecting object 2 by recognizing that the communication quality of path where radio waves are reflected and received by reflecting object 2 is higher.

According to an embodiment of the present disclosure, HN and RBN operating in the BUS perform beam training on all their transmission/reception beam combinations to select the optimal HN and the optimal transmission/reception beam combination to be used for communication with the optimal HN for each RBN. Since beam training is performed on all the transmission/reception beam combinations for such purpose, the time for beam training is very long, and waste of radio resources is increased. In contrast, according to an embodiment of the present disclosure, HN and RBN operating in the ABM of BOCS conduct limited beam training on only some adjacent beams using the optimal beam already discovered during the BUS, so that the time required for beam training is reduced, and the amount of radio resources used is shortened. As a specific example, assuming that HN and RBN each uses a total of 60 beams, HN and RBN operating in the BUS may perform beam training on 60×60=3600 beam combinations at each measurement period. In comparison, under the assumption that HN and RBN operating in the ABM performs beam training only on nine candidate beams, the total number of beam combinations for beam training is significantly reduced to 9×9=81. Beam training in the ABM may quickly discover the optimal beam when there is an influence from external environment. However, since beam training and selection of optimal beam in the ABM are limited to the existing optimal communication path already discovered in the BUS, no change in the beam direction corresponding to the change in the communication path occurs as in reference numbers 1706 and 17087 of FIG. 17.

Figure 18:
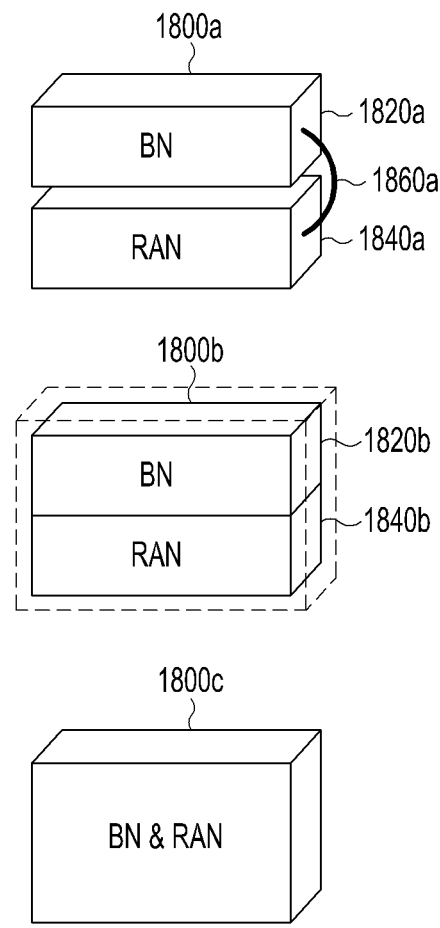
FIG. 18 illustrates an installation structure for a RAN and backhaul node (BN) according to an embodiment of the present disclosure.

FIG. 18 illustrates an installation structure for a RAN and backhaul node (BN) according to an embodiment of the present disclosure. Here, BN corresponds to HN or RBN, and RAN corresponds to MBS or SBS.

Referring to FIG. 18, in the structure denoted in reference number 1800A, a BN 1820A and a RAN 1840A are implemented as devices independent from each other and are respectively installed in different cases, boxes, housings, or racks. BN 1820A and RAN 1840A are connected with each other via a connecting line or cable 1860A. Although in the structure denoted in reference number 1800B a BN 1820A and a RAN 1840B are implemented as devices independent from each other, the BN 1820A and the RAN 1840B may be installed in a single shared case 1800B. In the structure denoted in reference number 1800B, e.g., HN and BS respectively are implemented as boards independent from each other, installed in the same rack, and connected together by way of a backplane. In the structure denoted in reference number 1800C, BN and RAN are implemented as a single device. For example, in the structure denoted in reference number 1800C, RBN and BS are implemented on the same board and are connected together via a bus.

Figure 19:
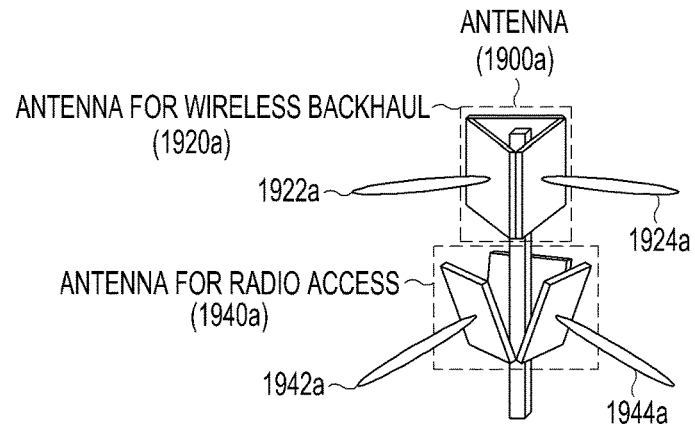
FIG. 19 illustrates a structure of an antenna for radio access and an antenna for wireless backhaul according to an embodiment of the present disclosure.
Figure 19:
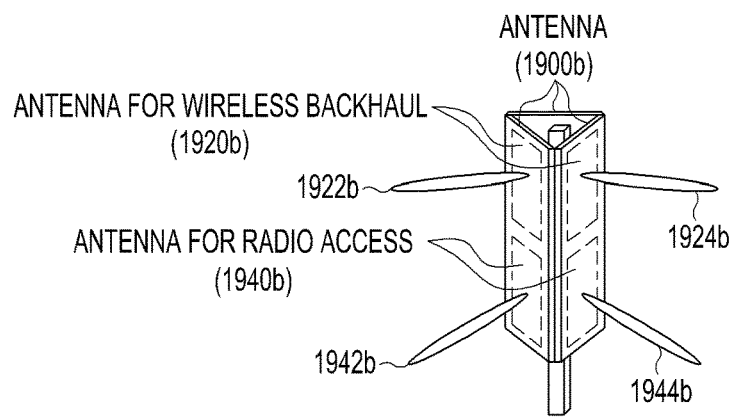
Figure 19:
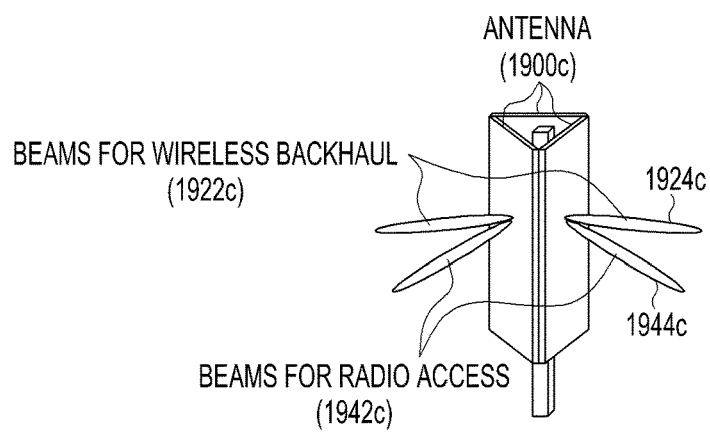

FIG. 19 illustrates a structure of an antenna for radio access and an antenna for wireless backhaul according to an embodiment of the present disclosure.

Referring to FIG. 19, for example, in the antenna 1 structure 1900A, an antenna 1920A for wireless backhaul and an antenna 1940A for radio access are independently implemented and separately installed from each other. The antenna 1 structure 1900A may be advantageous when some characteristics among antenna-related information including use frequency, number of antennas and beams, antenna pattern or beam pattern, and vertical or horizontal direction of antenna differ for the antenna 1920A for wireless backhaul and antenna 1940A for radio access. An antenna structure 2 1900B is a structure in which an antenna array 1920B for wireless backhaul and an antenna array 1940B for radio access are implemented on the same antenna hardware. In such case, antenna arrays 1920B and 1940B, despite being implemented on the same antenna hardware, have different radio frequency (RF) elements connected with the antenna arrays. In particular, in such case, the antenna arrays 1920B and 1940B may have some characteristics (use frequency or number and direction of antennas) designated to be the same and other characteristics (number of beams, beam pattern, and beam direction) designated to be different. An antenna structure 3 1900C is a structure in which beams 1922C and 1924C for wireless backhaul and beams 1942C and 1944C for radio access are created through the same antenna hardware and array. The antenna structure 3 1900C, albeit having the same antenna hardware and array, have RF elements connected thereto implemented to be independent from each other to generate different beams. In such case, substantially all of the characteristics of antennas and beams for wireless backhaul and radio access are the same while beams for wireless backhaul and beams for radio access may be selected differently from each other.

Figure 20:
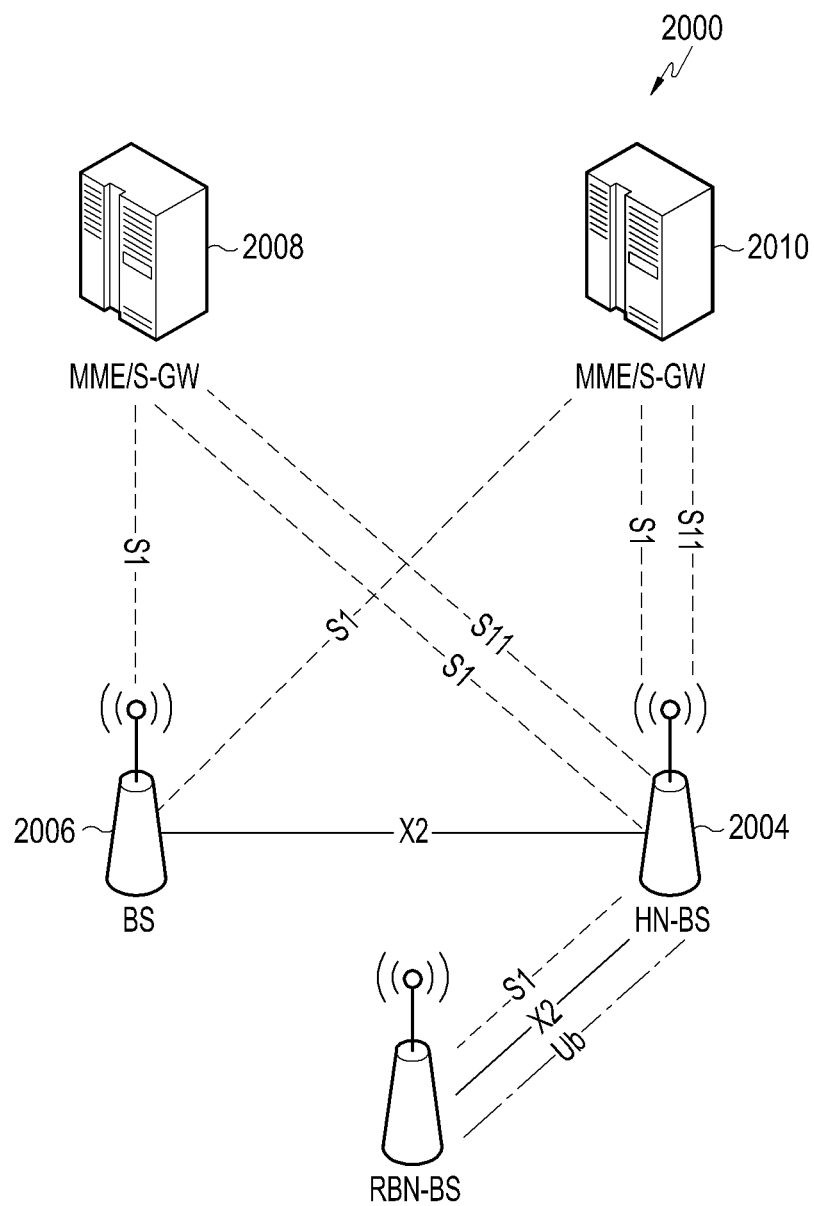
FIG. 20 illustrates an example of a radio access network where a wireless backhaul is installed according to an embodiment of the present disclosure.

FIG. 20 illustrates an example of a radio access network where a wireless backhaul is installed according to an embodiment of the present disclosure. Although the radio access network shown in FIG. 20 illustrates an LTE RAN structure as an example, the present disclosure may also be applicable to other communication networks to which beamforming may apply.

Referring to FIG. 20, according to an embodiment of the present disclosure, in the random access network 2000 where wireless backhaul is installed, a RBN 2002 is wirelessly connected to an HN 2004 to provide network connection to a RBN-BS which is a random access node of RBN. FIG. 20 illustrates an example in which the BSs respectively installed in the RBN and the HN are shown as single devices RBN-BS 2002 and HN-BS 2004 without being separated from the RBN and HN. Thus, RBN and HN respectively may hereinafter be denoted as RBN-BS 2002 and HN-BS 2004.

RBN-BS 2002 and HN-BS 2004 are connected together via a wireless interface Ub.

According to an embodiment of the present disclosure, wireless interface Ub for wireless backhaul may use beamforming-based cellular mobile communication random access technology as described above in connection with FIGS. 4 to 12 or beamforming wireless LAN random access technology defined in IEEE 802.11ad. Further, RBN-BS 2002 terminates S1 and X2 interface for operation of BS connected thereto. HN-BS 2004 provides an S1 and X2 proxy function to RBN-BS 2002 and other network nodes, i.e., another BS 2006, mobility management entity (MME)/serving gateway (S-GW) 2008 and 2010. The S1 and X2 proxy function includes a function for delivering S1 and X2 signaling messages for MS and a function for transferring GTP data packets between the S1 and X2 interface related to RBN and S1 and X2 interface related to other network nodes. The proxy function enables HN-BS 2004 to play a role as a MME (with respect to S1-MME), adjacent BS (with respect to X2), or S-GW (with respect to S1-U). Further, HN-BS 2004 embeds and provides S-GW/pdn-gateway (P-GW) functions necessary for RBN operation on RBN-BS 2002. Specifically, The HN-BS 2004 generates a session for RBN, manages a radio bearer for RBN, and terminates the S1 interface towards the MME serving RBN. Further, HN-BS 2004 performs data packet mapping and signaling to radio bearers set for RBN operation. Signaling and data packet mapping are conducted on radio bearers. HN-BS 2004 embeds the P-GW functionality of assigning an internet protocol (IP) address other than the S1 IP address of RBN-BS 2002 to RBN-BS 2002 for operation and maintenance (OAM).

According to an embodiment of the present disclosure, the wireless backhaul provides a GTP tunnel in HN and RBN to deliver radio bearers of MS located in the service coverage of BS installed in RBN. For the GTP tunnel, HN and RBN according to an embodiment of the present disclosure supports an S1 and X2 user plane interface.

Figure 22:
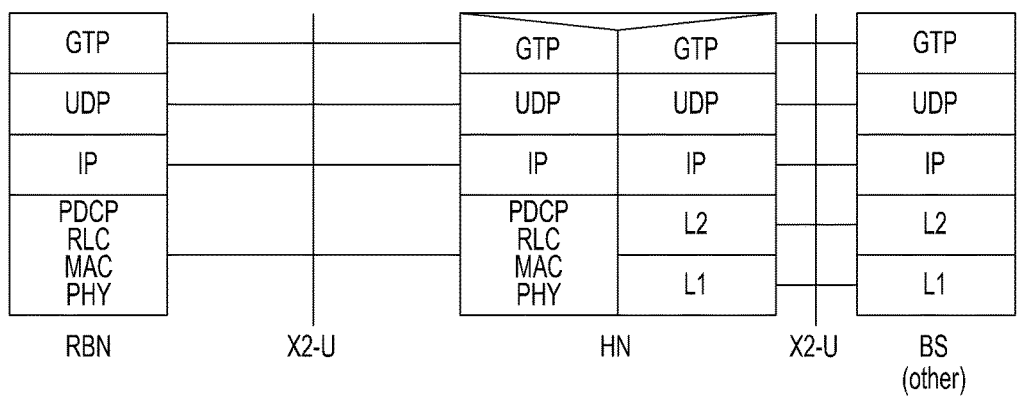
FIG. 22 illustrates an example of an X2 user plane protocol stack structure for supporting an operation of an HN and RBN configuring a wireless backhaul according to an embodiment of the present disclosure.

FIG. 22 illustrates an example of a S1 user plane protocol stack structure for supporting an operation of an HN and RBN configuring a wireless backhaul according to an embodiment of the present disclosure. FIG. 22 is a view illustrating an example of an X2 user plane protocol stack structure for supporting an operation of an HN and RBN configuring a wireless backhaul according to an embodiment of the present disclosure.

Figure 21:
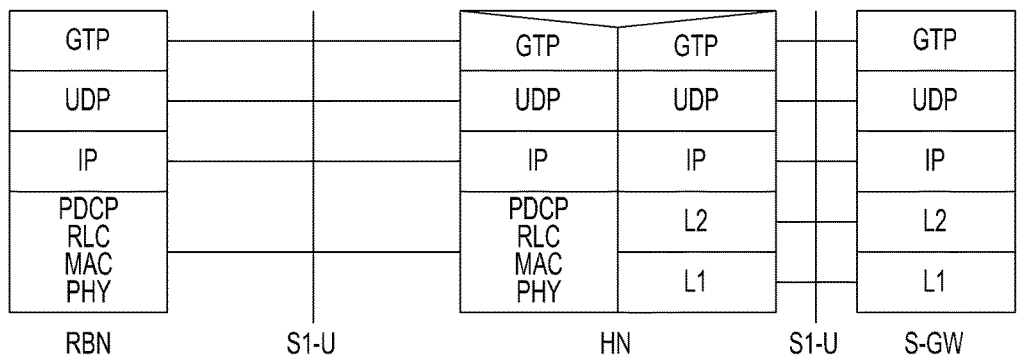
FIG. 21 illustrates an example of a S1 user plane protocol stack structure for supporting an operation of an HN and RBN configuring a wireless backhaul according to an embodiment of the present disclosure.

Referring to FIGS. 21 and 22, S1 and X2 user plane packets are mapped to radio bearers through a Ub interface.

The protocol stack of RBN includes, e.g., GTP, user datagram protocol (UDP), IP and packet data convergence protocol (PCDP)/radio link control (RLC)/medium access control (MAC)/physical layer (PHY). The protocol stack of S-GW includes GTP, UDP, IP, layer2 (L2), and L1. According to an embodiment of the present disclosure, HN has a stack structure where the protocol stack of RBN and the protocol stack of S-GW are mapped to provide a connection with S-GW to RBN.

Figure 23:
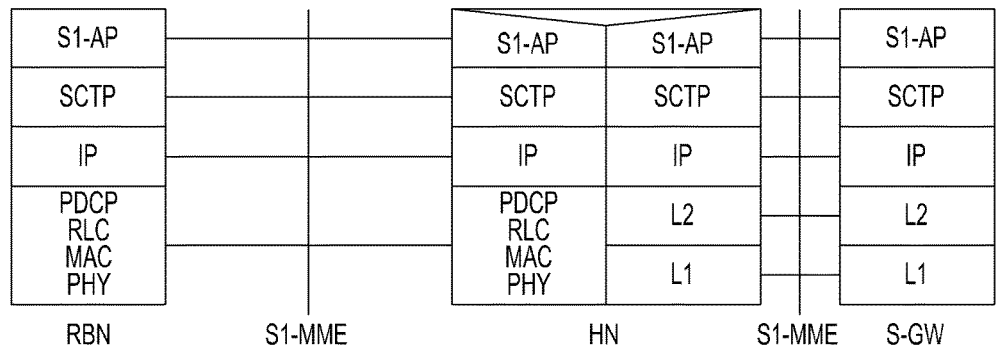
FIG. 23 illustrates an example of an S1 control plane protocol stack structure for supporting an operation of an HN and RBN configuring a wireless backhaul according to an embodiment of the present disclosure.

Further, embodiment of the present disclosure supports an S1 and X2 control plane interface for controlling wireless backhaul. FIG. 23 is a view illustrating an example of an S1 control plane protocol stack structure for supporting an operation of an HN and RBN configuring a wireless backhaul according to an embodiment of the present disclosure.

Referring to FIG. 23, one S1 interface relation exists between each RBN and HN, and an S1 interface relation is present between each MME included in MME pool and HN. HN processes and delivers all S1 messages between RBN and MME for all UE-dedicated procedures. S1-AP message processing includes varying S1-AP UE IDs, transport layer addresses, and GTP tunnel endpoint identifiers (TEIDs) and does not change other portions in S1-AP message. Non-UE-dedicated S1-AP procedures are terminated in HN and are internally processed between RBN and HN and between HN and MME. Upon receiving non-UE-dedicated S1 message from MME, HN may trigger corresponding S1 non-UE-dedicated procedures for RBN.

Therefore, an example protocol stack of RBN includes S1-AP, stream control transmission protocol (SCTP), IP, and PDCP/RLC/MAC/PHY. MME includes S1-AP, STCP, IP, L2, and L1. Likewise, HN providing connection between MME and RBN has a stack structure in which the protocol stacks of RBN and MME are mapped.

Figure 24:
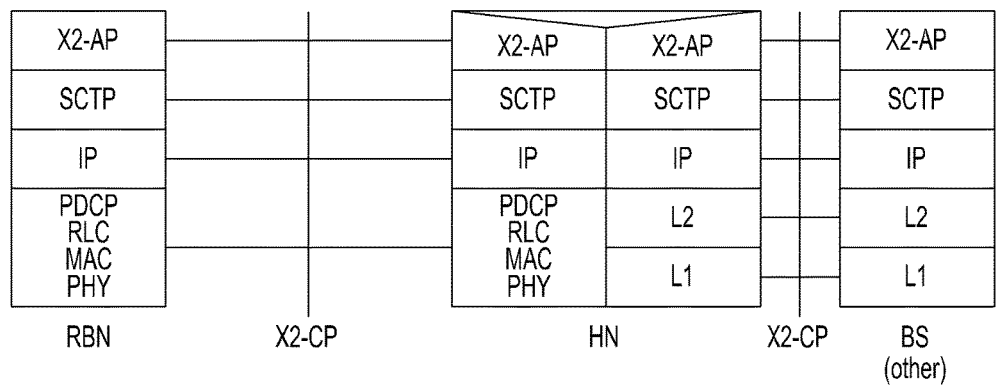
FIG. 24 illustrates an example of an X2 control plane protocol stack structure for supporting an operation of an HN and RBN configuring a wireless backhaul according to an embodiment of the present disclosure.

FIG. 24 illustrates an example of an X2 control plane protocol stack structure for supporting an operation of an HN and RBN configuring a wireless backhaul according to an embodiment of the present disclosure.

Referring to FIG. 24, according to an embodiment of the present disclosure, there is one X2 interface relation between each RBN and HN. Further, HN may have an X2 interface relation with adjacent BSs. Accordingly, the respective protocol stacks of RBN, HN, and BS have the same stack structure except for X2-AP for X2 interface that is used instead of S1-AP of FIG. 23. HN processes and delivers all X2 messages between RBN and other BSs for all UE-dedicated procedures. X2-AP message processing includes varying S1/X2-AP UE IDs, transport layer addresses, and GTP TEIDs and does not change other portions in the X2 message. All non-UE-dedicated X2-AP procedures are terminated in HN and are internally processed between RBN and HN and between HN and other BSs. Upon receiving X2 non-UE-dedicated message irrelevant to cell from RBN or neighbor BS, HN may trigger corresponding non-UE-dedicated X2-AP procedures for neighbor BS or RBN(s). When receiving cell-related X2 non-UE-dedicated message from RBN or neighbor BS, HN may deliver relevant information to the neighbor BS or RBN(s) based on cell information included in the message.

S1 and X2 interface signaling packets are mapped to radio bearers through a Ub interface.

Figure 25:
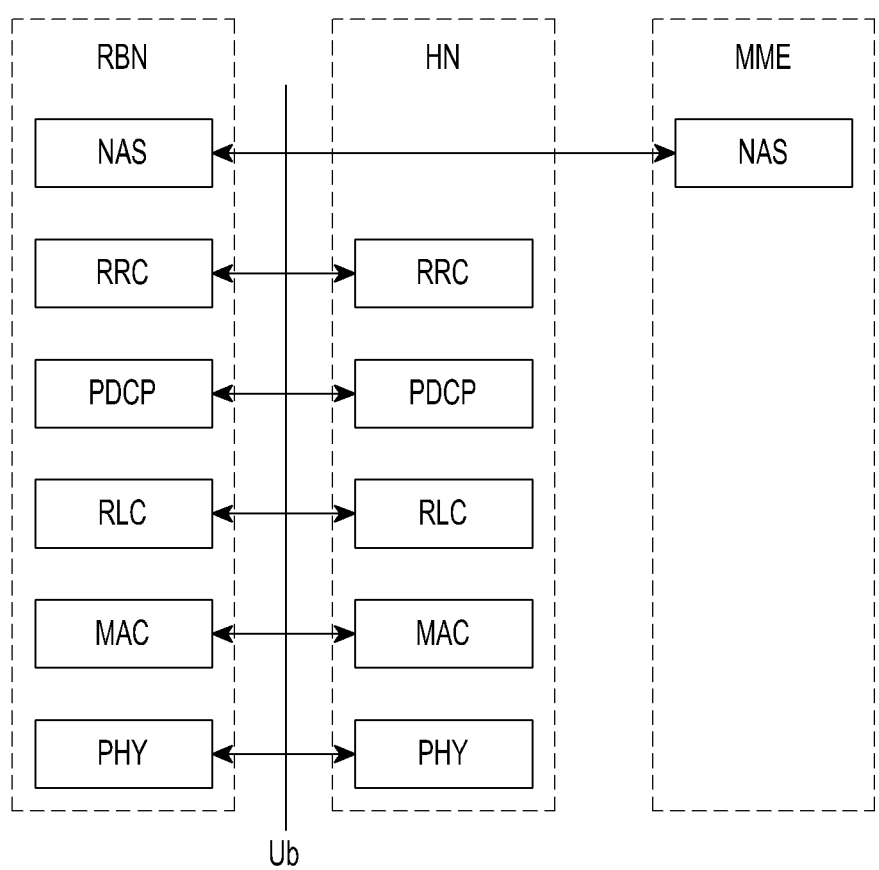
FIG. 25 illustrates an example of a wireless control plane protocol stack structure for supporting an operation of an HN and RBN configuring a wireless backhaul according to an embodiment of the present disclosure.
Figure 26:
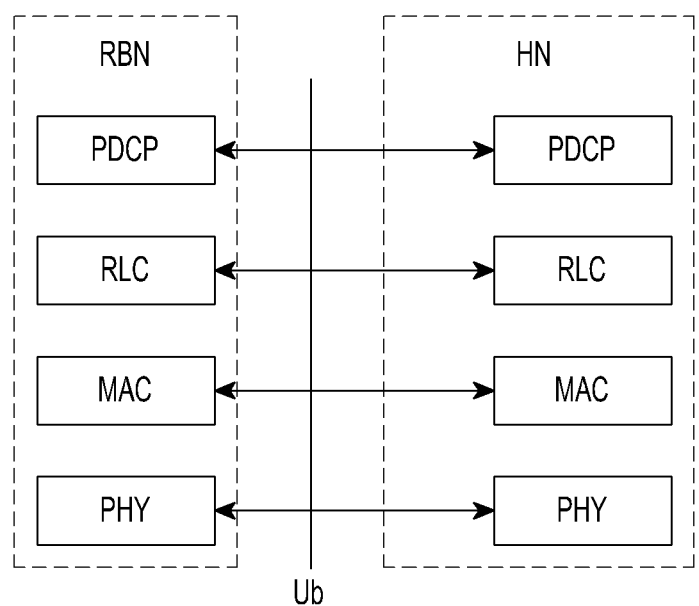
FIG. 26 illustrates an example of a wireless user plane protocol stack structure for supporting an operation of an HN and RBN configuring a wireless backhaul according to an embodiment of the present disclosure.

FIG. 25 illustrates an example of a wireless control plane protocol stack structure for supporting an operation of an HN and RBN configuring a wireless backhaul according to an embodiment of the present disclosure. FIG. 26 illustrates an example of a wireless user plane protocol stack structure for supporting an operation of an HN and RBN configuring a wireless backhaul according to an embodiment of the present disclosure.

Referring to FIGS. 25 and 26, RBN is connected with HN through a Ub interface that uses the same procedure as wireless protocol by which a terminal connects to a base station. An example of wireless control plane protocol stack of RBN includes non-access stratum (NAS) providing access to MME, RRC, PDCP, RLC, MAC, and PHY, and MME includes NAS layer alone, and HN includes the protocols of RBN except for NAS. The user plane protocol stack of RBN and HN include PDCP, RLC, MAC, and PHY.

Further, the following functions are supported for communication of HN and RBN based on the above-described protocol stack structure, according to an embodiment of the present disclosure.

RRC layer using a Ub interface performs such function as configuring or reconfiguring a RBN frame for communication between RBN and HN through a RBN reconfiguration procedure. In such case, RBN may request HN to configure frame upon RRC connection establishment, and receiving the request, HN may initiate RRC signaling to configure RBN frame. Through the frame configuration function, HN may transfer configuration information for switch of operation mode or communication mode of wireless backhaul to RBN, or RBN may send a request for the configuration information to HN and receive the same from HN. When receiving frame configuration information through RRC signaling, RBN applies the frame configuration information to conduct communication with HN in the corresponding operation mode or communication mode according to an embodiment of the present disclosure Further, RRC layer using the Ub interface has a function of including and delivering newly changed SI in a dedicated message to RBN. By the above function, HN may transfer, to RBN, SI necessary to switch operation modes or communication modes of wireless backhaul according to an embodiment of the present disclosure, and RBN may receive and apply the SI to operate in the corresponding mode.

The above-described BUS transition conditions according to an embodiment of the present disclosure may be embodied in the following four cases, and HN and RBN operation may be specified for each case.

The first case is to install new RBN in the wireless backhaul. In this case, network OAM transfers a command to transition the HN operation mode into BUS to HN. RBN, when BUS powers on, automatically transitions the RBN's operation mode into BUS and operates.

The second case is occurrence of a wireless backhaul link failure. A link failure of wireless backhaul may occur, e.g., when a building or obstacle newly stands on the wireless backhaul path to cut off communication path. HN may set, e.g., a failure to receive, without errors and within a predetermined time, a UL response to data or control information transmitted to RBN from RBN, as a reference for determining that a failure of link to RBN occurs (hereinafter, "link failure determination reference"). According to an embodiment of the present disclosure, the link failure determination reference may include when HN fails to receive, without error, UL data at a minimum transmission speed. The link failure determination reference may also include when HN fails to consecutively receive BA bits or information a predetermined number of times from RBN operating in the LDM of BOCS or fails to receive them within a predetermined time.

RBN may set a link failure determination reference, e.g., including a failure to detect a sync of the RBN's serving HN, failure to receive shared control information without error, failure to receive, without error, control information of the RBN's serving HN, and failure to receive without error on DL at a minimum data transmission speed. In the second case, when HN identifies that the link failure determination reference is met, the HN determines to transition the HN's operation mode into BUS and delivers a command for transitioning the operation mode into BUS to the network OAM. Upon meeting the link failure determination reference, RBN directly transitions the RBN's operation mode into BUS.

The third case is when link capability deterioration occurs in the wireless backhaul. The link capability deterioration in the wireless backhaul may include, e.g., such a circumstance where trees or woods on the communication path of wireless backhaul flourish to degrade link capability or where an object is newly installed to attenuate radio waves. According to an embodiment of the present disclosure, e.g., when wireless link capability or quality is continuously left lower than a threshold for a predetermined time may be set as a condition for determining the link capability deterioration (hereinafter, "link capability deterioration determination condition"). Here, the wireless link capability or quality may be determined by, e.g., mean power of received signal per unit radio resource, channel quality indicator (CQI) value, signal-to-noise ratio (SNR), data transmission speed per unit radio resource, and modulation and coding index (MCI) value. As specific examples, when a maximum value P max $(t, t-Ts)$ of a predetermined capability index at a predetermined time interval (e.g., Ts=1 min.) remains worse than a reference capability value (e.g., $P(t0)$=capability value achieved by HN-RBN at the latest BUS-to-BOCS switch) by a threshold (e.g., $\Delta Ps$=6 dB) or more for a predetermined time (e.g., Tm=10□), it may be determined that a switch into BUS is needed.

The above example may be represented in Equation 1 as follows:

Decide S3, if, for $t=t1$ to $t1-Tm$, $$P\max(t,t-Ts) < P(t0) - :\Delta Ps \qquad \text{Equation (1)}$$

In the third case, when detecting wireless backhaul link capability deterioration based on the above-described link capability deterioration determination condition, HN may report the wireless backhaul link capability deterioration to the network OAM. Or, upon detecting the wireless backhaul link capability deterioration, HN may determine to transition the HN's operation mode into BUS and deliver a request for transitioning operation mode into BUS to the network OAM. Then, HN may transition into BUS by receiving an operation mode transition instruction from the OAM.

In the third case, when receiving a command to transition the operation mode into BUS from the serving HN, RBN transitions into the corresponding mode.

In the fourth and last case, a transition into BUS may be made at a predetermined period for enhancing performance or in response to an instruction from the operator. In such case, when receiving a command to transition the operation mode into BUS from the network OAM, HN transitions into BUS. When receiving an instruction to transition into BUS from the serving HN, RBN transitions into BUS.

Figure 27A:
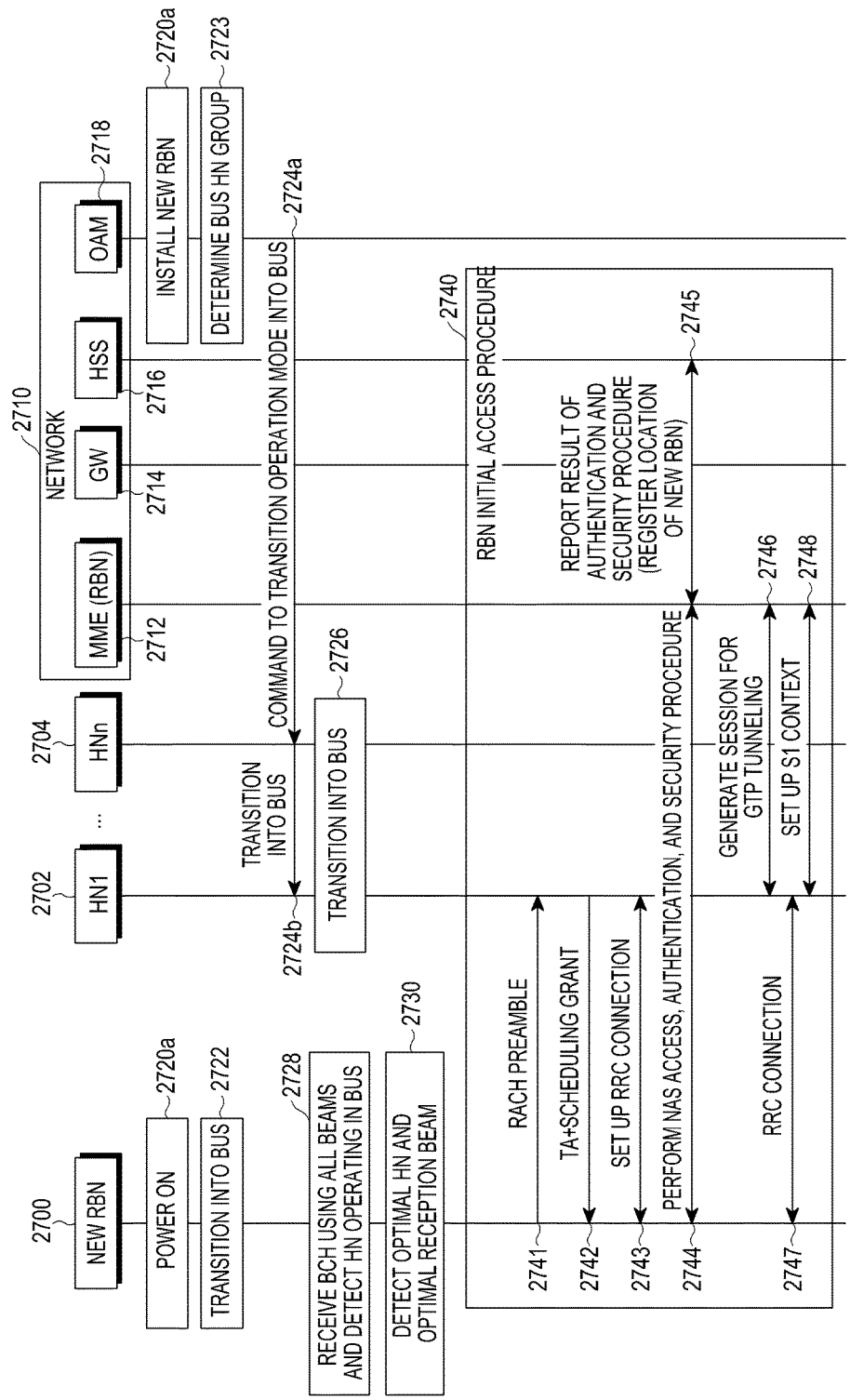
FIGS. 27a and 27b illustrate examples of an operation flow of a first case of BUS transition conditions according to an embodiment of the present disclosure.
Figure 27B:
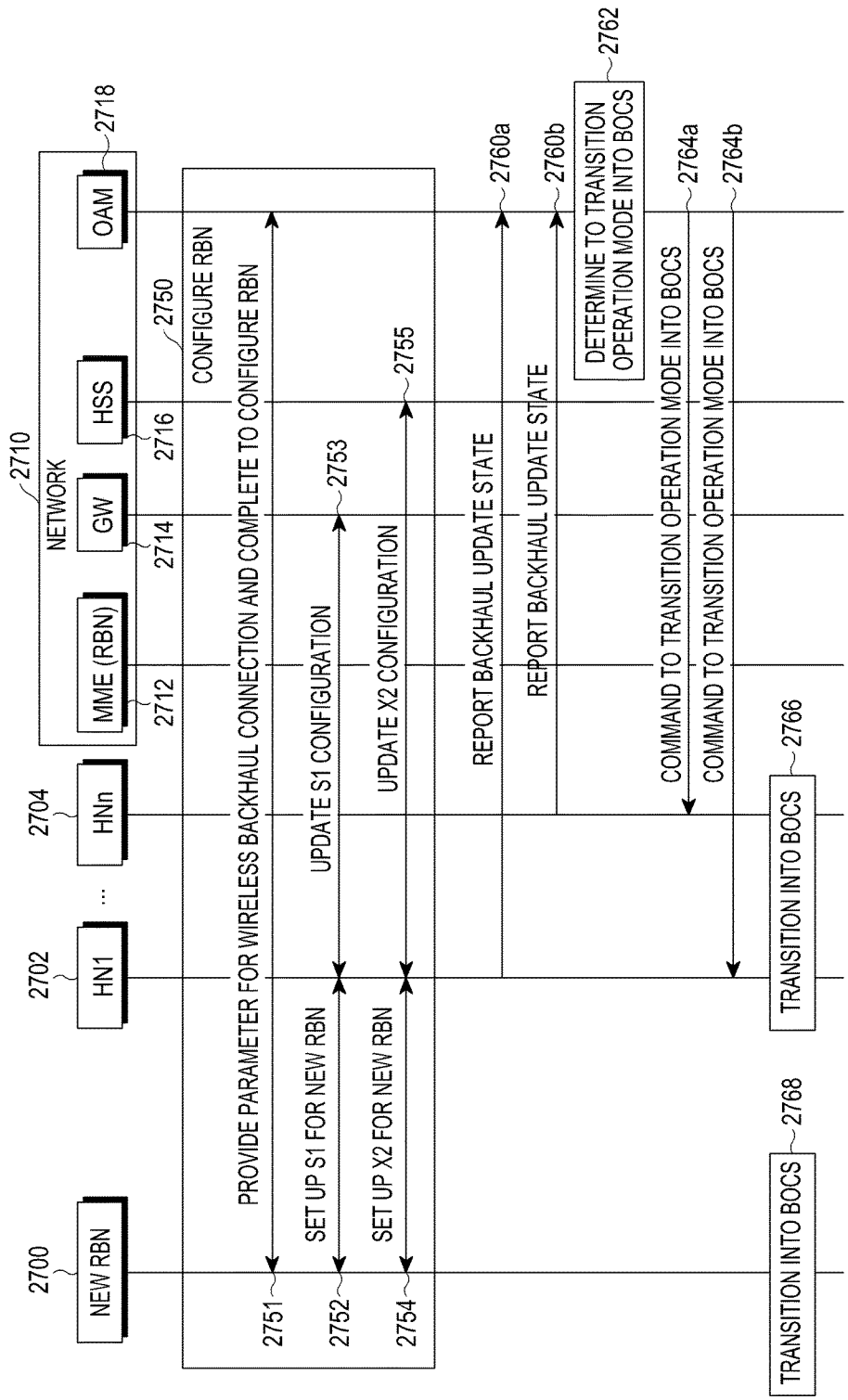

FIGS. 27a and 27b illustrates examples of an operation flow of a first case of BUS transition conditions according to an embodiment of the present disclosure. In the embodiment shown in FIGS. 27a and 27b, it is assumed that an OAM of network 2710 is requested or instructed to install a new RBN 2700 to install the new RBN 2700. Here, information on where the new RBN 2700 is installed or information on HN preferred by the new RBN 2700 or predicted to be linked by the new RBN 2700 may also be sent to OAM 2718.

Referring to FIGS. 27a and 27b, when RBN 2700 newly installed powers on in operation 2720a, the RBN 2700 transitions the operation mode into BUS in operation 2722.

OAM 2718 having installed the new RBN 2700 in operation 2720b determines HNs having a chance of being linked by the new RBN 2700 and bundles the determined HNs in an HN group operating in the BUS (hereinafter, denoted as "BUS HN group") in operation 2723. According to an embodiment of the present disclosure, the BUS HN group may be selected using the information on the location of the new RBN 2700 or information on HN preferred or predicted to be linked by the new RBN 2700 which is included in the request or instruction to install the new RBN 2700. In operations 2724a and 2724b, OAM 2718 transfers a command to transition operation mode into BUS to each HN included in the BUS HN group. For ease of description, it is assumed that HN1 27702 and HNn 2704 are determined to be in the BUS HN group. In operation 2726, when receiving a command to transition operation mode into BUS, HN1 2702 and HNn 2704 each transition into BUS and operate. Here, HN1 2702 and HNn 2704 each mark "BUS" on the operation mode in the BCH or beacon frame information and broadcast SI necessary for RBNs connected thereto to operate in the BUS. Further, HN1 2702 and HNn 2704 each transmit SS and BCH slot through all their beams on DL and receive an access or association request signal from a corresponding RBN through all their beams on UL. They each perform beam training on all the beams to select the optimal beam on each of DL and UL.

In operation 2728, the new RBN 2700 operating in the BUS searches or scans HNs while conducting beam training on all reception beams. As a result, when receiving the SS and BCH or beacon frame information from HN1 2702 and HNn 2704, the new RBN 2700 detects HN1 2702 and HNn 2704 operating in the BUS. In operation 2730, the new RBN 2700 conducts beam training on each of the detected HN1 2702 and HNn 2704 to determine the optimal transmission/reception beam presenting the highest receive power for each HN and determine the HN presenting the maximum beam power as the optimal HN. As an example, it is assumed that HN1 2702 is determined as the optimal HN.

In operation 2740, the new RBN 2700 then performs a procedure 2740 for initial access (attach or associate) to the network 2710 through HN1 2702. First, in operation 2741, the new RBN 2700 sends a RACH preamble or association request signal to HN1 2702 determined as the optimal HN. Here, the new RBN 2700 also transfers a result of measurement made on HN1 2702 in operation 2730 to HN1 2702. When receiving the RACH preamble, HN1 2702 operates as a serving HN of the new RBN 2700 to provide a network connection. Accordingly, in operation 2742, HN1 2702 delivers time advance (TA) value and scheduling grant to the new RBN 2700, and in operation 2743, the HN1 2702 conducts the above-described RRC connection setup procedure. Through the RRC connection setup procedure, HN1 2702 and the new RBN 2700 may configure frames for transitioning the operation mode or communication mode of wireless backhaul. In operation 2744, RBN 2700 performs NAS access, authentication, and security procedures with network 2710, and in operation 2745, MME reports a result of the authentication and security procedure performed with the new RBN 2700 to a home subscriber server (HSS) to register the location information on the new RBN 2700. Thereafter, io2746, HN1 2702 and MME generate a session for GTP tunneling described above. According to an embodiment of the present disclosure, in operation 2747, the new RBN 2700 then reconfigures a frame for operation in the BUS through RRC connection for HN1 2702, and in operation 2748, HN1 2702 performs S1 context setting with MME.

In operation 2750, the new RBN 2700 sets a configuration for wireless backhaul connection. Accordingly, in operation 2751, the new RBN 2700 initializes parameters for wireless backhaul connection through OAM 2718 and sets up a configuration for the wireless backhaul connection. In operation 2752, the new RBN 2700 configures an S1 interface with HN1 2702, and in operation 2753, HN1 2702 updates the configuration of S1 interface of RBN1 2700. In operation 2754, the new RBN 2700 configures an X2 interface with HN1 2702, and in operation 2755, HN1 2702 updates the configuration of X2 interface of RBN1 2700. According to an embodiment of the present disclosure, operations and functions for user plane and control plane through S1 and X2 interface overlap those described above in connection with FIGS. 20 to 26, and thus, no detailed description thereof is given.

Thereafter, in operation 2760a, HN1 2702, a predetermined time after completing network access and configuration setup of the new RBN 2700, sends a backhaul update status report to OAM 2718. Likewise, when a predetermined time elapses, HNn 2704 in the BUS HN group also delivers a backhaul update status report to OAM 2718 in operation 2760b.

Upon identifying the reception of the backhaul update status reports from HN1 2702 and HNn 2704 to which operation mode transition commands have been sent in operations 2724a and 2724b, OAM 2718 determines whether to transition the operation mode of HN1 2702 and HNn 274 into BOCS in operation 2762. In this case, when the network access procedure of the new RBN 2700 is complete within a predetermined time or fails within a predetermined time, OAM 2718 may determine to transition the operation mode of HN1 2702 and HNn 2704 into BOCS. Assuming that the operation mode of HN1 2702 and HNn 2704 has been determined to transition into BOCS, OAM 2718 delivers commands to transition operation mode into BOCS to HN1 2702 and HNn 2704, respectively, in operations 2764a and 2764b. Then, in operation 2766, HN1 2702 and HNn 2704 each transition into BOCS. HN1 2702 transfers the HN1's transition into BOCS to the new RBN 2700. When receiving a BOCS transition command from serving HN1 2702, new RBN 2700 in operation 2768 transitions into BOCS.

Figure 28A:
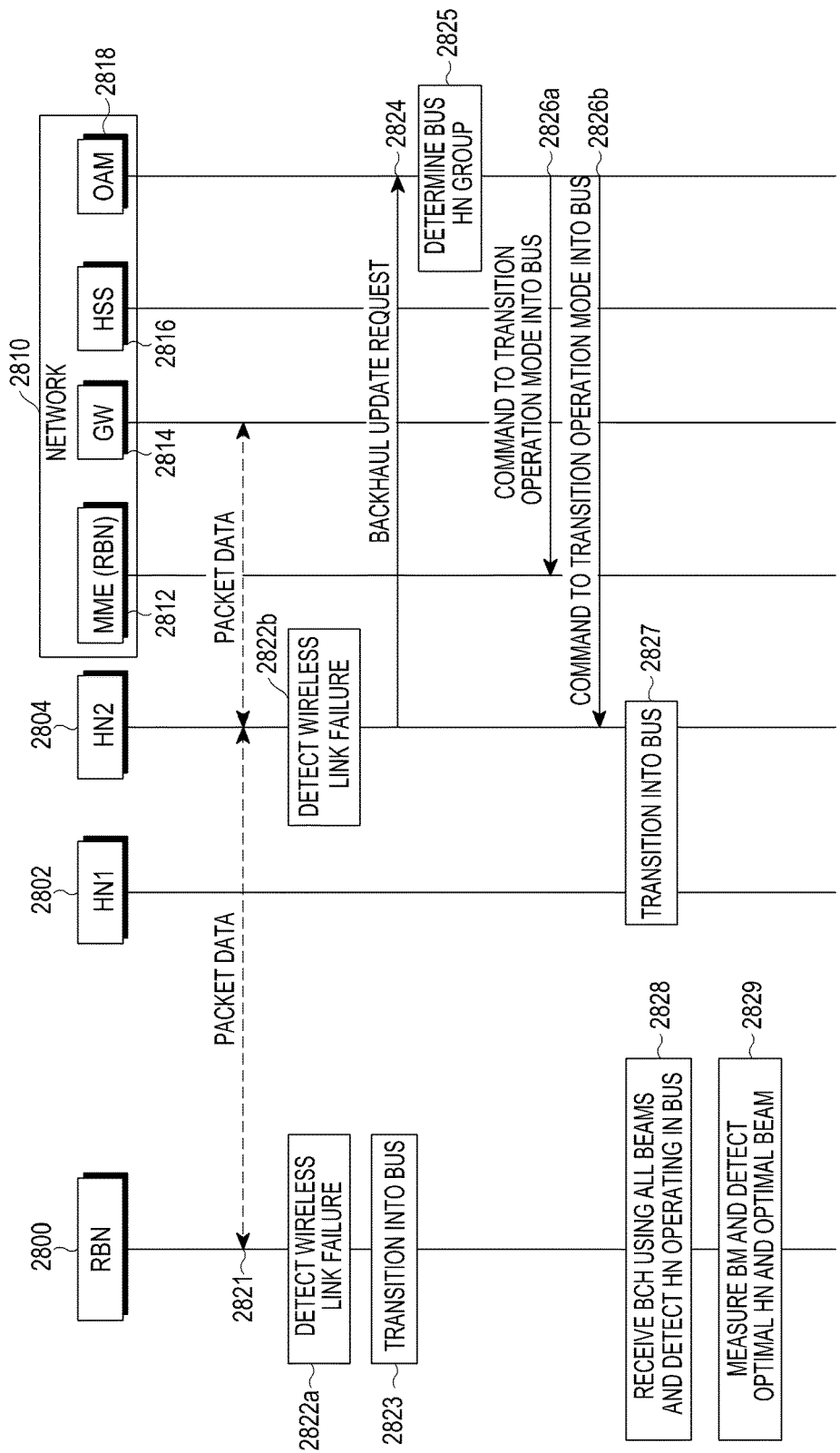
FIGS. 28a, 28b, and 28c illustrate examples of an operation flow of a second case of the BUS transition conditions according to an embodiment of the present disclosure.
Figure 29A:
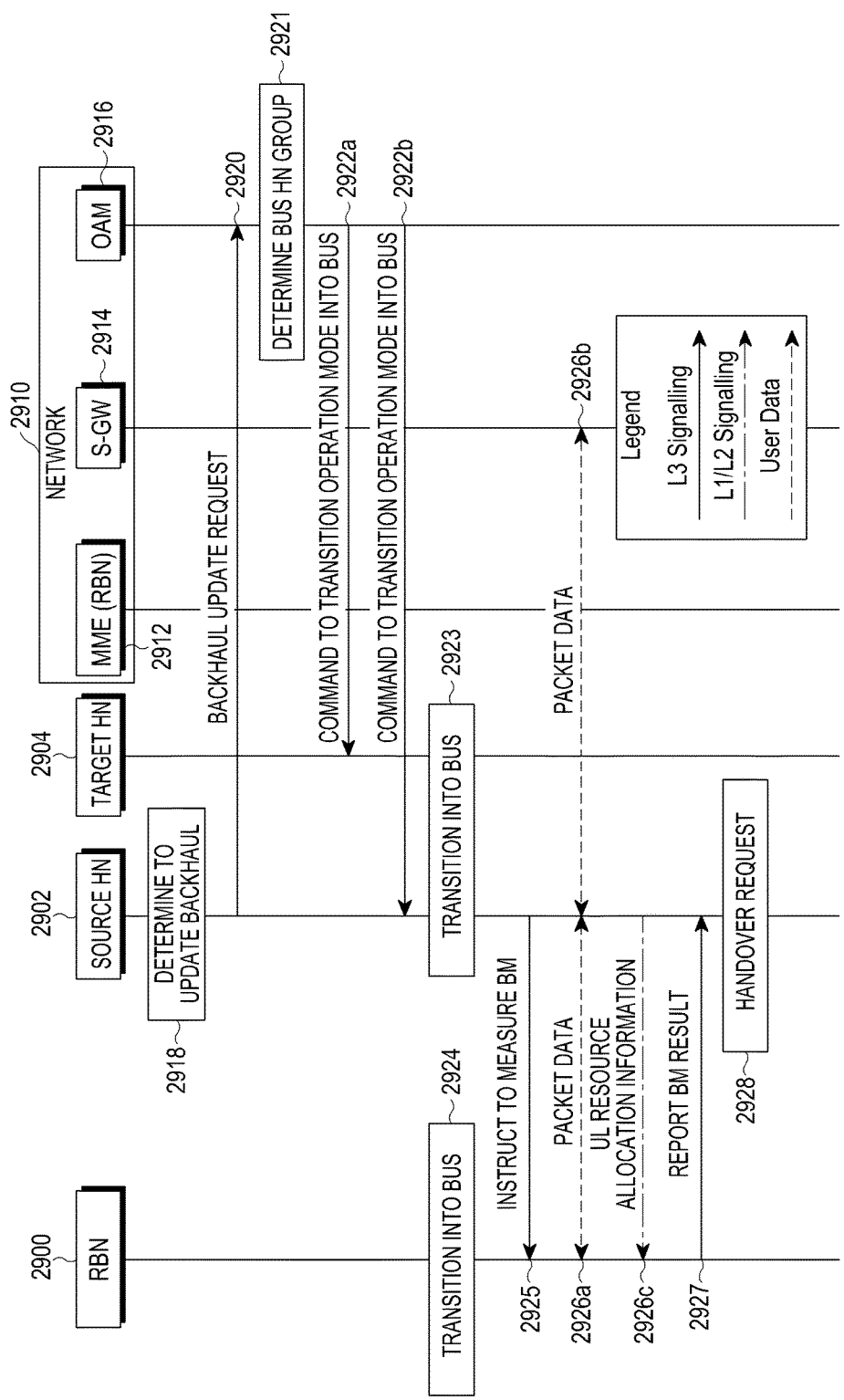
FIGS. 29a, 29b, 29c, and 29d illustrate examples of an operation flow of a third case of the BUS transition conditions according to an embodiment of the present disclosure.
Figure 29B:
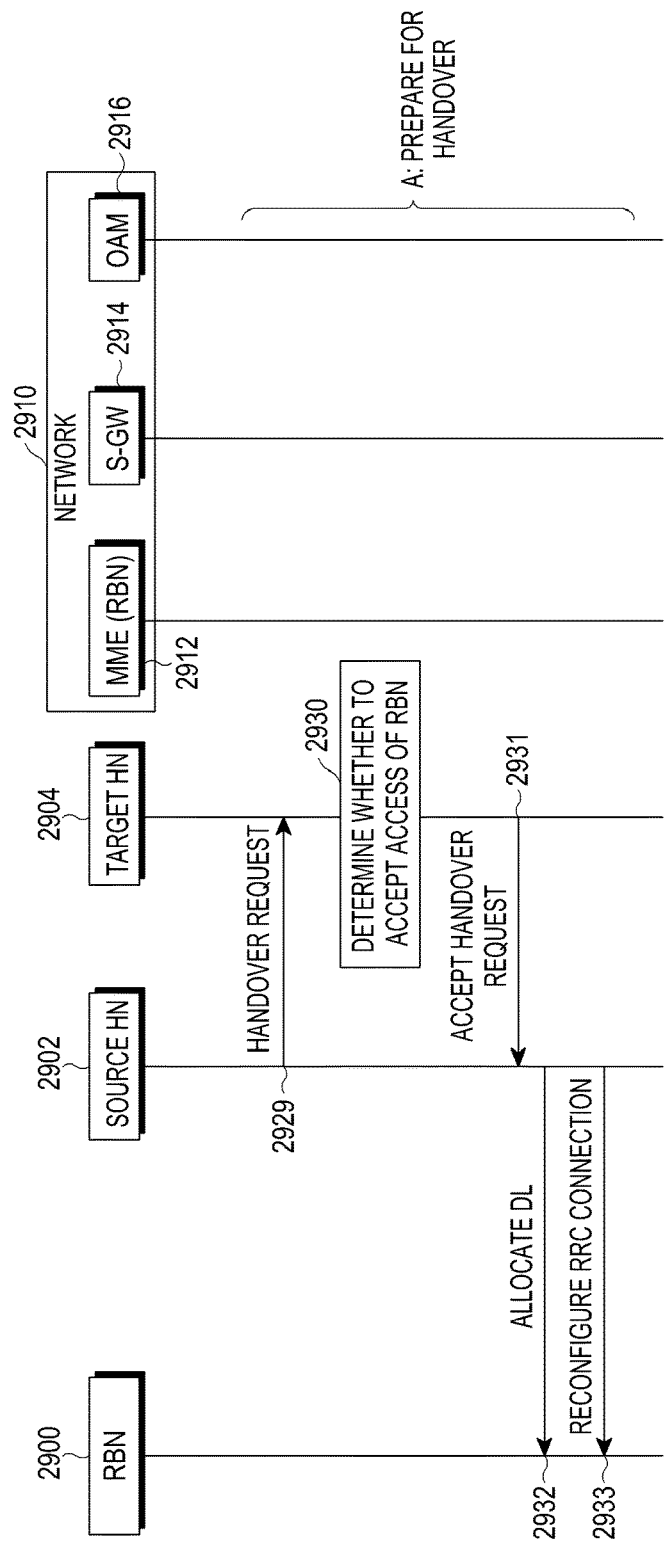
Figure 29C:
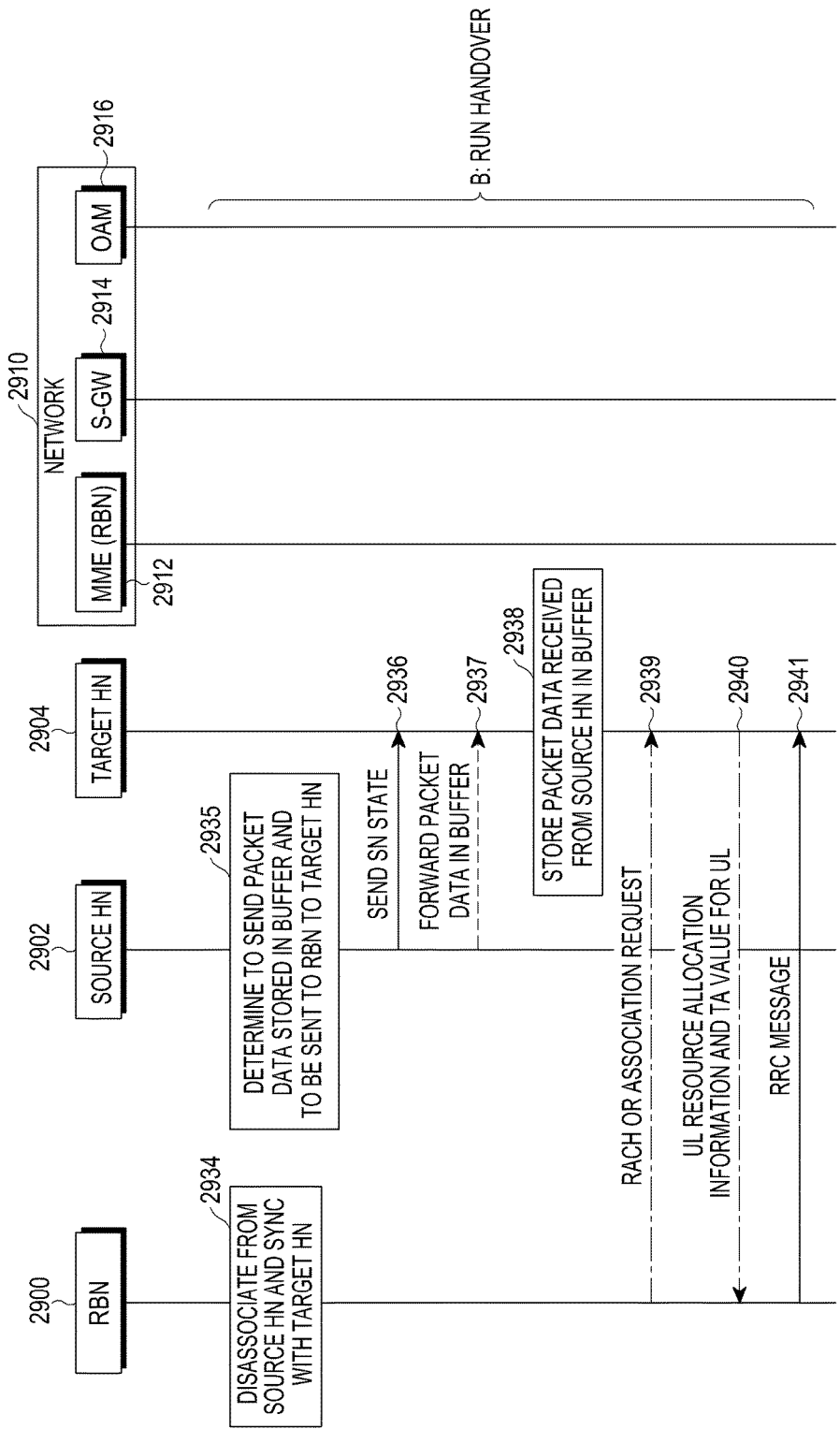
Figure 29D:
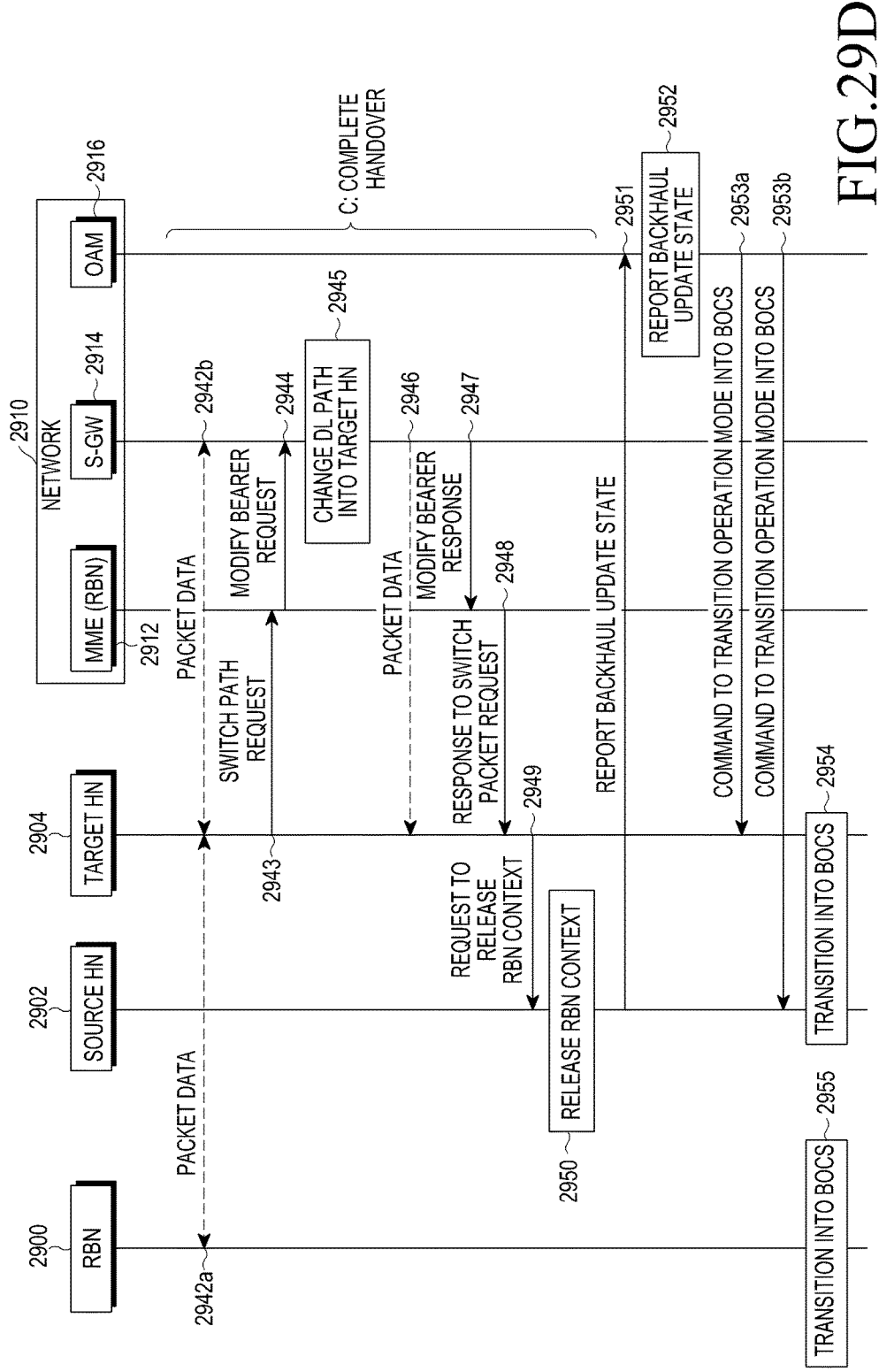

FIGS. 28a, 29b, and 29c illustrate examples of an operation flow of a second case of the BUS transition conditions according to an embodiment of the present disclosure.

Figure 28B:
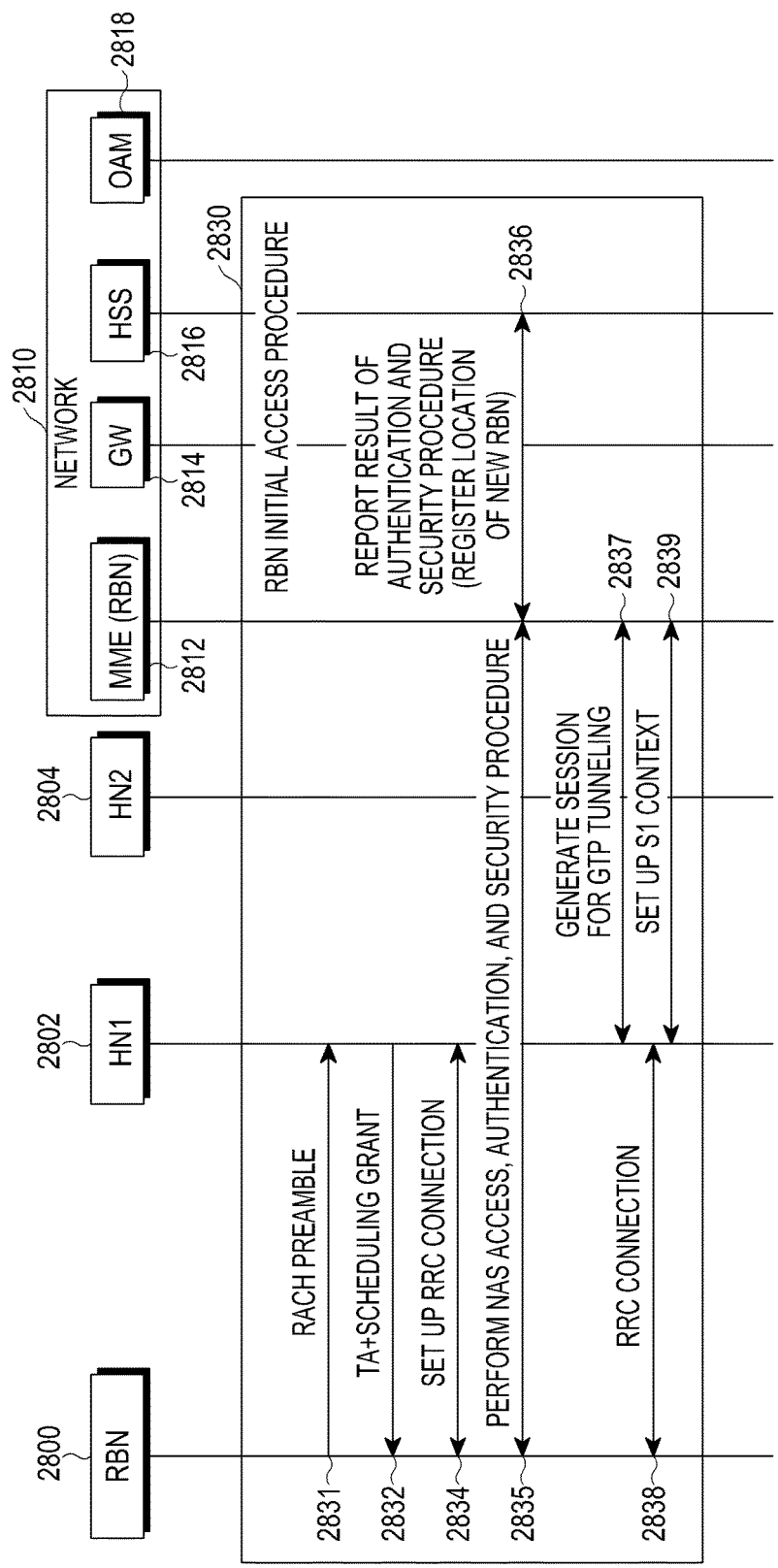
Figure 28C:
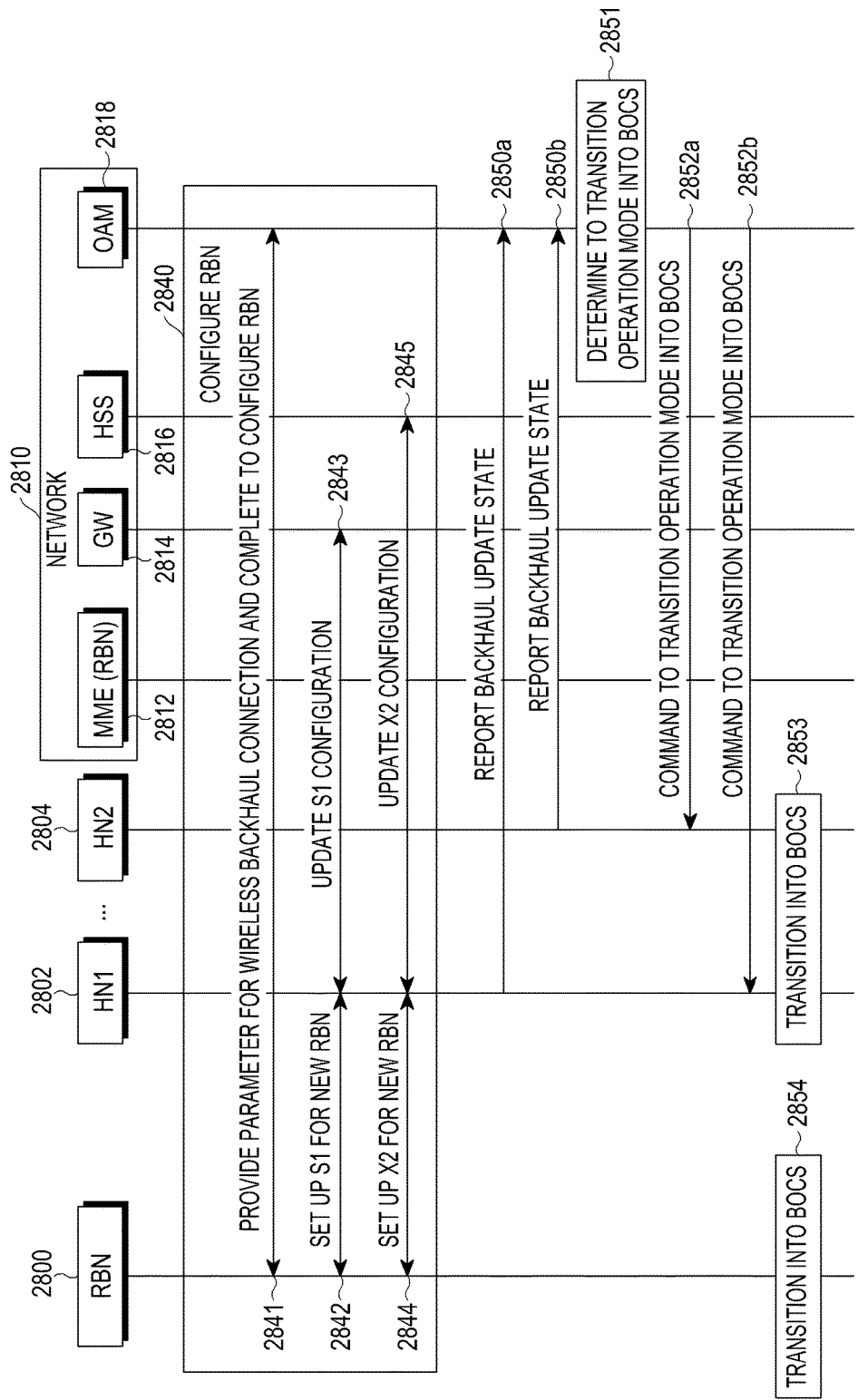

Referring to FIGS. 28a, 28b, and 28c, in operation 2822a, a RBN 2800 identifies that one of the above-described link failure determination references is met and detects the occurrence of a link failure. RBN 2800 may recognize that one of the link failure determination references, e.g., when RBN 2800 fails to receive sync signal, control information, or user data of a serving HN (e.g., HN2 2804) at the RBN 2800's lowest data speed within a predetermined time as in operation 2821, is met and thus a link failure occurs. In operation 2823, RBN 2800 transitions the RBN 2800's operation mode into BUS.

Meanwhile, in operation 2822b, a HN2 2804 identifies that one of the above-described link failure determination references is met and detects the occurrence of a link failure. As the link failure determination reference, HN2 2804 may recognize that a link failure occurs, e.g., when there is no UL response from RBN 2800 during a predetermined time as in operation 2821 or a link failure occurs when the HN2 2804 fails to continuously receive BA bits or information a predetermined number of times from a RBN operating in the LDM. Then, in operation 2824, HN2 2804 delivers a backhaul update request containing a link failure report to an OAM 2818 of network 2810. Here, HN2 2804 may include a measurement result previously reported by RBN 2800 in the backhaul update request or determine candidate HNs having a high chance of being linked by RBN 2800 and include information on the determined candidate HNs in the backhaul update request. Here, regarding the candidate HNs highly likely to be linked by RBN 2800, it may be determined that the candidate HN having a maximum received power of BM signal in the measurement result has a higher chance of being linked by RBN 2800. Further, HN2 2804 of RBN 2800 may additionally perform disassociation from network 2810 on RBN 2800.

In operation 2825, OAM 2818 determines HNs likely to be accessed by RBN 2800 using information on the candidate HNs or measurement result of RBN 2800 obtained from the backhaul update request and puts the determined HNs in one BUS HN group. Hereinafter, operations 2826a to 2850 are substantially the same as operations 2724a to 2760b of FIG. 27, and thus, no repetitive description thereof is given.

When receiving, in operation 2850, backhaul update status reports from HNs (e.g., HN1 2802 and HN2 2804 are assumed) having sent commands to transition operation mode into BUS in operations 2826a and 2826b, OAM 2818 determines whether to transition the operation mode of HN1 2802 and HN2 2804 into BOCS in operation 2851. It is assumed that the network access procedure by RBN 2800 is complete within a predetermined time or fails within a predetermined time. In such case, OAM 2818 determines to transition the respective operation modes of HN1 2802 and HN2 2804 into BOCS. In operations 2852a and 2852b, OAM 2818 delivers commands to transition operation mode into BOCS to HN1 2802 and HN2 2804, respectively. Then, in operation 2853, HN1 2802 and HN2 2804 each transition into BOCS. HN2 2804 transfers the HN2804's transition into BOCS to RBN 2800. When receiving a BOCS transition command from serving HN2 2804, RBN 2800 in operation 2854 transitions into BOCS.

In another embodiment of the second case among the BUS transition conditions, the same operations as those described above in connection with FIGS. 28a to 28c are performed except for the following:

Specifically, in another exercise of the second case, HN2, which is a serving HN of the RAN having detected a link failure, instead of OAM in the embodiment of FIG. 28, determines HNs having a chance of being accessed by the RBN linked to HN2 and puts the determined HNs in one BUS HN group. Here, among the determined HNs, ones highly likely to be accessed by the RBN may be selected and used based on the measurement result or utilizing the measurement result upon detection of the link failure from the RBN having detected the link failure.

According to the other embodiment, the serving HN2, instead of OAM, sends a request for transitioning operation mode into BUS or the operation mode transition command to each HN included in the BUS HN group and informs the OAM in the network that HN2 determines to transition operation mode into BUS for the HNs.

According to the other embodiment, the serving HN2 reports the transition into BUS to the network OAM after a predetermined time elapses. Further, after a predetermined time passes, each HN included in the BUS HN group also reports the transition into BUS to the serving HN2 and network OAM. When receiving the report for transition into BUS from the HNs included in the BUS HN group, the serving HN2 may determine whether to transition the operation mode of the HNs into BOCS. For example, when the network access of RBN having detected the link failure is complete within a predetermined time or fails within a predetermined time, the serving HN2 may determine to transition the operation mode of each HN included in the BUS HN group into BOCS. Then, the serving HN2 sends a request or command for transitioning operation mode into BOCS to each HN included in the BUS HN group, and the serving HN2 reports to the network OAM that operation mode transition into BOCS of the HNs has been determined.

FIGS. 29a, 29b, 29c, and 29d illustrate examples of an operation flow of a third case of the BUS transition conditions according to an embodiment of the present disclosure.

Referring to FIGS. 29a to 29d, it is assumed that a deterioration of link capability of a source HN, which is a serving HN, is detected to determine a transition of operation mode into BUS in operation 2918. Then, in operation 2920, source HN 2902 sends a backhaul update request to an OAM 2916. Here, the backhaul update request may include a measurement result received by the source HN from a RBN 2900 connected thereto or information on candidate HNs highly likely to be accessed by the RBN determined by the source HN.

When receiving the backhaul update request, OAM 2916 in operation 2921 determines HNs likely to be accessed by RBN 2900 based on the measurement result of RBN 2900 or information on the candidate HNs highly likely to be accessed by RBN 2900 obtained from the backhaul update request and puts the determined HNs in one BUS HN group. An example is assumed in which the BUS HN group includes a source HN 2902 and a target HN 2904. Then, in operations 2922a and 2922b, OAM 2916 delivers commands to transition operation mode into BUS to source HN 2902 and target HN 2904, respectively. In operation 2923, source HN 2902 and target HN 2904 transit the HN 2902's operation mode and the target HN 2904's operation mode into BUS and operate, respectively. Here, source HN 2902 and target HN 2904 mark "BUS" on their operation modes in BCH or beacon frame information and broadcast SI necessary for RBNs to operate in the BUS. Further, source HN 2902 and target HN 2904 each send SS and BCH slot through all their beams on DL and receive RACH signal or association request signal for access by RBN through all their beams on UL to discover the optimal beam among all their beams on each of DL and UL.

When receiving, in operation 2924, operation mode indication information indicating that the operation mode of source HN 2902 is the BUS from the serving HN of RBN 2900, i.e., source HN 2902, RBN 2900 transitions the RBN 2900's operation mode into BUS in operation 2924. In operation 2925, source HN 2902 instructs RBN 2900 to do BM. Here, in operations 2926a and 2926b, communication of packet data is possible between source HN 2902 and RBN 2900, and packet data communication is possible between source HN 2902 and GW 2914 of network 2910.

In operation 2926c, source HN 2902 assigns a UL resource of RBN 2900. Then, in operation 2927, RBN 2900 performs BM measurement based on the UL resource to detect HNs operating in the BUS as well as source HN 2902 and performs BM measurement on the detected HNs and sends a result of the measurement to source HN 2902. When receiving the BM measurement result from RBN 2900, source HN 2902, in operation 2928, identifies whether there is HN capable of providing higher-quality communication to RBN 2900 and determines a handover of RBN 2900. For example, when the HN having the maximum beam receive power known from the BM measurement result of RBN is not source HN 2902 but another HN, the other HN (e.g., it is assumed to be target HN 2904) is selected as a target HN for handover.

Then, in the embodiment shown in FIGS. 29a to 29d, a handover preparation procedure A is performed through operations 2929 to 2933. First, operation 2929, source HN 2902 sends a handover request to target HN 2904. In operation 2930, the target HN identifies whether access by RBN is acceptable, and when acceptable, the target HN sends a handover request acknowledgement to source HN 2902 to accept access by RBN 2900 in operation 2931. Then, in operation 2932, source HN 2902 assign DL resource of RBN 2900 and in operation 2933, sends a RRC message based on the DL resource to instruct a handover to target HN 2904 and sends handover-related information.

When the handover preparation procedure A is complete, a handover running procedure B is performed through operations 2934 to 2940. In operation 2934, the RBN releases connection with source HN 2902, and in operation 2935, source HN 2902 determines to deliver packet data supposed to be transmitted to RBN 2900 and stored in the buffer to target HN 2904. In operation 2936, source HN 2902 sends a packet sequence number (SN) status transmission message to target HN 2904, and in operation 2936, forwards the packet data supposed to be transmitted to RBN 2900 and stored in the RBN 2900's buffer to target HN 2904. Accordingly, in operation 2938, target HN 2904 stores the data packets forwarded from source HN 2902 in the buffer.

In operation 2939, RBN 2900 sends a RACH signal or association request to access target HN 2904. Then, in operation 2940, target HN 2904 delivers UL resource allocation information of RBN 2900 and TA value for UL. Target HN 2904 also sends a response to the association request. When RBN 2900 successfully access target HN 2904, the target HN 2904 sends a RRC message to target RBN 2904 to report that the handover is successfully done and also sends relevant information in operation 2941.

When the handover running procedure B is complete, target HN 2904, like in operation 2942a, may send packet data to RBN 2900. A handover complete procedure C is performed through operations 2943 to 2950.

In operation 2943, target HN 2904 sends a path switch request to a MME 2912 to report that the serving HN linked to RBN 2900 has been changed into target HN 2904. Then, in operation 2944, MME 2912 delivers a modify bearer request to an S-GW 2910. Then, in operation 2945, S-GW 2910 switches the path of DL data for RBN 2900 into target HN 2904. Accordingly, when DL packet data occurs, the DL packet data is transferred to target HN 2904, rather than source HN 2902, as in operation 2946.

Thereafter, in operation 2947, S-GW 2914 sends a modify bearer response message to MME 2912. Then, in operation 2948, MME 2912 sends a path switch request acknowledgement message to target HN 2904 in response to the path switch request. In operation 2949, target HN 2904 sends a RBN context release message to source HN 2902 to inform that the handover of RBN 2900 to target HN 2904 has been successfully done and to trigger resource release of source HN 2902. When receiving the RBN context release message, source HN 2902 releases wireless and control-related resources related to RBN 2900 in operation 2950. In operation 2951, source HN 2902 delivers a backhaul update status report including information on the handover result of RBN 2900 to OAM 2916 after a predetermined time elapses. Further, when a predetermined time elapses, the HNs included in the BUS HN group also deliver backhaul update status reports to source HN 2902 and OAM 2916.

Upon identifying the reception of the backhaul update status reports from source HN 2902 and target HN 2904 to which operation mode transition commands have been sent in operations 2922a and 2922b, OAM 2916 determines whether to transition the operation mode of source HN 2902 and target HN 2904 into BOCS in operation 2952. In this case, when a link capability enhancement of RBN 2900 is complete within a predetermined time or fails within a predetermined time, OAM 2916 may determine to transition the operation mode of source HN 2902 and target HN 2904 into BOCS. Assuming that the operation mode of source HN 2902 and target HN 2904 has been determined to transition into BOCS, OAM 2916 delivers commands to transition operation mode into BOCS to source HN 2902 and target HN 2904, respectively, in operations 2753a and 2753b. Then, in operation 2954, source HN 2902 and target HN 2904 each transition into BOCS. Target HN 2904 transfers the target HN 2904's transition into BOCS to RBN 2900. When receiving the same, RBN 2900 transitions into BOCS in operation 2955.

In another embodiment of the third case among the BUS transition conditions, the same operations as those described above in connection with FIGS. 29a to 29d are performed except for the following:

Specifically, in another embodiment of the third case, the source HN, instead of OAM, determines HNs having a chance of being accessed by the RBN linked to source HN and puts the determined HNs in one BUS HN group. The BUS HN group may be selected using the measurement result of the RBN or information on the candidate HNs highly likely to be accessed by the RBN. The source HN delivers a request or command for transition operation mode into BUS to the HNs included in the BUS HN group and reports to the OAM that an operation mode transition into BUS of the HNs in the BUS HN group has been determined. According to another embodiment, the source HN, instead of the OAM, determines whether to transition the operation mode of the HNs in the BUS HN group into BOCS. Here, when a link capability enhancement of the RBN is complete within a predetermined time or fails within a predetermined time, the HNs may be determined to transition into BOCS. The source HN, instead of the OAM, delivers a request or command for transitioning operation mode into BOCS to the HNs in the BUS HN group, and the source HN further reports the determination of transition of the operation mode of the HNs into then BOCS to the OAM.

Figure 30:
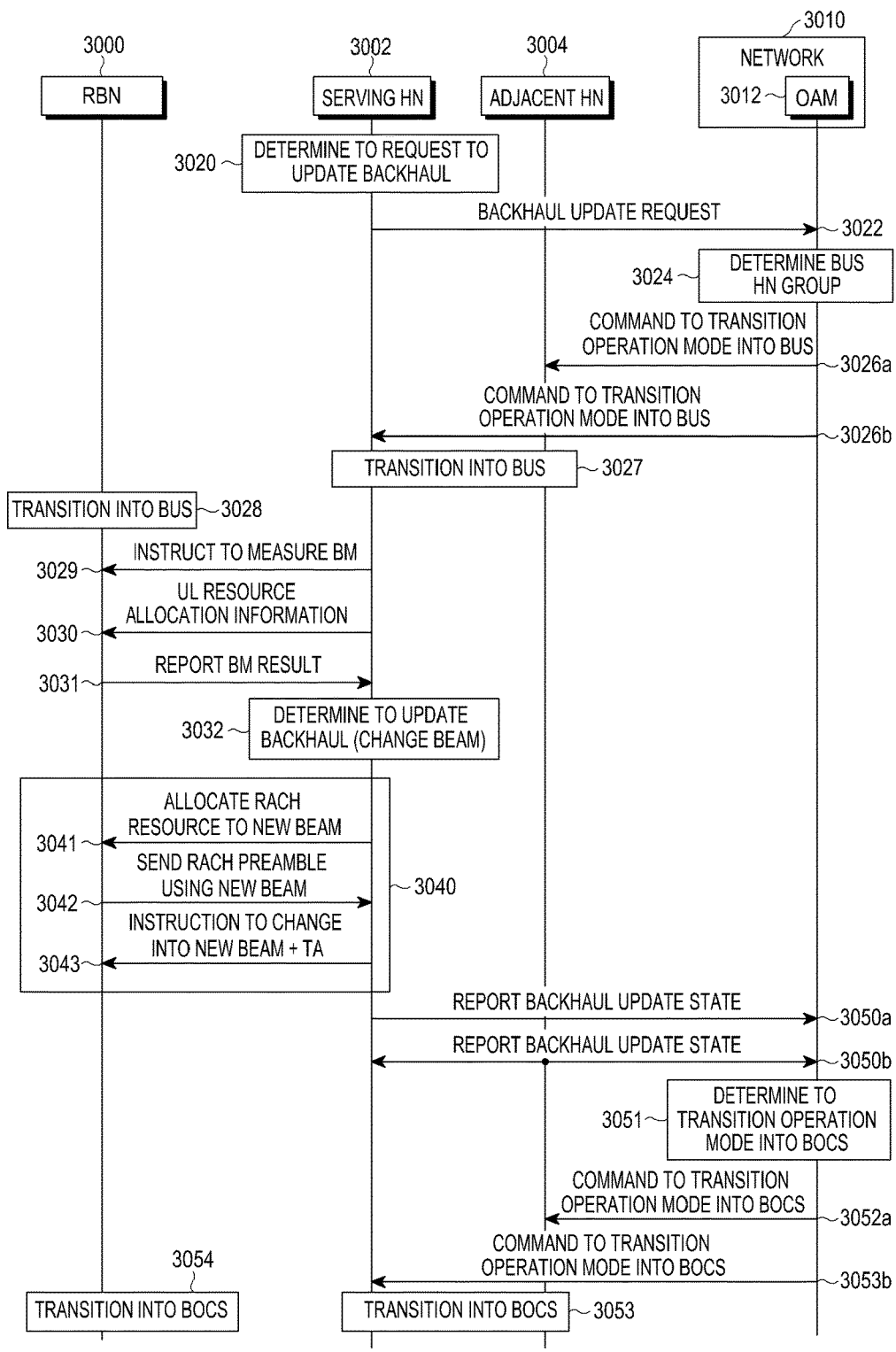
FIG. 30 illustrates an example of an operation flow of a fourth case of the BUS transition conditions according to an embodiment of the present disclosure.

FIG. 30 illustrates an example of an operation flow of a fourth case of the BUS transition conditions according to an embodiment of the present disclosure.

Referring to FIG. 30, it is assumed that in operation 3020, a serving HN 3002 of a RBN 3000 detects a deterioration of link capability and determines to request to update backhaul. Accordingly, in operation 3022, serving HN 3002 delivers a backhaul update request to an OAM 3012 of a network 3010. Here, the backhaul update request may include a measurement result received from RBN 3000 or information on candidate HNs highly likely to be accessed by RBN 3000 determined by source HN 3002 based on the BM result. In operation 3012, OAM 3012 having received the backhaul update request determines HNs likely to be accessed by RBN 3000 using information on the candidate HNs or measurement result obtained from the backhaul update request and puts the determined HNs in one BUS HN group. Here, assuming that serving HN 3002 and an adjacent HN 3004 are in the BUS HN group, OAM 3012, in operations 3026a and 3026b, delivers a command to transition operation mode into BUS to each of the HNs, i.e., serving HN 3002 and adjacent HN 3004, of the BUS HN group.

When receiving the operation mode transition command, serving HN 3002 and adjacent HN 3004 each transition into BUS and operate in operation 3027. Here, serving HN 3002 and adjacent HN 3004 each puts a mark indicating that the serving HN 3002's operation mode and the adjacent HN 3004's operation mode, respectively, into the BUS on the BCH and broadcasts SI necessary for RBNs linked thereto to operate in the BUS. Further, serving HN 3002 and adjacent HN 3004 transmit SS and BCH for all the beams on DL, receive RACH through all the RACH's beams on UL, and select the optimal beam by conducting BM on DL and UL.

In operation 3028, when receiving BCH broadcast from serving HN 3002 and identifying that the operation mode of serving HN 3002 is the BUS, RBN 3000 transitions into BUS and operates.

In operation 3029, serving HN 3002 instructs RBN 3000 to conduct BM, and in operation 3030, serving HN 3002 delivers UL resource allocation information for RBN 3000 to RBN 3000. In operation 3031, RBN 3000 detects adjacent HNs, e.g., adjacent HN 3004, operating in the BUS, as well as serving HN 3002 using a UL resource corresponding to the UL resource allocation information, conducts BM measurement on the detected adjacent HNs, and reports a result to serving HN 3002.

In operation 3032, upon identifying that there is a communication path in a different direction which provides higher-quality communication to RBN 3000 based on the BM result, serving HN 3002 determines to change beams for RBN 3000, and in operation 3040, serving HN 3002 conducts a beam changing procedure on RBN 3000. Specifically, in operation 3041, serving HN 3002 instructs RBN 3000 to send a RACH signal in a new beam. Pursuant to the instruction, in operation 3042, RBN 3000 sends a RACH signal in the new beam. When receiving the RACH signal, serving HN 3002 in operation 3043 gives a UL TA value to RBN 3000 and instructs RBN 3000 to change and use the new beam. A wireless backhaul adopting the IEEE 802.11ad wireless LAN standard changes optimal beams without RACH signal transmission/reception in operation 3042 and TA value transfer process in operation 3043 among the operations constituting the beam changing procedure 3040.

Thereafter, in operation 3050a, serving HN 3002 delivers a backhaul update status report containing information on the beam change of RBN 300 to OAM 3012. Further, in operation 3050b, the HNs, i.e., adjacent HN 3004, in the BUS HN group also deliver backhaul update status reports to serving HN 3002 and OAM 3012 when a predetermined time elapses.

Upon identifying the reception of the backhaul update status reports from source HN 3002 and adjacent HN 3004 to which operation mode transition commands have been sent in operations 3026a and 3026b, OAM 3012 determines whether to transition the operation mode of source HN 3002 and neighbor HN 3004 into BOCS in operation 3051. In this case, when a link capability enhancement of RBN 3000 is complete within a predetermined time or fails within a predetermined time, OAM 3012 may determine to transition the operation mode of source HN 3002 and adjacent HN 3004 into BOCS. Assuming that the operation mode of source HN 3002 and adjacent HN 3004 has been determined to transition into BOCS, OAM 3000 delivers commands to transition operation mode into BOCS to source HN 3002 and adjacent HN 3004, respectively, in operations 3052a and 3052b. Then, in operation 3053, source HN 3002 and adjacent HN 3004 each transition into BOCS. Adjacent HN 3004 transfers the HN 3004's transition into BOCS to RBN 3000. When receiving the same, RBN 3000 transitions into BOCS in operation 3054.

In another embodiment of the fourth case among the BUS transition conditions, the same operations as those described above in connection with FIG. 30 are performed except for the following:

Specifically, in another embodiment of the fourth case, the serving HN, instead of OAM, determines HNs having a chance of being accessed by the RBN linked to source HN and puts the determined HNs in one BUS HN group. The BUS HN group may be selected using the measurement result of the RBN or information on the candidate HNs highly likely to be accessed by the RBN. The serving HN delivers a request or command for transition operation mode into BUS to the HNs included in the BUS HN group and additionally reports to the OAM that an operation mode transition into BUS of the HNs in the BUS HN group has been determined. According to another embodiment, the serving HN determines whether to transition the operation mode of the HNs in the BUS HN group into BOCS. Here, when a link capability enhancement of the RBN is complete within a predetermined time or fails within a predetermined time, the HNs may be determined to transition into BOCS. The serving HN, instead of the OAM, delivers a request or command for transitioning operation mode into BOCS to the HNs in the BUS HN group, and the serving HN further reports the determination of transition of the operation mode of the HNs into then BOCS to the OAM.

Further, according to another embodiment, the procedures shown in FIGS. 29 and 30 may be performed at predetermined periods or by the operator's instruction to enhance capability.

Figure 31:
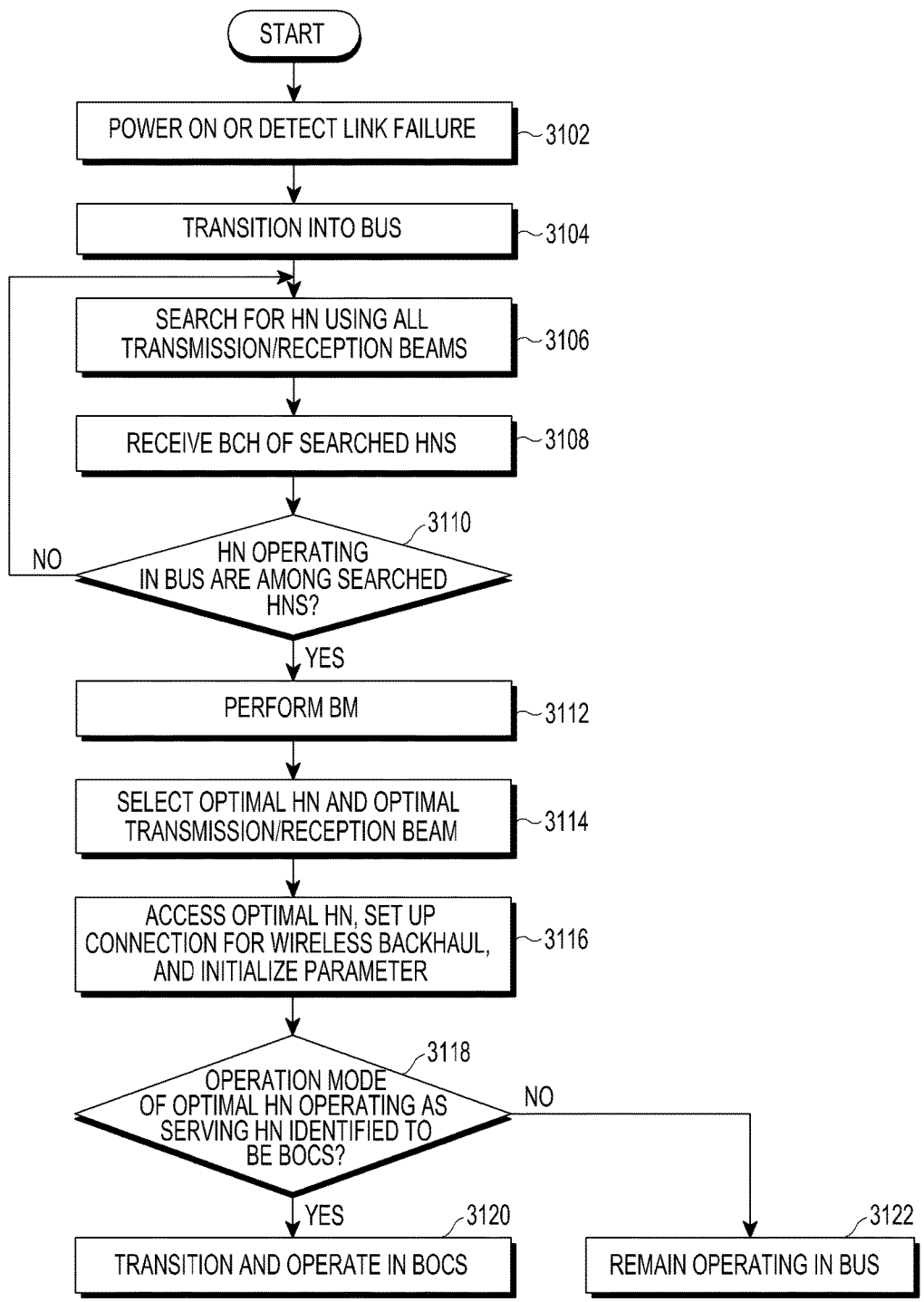
FIG. 31 illustrates an operation flow of an RBN according to an embodiment of the present disclosure.

FIG. 31 illustrates an operation flow of a RBN according to an embodiment of the present disclosure. In connection with the embodiment shown in FIG. 31, RBN is assumed to be a RBN that attempts initial access to a network in a wireless backhaul or reaccesses the network after a link failure occurs.

When powering on or detecting a link failure in operation 3102, RBN transitions into BUS in operation 3104. Through operations 3106 to 3110, RBN stands by for detecting at least one HN that has transitioned into BUS. Specifically, RBN in operation 3106 searches for HNs using all the RBN's beams, and in operation 3108, receives the BCH of a searched HN to obtain shared control information of the HN. In operation 3110, RBN identifies whether the operation mode of the detected HN is the BUS. Unless the identification result shows that the operation mode of the detected HN is the BUS, RBN returns to operation 3106 to search for HNs.

When the operation mode of the detected HN is identified as the BUS, RBN in operation 3112 measures the receive power of all transmission/reception beam combinations on the detected HN. In operation 3114, RBN discovers the optimal transmission/reception beam combination giving the maximum receive power for each detected HN and further discovers the optimal HN (HNopt) having the maximum receive power. In operation 3116, RBN sends a RACH preamble to HNopt, accesses and generates a wireless backhaul link, initializes parameters for the link and sets up a configuration, and reports the BM result to HNopt. In operation 3118, RBN identifies whether the operation mode of HNopt, which is the serving HN, is the BOCS. When the operation mode of HNopt is identified to be the BOCS, RBN in operation 3120 transitions into BOCS and operates. When the operation mode of HNopt is identified to be the BUS, RBN in operation 3122 maintains the current operation mode.

Figure 32:
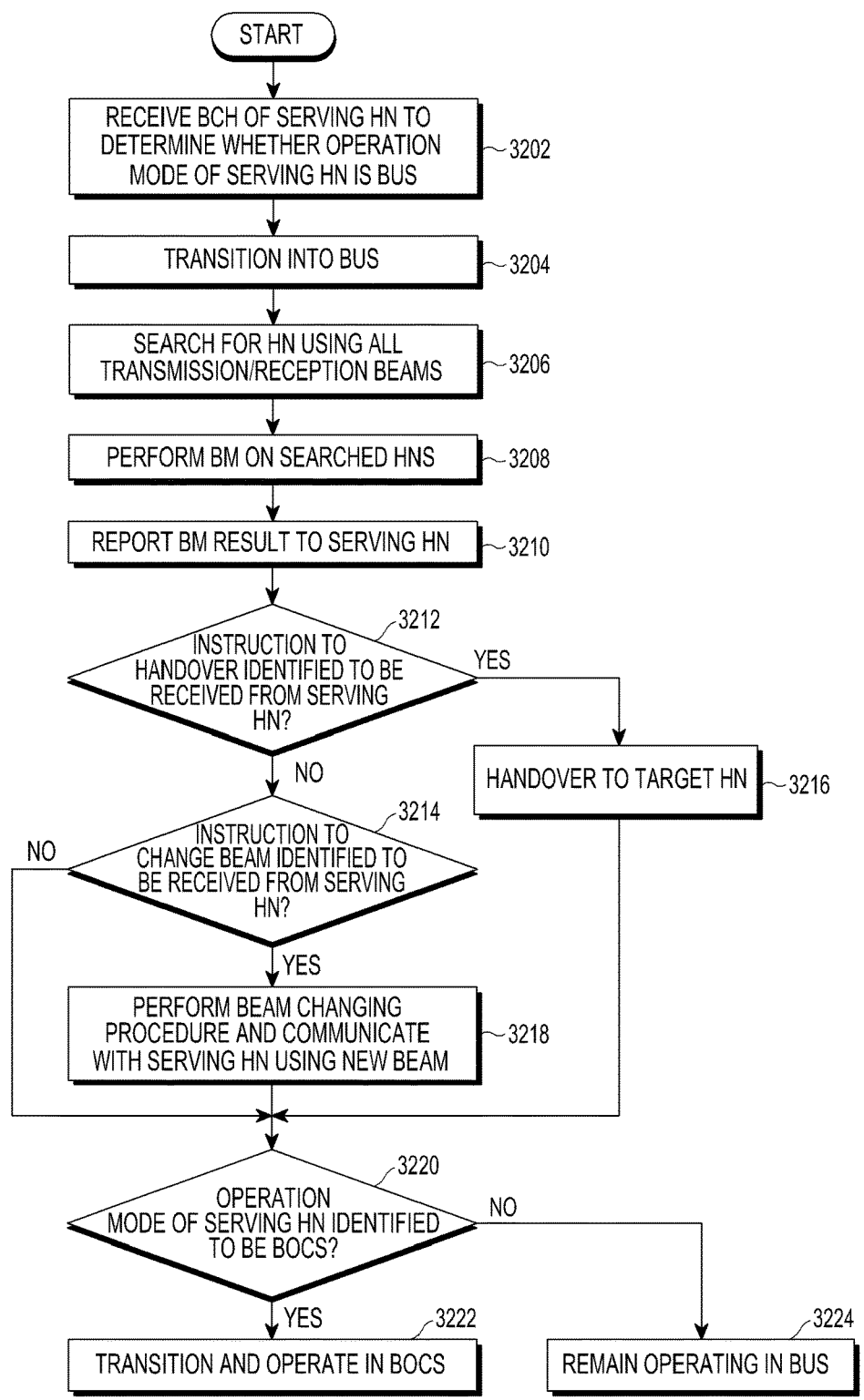
FIG. 32 illustrates an operation flow of an RBN according to another embodiment of the present disclosure.

FIG. 32 is a view illustrating an operation flow of a RBN according to another embodiment of the present disclosure. RBN in the embodiment shown in FIG. 32 is assumed to be a RBN detecting a link capability deterioration of wireless backhaul to change serving HNs or beams.

When identifying that the operation mode of serving HN is the BUS through shared control information of BCH received from serving HN in operation 3202, RBN transitions into BUS and operates in operation 3204. In operation 3206, RBN searches for HNs with all the RBN's beams, and in operation 3208, RBN performs BM for measuring the receive power of all transmission/reception beam combinations on the detected HNs. In operation 3210, RBN reports the measurement result to serving HN.

In operation 3212, RBN identifies whether an instruction to hand over to the target HN is received from the serving HN. When the handover instruction is identified to be received, RBN in operation 3216 hands over to the target HN and goes to operation 3220. Unless the handover instruction is received, RBN proceeds with operation 3214. In operation 3214, RAN identifies whether to receive an instruction to change into a new beam from the serving HN. When the instruction to change is identified to be received, RBN in operation 3218 sends a RACH preamble to serving HN using the new beam as instructed by serving HN, receives a TA for the new beam from serving HN, and communicates with serving HN using the new beam.

In operation 3220, RBN identifies whether the operation mode of serving HN is the BOCS. When the operation mode of serving HN is identified to be the BOCS, RBN in operation 3222 transitions into BOCS and operates. When the operation mode of serving HN is identified to be the BUS, RBN in operation 3224 maintains the current operation mode.

Meanwhile, according to an embodiment of the present disclosure, he wireless backhaul may optimize capability through an operation mode transition. As shown in FIG. 3, a transition between communication modes is possible while RBN is operating in the BOCS, thereby leading to further enhanced capability. Among the communication modes, ABM may support a mitigation of capability deterioration that occurs due to an influence from external environment. Transition condition and operations between communication modes according to an embodiment of the present disclosure may be specified as follows:

Referring to FIG. 3, a transition (a) from FBM 342 to ABM 344 may be made under the environment that the antenna of HN or RBN is swayed by an external influence, e.g., a strong wind gust, resulting in the magnitude of received signal fluctuating.

According to an embodiment of the present disclosure, as a reference of transition (a), FBM-to-ABM transition (a) may be determined to be made when, in order to detect such a phenomenon that wireless channel characteristics of serving HN and RBN are varied over time, and among link capabilities, the receive power of signal per unit radio resource for RBN or AGC of receiver is varied over time, the difference between the maxium value P max(t, t–Ta) and minimum value Pmin(t, t–Ta) of link capability index within a predetermined time interval (e.g., Ta=one min.) is larger than a threshold (e.g., :ΔPa=6 dB), and the time during which the difference is larger than the threshold lasts a predetermined time (e.g., Tm=10 min.) or longer.

Transition (a) may be represented in Equation 2 below:

Decide $M1$, if, for $t=t1\sim t1-Tm$, $$P\max(t,t-Ta)-P\min(t,t-Ta) > :\Delta Pa. \quad \text{Equation (2)}$$

Upon meeting the transition (a) reference, serving HN determines to transition the communication mode of RBN from FBM to ABM, assigns DL BM slot or UL BM slot, or DL and UL BM slot, and instructs RBN to perform DL BM or UL BM, or DL and UL BM. Then, HN and RBN conduct beam measurement according to an embodiment of the present disclosure. The DL optimal beam is determined by RBN, and the UL optimal beam is determined by HN. Or, according to an embodiment of the present disclosure, BM is performed only on DL, and UL may use a UL beam in the same direction as that of the DL optimal beam. Alternatively, BM may be performed only on UL, and DL may use a DL beam in the same direction as that of the UL optimal beam. According to an embodiment of the present disclosure, HN and RBN may perform adjustment so that the BM range encompasses the optimal beam while monitoring the variation in the optimal beam in a three-dimensional (3D) beam direction and adaptively varying the beam range to be measured. Further, according to an embodiment of the present disclosure, when each of a plurality of RBNs linked to one serving HN measures BM, the number of DL or UL beams may be different per RBN.

Next, referring to FIG. 3, as a reference for a transition (b) from ABM 344 to FBM 342, a transition into FBM may be made upon meeting a transition (b) reference where the optimal beam is not varied for a predetermined time in ABM. For example, when the optimal beams of serving HN and RBN operating in ABM for 10 or 30 minutes are not varied, transition (b) into FBM may be determined to be made. Then, according to an embodiment of the present disclosure, serving HN determines a communication mode transition of RBN and delivers a command to transition communication mode into FBM to RBN without assigning DL and UL BM slot to RBN.

Referring to FIG. 3, in a case where a transition (f) is made from FBM to LDM, e.g., upon meeting such a transition (f) reference in which BS installed in RBN operates in LDM, RBN may send a request for transitioning communication mode into LDM to serving HN.

When receiving the request for transitioning communication mode into LDM from RBN, serving HN determines DL paging period, UL scheduling request (SR) period, UL BA bit or information transmission period which are to be used when RBN operates in LDM and informs RBN. Then, RBN receives DL control information at each DL paging period to determine whether paging is present, has a chance of transmitting an SR bit at the uplink scheduling request period, and sends a BA bit at each UL BA bit transmission period. RBN sends BA bits for all the RBN's BA bit transmission times while operating in LDM.

Referring to FIG. 3, in a transition (e) from LDM 346 to FBM 342 or a transition (d) to ABM 344, e.g., when paging is received on DL by a UE located in the coverage of RBN-BS may be set as a mode transition condition in LDM. As another example, when RBN sends a UL SR bit or information to transmit UL information or data on UL may be determined as a mode transition condition in LDM.

When the above-described mode transition condition in LDM is met, a communication mode prior to transition into LDM is identified, and a transition is made corresponding to the prior communication mode. Specifically, when the prior communication mode is FBM, a transition into FBM is made, and when the prior communication mode is ABM, a transition into ABM is made. Or, according to an embodiment of the present disclosure, FBM may be set as default, so that a communication mode transition in LDM always is made to FBM or ABM selectively. When meeting the mode transition condition in LDM as set forth above, RBN transitions into the prior communication mode or default communication mode and may use the optimal beam used to be used in the prior communication mode.

Referring to FIG. 3, in a transition (c) from ABM 344 to LDM, like transition (f), when BS of RBN is operated in LDM may be set as a transition (c) condition. When the transition (c) condition is met, RBN sends a request for switching communication mode into LDM to serving HN. When receiving the communication mode switching request, serving HN determines DL paging period, UL SR period, UL BA bit or information transmission period which are to be used when RBN operates in LDM and informs RBN. RBN operating in LDM receives DL control information at each DL paging period to determine whether there is paging, has a chance of sending an SR bit at UL SR period, and sends a BA bit at each UL BA bit period. Here, RBN sends BA bits for all the RBN's BA bit transmission times while operating in LDM.

Meanwhile, according to an embodiment of the present disclosure, when HN and RBN transition their operation mode from BUS to BOCS, FBM or ABM may be selected as a default communication mode of RBN.

Figure 33A:
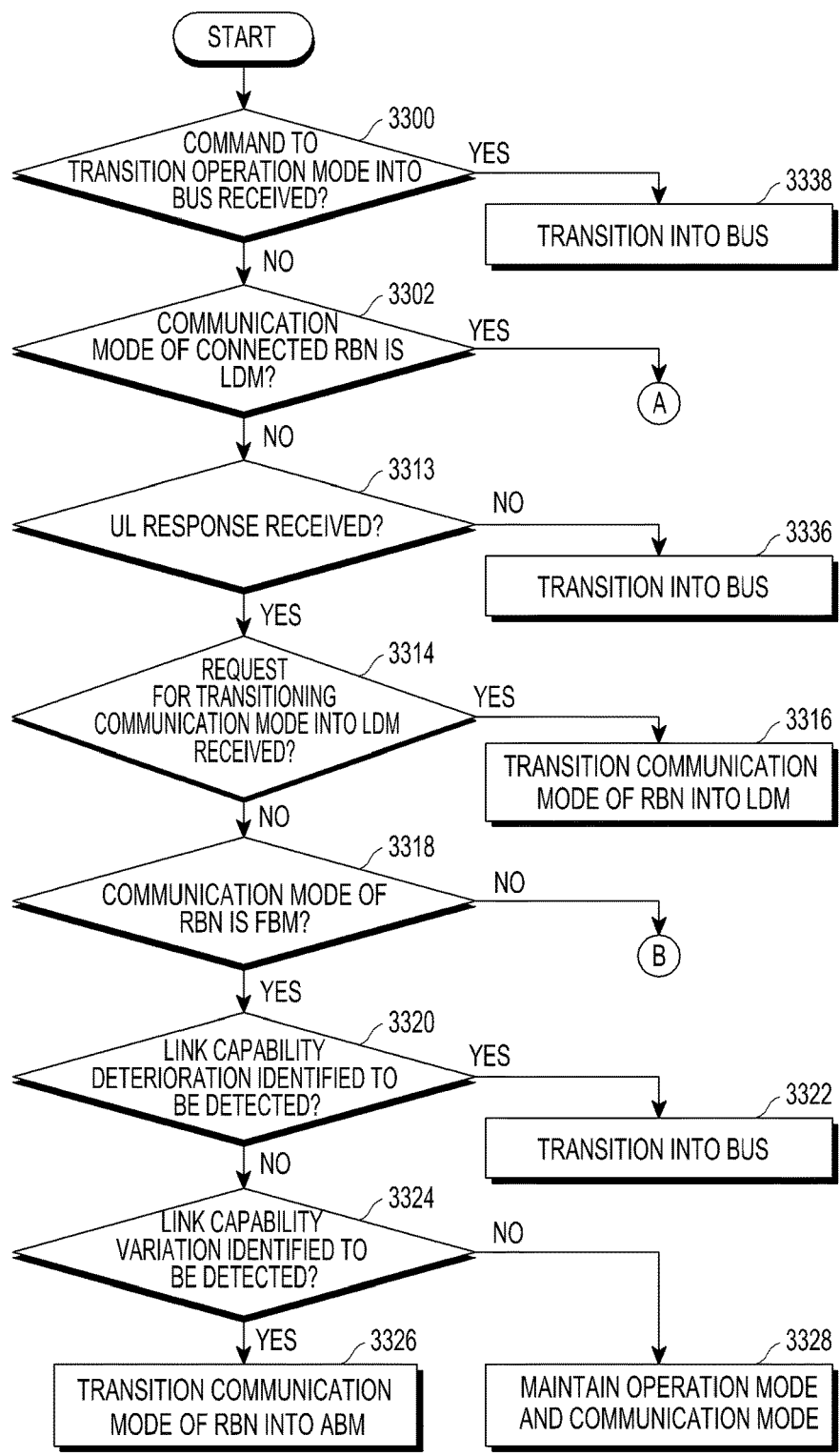
FIGS. 33a, 33b, and 33c illustrate an example of an operation mode of an HN operated in a BOCS and a communication mode transition operation according to an embodiment of the present disclosure.
Figure 33B:
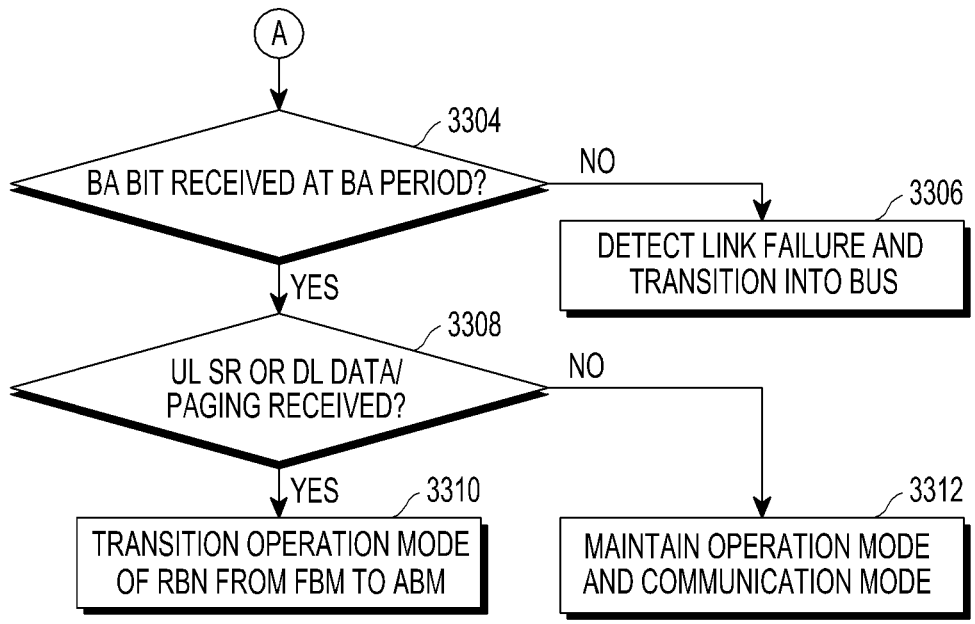
Figure 33C:
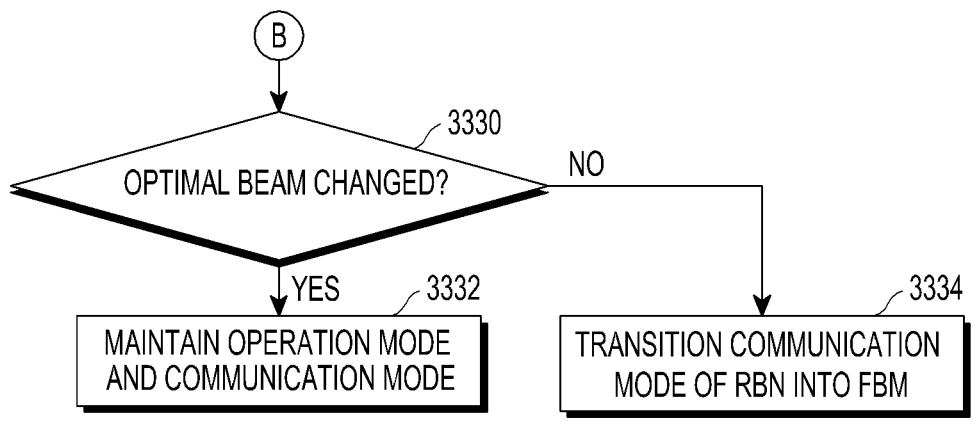

FIG. 33 is a view illustrating an example of an operation mode of an HN operated as a BOCS and a communication mode transition operation according to an embodiment of the present disclosure.

Referring to FIG. 33, in operation 3300, HN identifies whether to receive a command to switch operation mode into BUS from an OAM of network or adjacent HN. When the command of switching operation mode into BUS is identified to be received, HN in operation 3338 transitions operation mode into BUS. In such case, according to an embodiment of the present disclosure, HN may perform the operations described above in connection with FIGS. 27 to 30.

Unless the command of switching operation mode into BUS is identified to be received, HN in operation 3302 identifies whether the communication mode of RBN linked to HN is LDM. When the communication mode is identified to be LDM, HN in operation 3304 identifies whether BA bit or information is received from RBN at least once without error during a predetermined BA period. When no BS bit or information is identified to be received during the BS period, HN in operation 3306 detects a wireless backhaul link failure between HN and RBN and transitions into BUS. In such case, HN having transitioned into BUS may operate according to the embodiment shown in FIG. 28. In this case, HN may correspond to HN2 of FIG. 28.

When BA is identified in operation 3304 to be received at least once or more, HN in operation 3308 determines that the wireless backhaul link with RBN is maintained and identifies whether SR bit or information is received from RBN to send UL data or control information, whether there is data to be sent on DL from HN to RBN, or whether paging is received from a MS linked to BS of RBN. As a result of the identification, upon meeting one of when SR bit or information is received, when there is data to be sent on DL, and when paging is received from MS, HN in operation 3310 switches the communication mode of RBN from FBM to ABM and conduct wireless backhaul communication. Here, the communication mode switch of RBN is operated corresponding to the operations related to transition (e) and transition (d) described above in connection with FIG. 3. As a result of the identification, when none of when SR bit or information is received, when there is data to be sent on DL, and when paging is received from MS are met, HN and RBN in operation 3312 maintain their current communication modes BOCS and LDM.

When the communication mode of RBN is identified in operation 3302 to be not LDM, HN in operation 3312 identifies whether a UL response to DL control information or data is received from RBN within a predetermined time without error. As a result of the identification, when a UL response to DL control information or data is not received within the predetermined time or received information has an error, HN determines that a wireless backhaul link failure occurs between HN and RBN and HN in operation 3336 transitions the HN's operation mode into BUS. In this case, HN performs an operation corresponding to HN2 of FIG. 28.

When a UL response to DL control information or data is identified in operation 3312 to be received within the predetermined time, HN in operation 3314 identifies whether to receive a request for transitioning communication mode into LDM from RBN. When the request for transitioning communication mode into LDM is identified to be received, HN in operation 3316 delivers the request for transitioning communication mode into LDM to RBN. In this case, a transition operation is performed corresponding to transition (c) and transition (f) of FIG. 3. Unless the request for transitioning communication mode into LDM is identified to be received, HN in operation 3318 identifies whether the communication mode of RBN is FBM.

When the communication mode of RBN is FBM, HN in operation 3320 identifies whether link capability for RBN is poor during a time determined as in Equation 1 described above. When the link capability is identified to be poor, HN in operation 3322 determines that a wireless backhaul link capability deterioration for RBN occurs and transitions the HN's operation mode into BUS. In this case, HN may perform operations corresponding to those shown in FIG. 29 or 30. Here, HN may operate as the source HN of FIG. 29 or serving HN of FIG. 30.

When the link capability of RBN is identified in operation 3320 to be not poor during the time, HN in operation 3324 identifies whether a variation in the wireless backhaul link capability for RBN is larger than a threshold, e.g., during a time determined as in Equation 2. When the variation in the link capability is identified to be larger than the threshold, HN in operation 3326 transitions the communication mode of RBN into ABM. Here, HN operates corresponding to the transition (a) operation described above in connection with FIG. 3. When the variation in the link capability is identified to be equal or smaller than the threshold, HN and RBN in operation 3328 maintain the current operation modes and communication modes, i.e., BOCS and FBM.

When the communication mode of RBN is identified in operation 3318 to be not FBM, HN in operation 3330 identifies whether the optimal beam for RBN is changed during a predetermined time. When the optimal beam is changed, HN and RBN in operation 3332 maintain the current operation modes and communication modes, i.e., BOCS and ABM. When the optimal beam is identified to be not changed, HN in operation 3334 transitions the communication mode of RBN into FBM. In this case, HN operates corresponding to the transition (b) operation described above in connection with FIG. 3.

Figure 34:
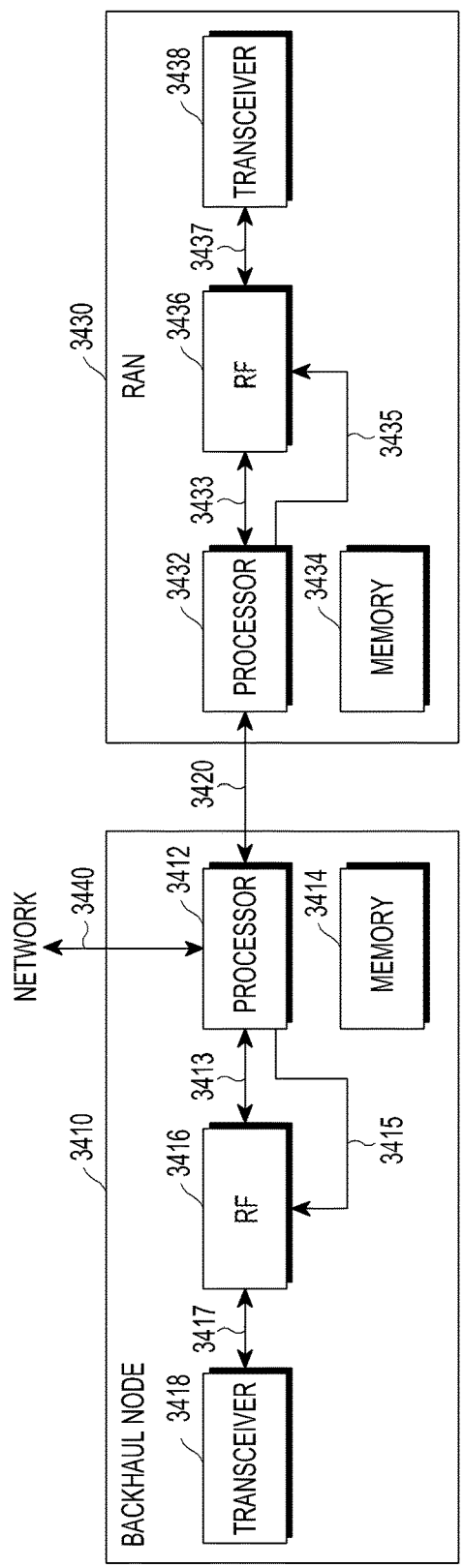
FIG. 34 illustrates an example of a configuration of a backhaul node and RAN according to an embodiment of the present disclosure.

FIG. 34 is a view illustrating an example of a configuration of a backhaul node and RAN according to an embodiment of the present disclosure. The configuration of the backhaul node and RAN of FIG. 34 is merely an example for illustrative purposes, and according to an embodiment of the present disclosure, the configuration may be broken down into more detailed functional units, modules, components, devices, or the backhaul node and RAN components may be integrated into a single unit or varied to fit the business provider's intention.

Referring to FIG. 34, backhaul node 3410 corresponds to an HN or RBN according to an embodiment of the present disclosure, and RAN corresponds to a MBS or SBS.

Backhaul node 3410 includes, e.g., a transceiver unit 3418, a radio frequency (RF) unit 3416, a processor 3412, and a memory 3414, and RAN 3430 includes a processor 3432, a memory 3434, a RF unit 3436, and a transceiver unit 3438. Backhaul node 3410 is connected with a network via element 3440 and is connected with RAN 3430 via element 3420. According to an embodiment of the present disclosure, processor 3412 performs wireless backhaul communication functions including transmission and reception of wireless backhaul data, wireless backhaul control information, and various wireless backhaul signals and a control function for wireless backhaul operation, and memory 3414 stores various wireless backhaul data, control information, and signals. Processor 3412 controls RF unit 3416 and connects with RF unit 3416 to communicate signals. RF unit 3416 is connected with transceiver unit 3418 to communicate RF signals. Here, processor 3412 controls transceiver unit 3418 and RF unit 3416 to select and control transmission/reception beams generated by transceiver unit 3418 and RF unit 3416. Processor 3412 may be implemented in hardware, a control processing unit (CPU) and software, or in both hardware and software. As described above in connection with the structure shown in FIG. 18, backhaul node 3410 and RAN 3430 may be implemented in various structures, and reference number 3420 may be a communication cable connecting the devices, a backplane connecting boards, or a bus connecting chips on the same board. The network connection via element 3440 may be implemented wiredly or wirelessly through another backhaul node. When backhaul node 3410 is an HN, and element 3440 is connected to a RBN which is another backhaul node, a multi-hop or wireless mesh network may be established. When backhaul node 3410 is a RBN, element 3440 may be omitted.

In sum, as described above, according to an embodiment of the present disclosure, a wireless backhaul may be operated in only one of two operation modes, i.e., BUS and BOCS, leading to optimized wireless backhaul capability and minimized costs necessary for installation and operation of wireless backhaul device. Further, according to an embodiment of the present disclosure, a wireless backhaul provides operation mode transition references and methods. According to an embodiment of the present disclosure, a wireless backhaul provides such functionality as to transition operation mode into BUS when a new RBN is installed to automatically discover the optimal HN and optimal transmission/reception beam for the new RBN, link to the optimal HN, provide network connection, and establish the optimal wireless backhaul link. As a result, costs for installation of a new RBN may be minimized.

Further, according to an embodiment of the present disclosure, a wireless backhaul provides such functionality as to transition operation mode into BUS upon detecting a link failure between HN and RBN or capability deterioration due to a variation in communication environment of a wireless backhaul already established to discover a new optimal HN and optimal transmission/reception beam providing higher-quality communication to a RBN for which a capability deterioration has been detected, link to the new optimal HN, provide network connection, and restore the wireless backhaul link. Resultantly, costs (OPEX) incurred during the course of wireless backhaul operation may be minimized.

Further, according to an embodiment of the present disclosure, a wireless backhaul provides such functionality as to transition operation mode into BUS when a variation in communication environment of a wireless backhaul already established is varied to cause a deterioration in communication capability of HN and RBN, and the network determines an operation mode switch due to the link capability deterioration to discover a transmission/reception beam corresponding to a new optimal communication path providing higher-quality communication to a RBN suffering from a communication capability deterioration, allow the same to change beams, and optimize wireless backhaul link capability. Also in this case, costs incurred during the course of wireless backhaul operation may be minimized.

According to an embodiment of the present disclosure, a wireless backhaul, upon determining that the wireless backhaul is operated in BUS to achieve a target value, transitions into BOCS to conduct optimized wireless communication using only the optimal transmission/reception beam. In order to maximize efficiency while minimizing waste of radio resources in BOCS, according to an embodiment of the present disclosure, HN sends SS and BCH on DL using some limited beams among all the HN's beams that are able to be transmitted or received by the HN's antenna for only RBNs linked to HN, thus minimizing interference and waste of radio resources on DL and optimizing capability. Further, BM for selecting the optimal beam among all DL and UL beams is not supported, but rather, limited beam tracking is supported only on some candidate beams adjacent to the optimal beam, thereby leading to minimized waste of radio resources for beam measurement, along with increased beam measurement efficiency and performance. No RACH preamble or association request signal for access to HN of RBN is transmitted or received on UL, thus allowing for minimized interference and waste of UL radio resources and optimized capability.

According to an embodiment of the present disclosure, a wireless backhaul may be implemented using a cellular mobile communication standard adopting beamforming technology or using the IEEE 802.11ad beamforming wireless LAN standard. However, according to an embodiment of the present disclosure, in BOCS, a wireless backhaul supports only some functions, but not all of the functions of mobile communication or wireless LAN communication as per the standard.

According to an embodiment of the present disclosure, when operated in BOCS, RBN operates in only one communication mode of FBM, ABM, and LDM, leading to a further enhancement in efficiency and performance of wireless backhaul. According to an embodiment of the present disclosure, in a wireless backhaul, HN and RBN communicate in FBM of BOCS without changing the optimal transmission/reception beam discovered in BUS and does not communicate beam measurement signals for beam measurement and beam change, thus increasing radio resource use efficiency. FBM presents the optimal communication performance in most of fixed wireless backhaul communication environments where communication environment is not subject to change. According to an embodiment of the present disclosure, a wireless backhaul provides such functionality as to minimize a deterioration of performance due to external environments since HN or RBN additionally conducts level-limited BM in ABM of BOCS. Further, in ABM, limitation is imposed on the beam range measured, thus allowing for reduced waste of radio resources for beam measurement, increased communication efficiency, and reduced beam measurement period and the wireless backhaul's resultant enhancement in beam adaptation capability.

Further, according to an embodiment of the present disclosure, a wireless backhaul may provide such functionality as to allow RBN to transition into LDM of BOCS to minimize power consumption and interference with other wireless backhaul. Use of LDM may maximize the power use efficiency of wireless backhaul while allowing other wireless backhaul enhanced communication performance. However, when the wireless backhaul needs to conduct normal communication, the wireless backhaul may transition into another communication mode of BOCS at HN's instruction or RBN's request and conduct wireless backhaul communication. Here, upon requesting to transition into the communication mode, RBN sends SR bit or information rather than UL RACH signal. Thus, waste of UL radio resources may be reduced, and communication efficiency may be increased. According to an embodiment of the present disclosure, in a wireless backhaul, RBN operating in LDM sends BA bit or information to serving HN at each predetermined period, thereby periodically reminding serving HN that the wireless backhaul link is not disconnected but alive. As a result, for RBN operating in LDM, HN may simply determine whether the wireless backhaul link faces a problem, and upon detecting a link failure, the HN enables a quick restoration of wireless backhaul.

As is apparent from the foregoing description, according to an embodiment of the present disclosure, the wireless backhaul is distinctively operated in a state of being operated using all the beams or in a state where communication is carried out using only the optimal beam, wherein the state where communication is carried out using only the optimal beam is operated distinctively in a mode where a fixed beam is used, a mode where limited beam measurement is additionally conducted on beams adjacent to the optimal beam, and a power save mode in which signal transmission is made only at predetermined periods. Thus, the capability of wireless backhaul may be optimized, and costs for installation and operation of wireless backhaul apparatus may be minimized.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for providing a connection with a radio access network via a wireless backhaul, the method comprising:
determining one of a first state in which a first node connected with the radio access network is operated using a plurality of beams or a second state in which the first node is operated using a beam of the first node as an operation mode of the first node;
providing, by the first node, the connection with a base station using the operation mode;
based on identifying that the operation mode of the first node is the second state, sending, by the first node, a sync signal and a shared control information to at least one second node connected to the first node using the beam of the first node; and
sending, by the first node, a control signal and data for the wireless backhaul to the at least one second node connected to the first node, using the beam of the first node without supporting the first node to access a new second node while operating in the second state.

2. The method of claim 1, further comprising determining a communication mode of the at least one second node connected with the base station based on identifying that the operation mode of the first node is the second state.

3. The method of claim 2, wherein determining the communication mode includes selecting at least one of a first mode in which the at least one second node performs communication using a fixed beam combination to the first node, a second mode in which beam measurement is performed using beams adjacent to a beam constituting the fixed beam combination, or a third mode in which a signal is sent only at a predetermined period.

4. The method of claim 3, further comprising transitioning the at least one second node into the second mode based on identifying that the at least one second node connected to the first node operating in the first mode maintains a difference between a maximum value and minimum value for reception capability that is larger than a threshold for a predetermined time.

5. The method of claim 3, further comprising transitioning the at least one second node into the first mode based on identifying that the at least one second node connected to the first node operating in the second mode maintains a beam of the at least one second node for a predetermined time.

6. The method of claim 3, further comprising transitioning the at least one second node into the first mode or the second mode based on identifying that the first node receives a scheduling request from the at least one second node connected to the first node and operating in the third mode.

7. The method of claim 1, further comprising determining to transit the operation mode of the first node from the second state to the first state upon meeting one of a first case where a new node connected with the radio access network is added to the wireless backhaul while the first node is operated in the second state, or a second case where a node having a failure or capability deterioration of a link with the first node is detected.

8. The method of claim 1, wherein the base station is at least one of a macro base station or small cell base station providing a mobile communication service.

9. An apparatus for providing a connection with a radio access network via a wireless backhaul, the apparatus comprising:
a transceiver configured to communicate with a first node connected with the radio access network; and
a controller configured to:
determine at least one of a first state in which the first node is operated using a plurality of beams or a second state in which the first node is operated using a beam of the first node as an operation mode of the first node;
determine one or more beams to send a sync signal and shared control information based on the operation mode;
control transceiver to provide the connection with a base station using the determined operation mode; and
based on identifying that the operation mode of the first node is the second state:
control the transceiver to send a sync signal and a shared control information to at least one second node connected to the first node using the beam of the first node, and
control the transceiver to send a control signal and data for the wireless backhaul to the at least one second node connected to the first node, using the beam of the first node without supporting the first node to access a new second node while operating in the second state.

10. The apparatus of claim 9, wherein the controller is further configured to determine a communication mode of the at least one second node connected with the base station based on identifying that the operation mode of the first node the second state.

11. The apparatus of claim 10, wherein the controller is further configured to select at least one of a first mode in which the at least one second node performs communication using a fixed beam combination to the first node, a second mode in which beam measurement is performed using beams adjacent to a beam constituting the fixed beam combination, or a third mode in which a signal is sent only at a predetermined period.

12. The apparatus of claim 11, wherein the controller is further configured to determine a transition of the at least one second node into the second mode based on identifying that the at least one second node connected to the first node operating in the first mode maintains a difference between a maximum value and minimum value for reception capability that is larger than a threshold for a predetermined time.

13. The apparatus of claim 11, wherein the controller is further configured to determine a transition of the at least one second node into the first mode based on identifying that the at least one second node connected to the first node operating in the second mode maintains a beam of the at least one second node for a predetermined time.

14. The apparatus of claim 11, wherein the controller is further configured to determine a transition of the at least one second node into at least one of the first mode or the at least one second mode based on identifying that the first node receives a scheduling request from the second node connected to the first node and operating in the third mode.

15. The apparatus of claim 9, wherein the controller is further configured to determine to transit the operation mode of the first node from the second state to the first state upon meeting at least one of a first chase where a new node connected with the radio access network is added to the wireless backhaul while the first node is operated in the second state, or a second case where a node having a failure or a capability deterioration of a link with the first node is detected.

16. The apparatus of claim 9, wherein the base station is at least one of a macro base station or small cell base station providing a mobile communication service.

* * * * *